(12) United States Patent
Kim et al.

(10) Patent No.: US 9,384,014 B2
(45) Date of Patent: Jul. 5, 2016

(54) MOBILE TERMINAL AND DISPLAY CONTROLLING METHOD THEREIN

(75) Inventors: Dongwoo Kim, Goyang-si (KR); Hyehyun Kim, Seoul (KR); Hyekyung Park, Seoul (KR); Hyunah Cho, Goyang-si (KR)

(73) Assignee: LG ELECTRONICS INC., Seoul (KR)

( * ) Notice: Subject to any disclaimer, the term of this patent is extended or adjusted under 35 U.S.C. 154(b) by 212 days.

(21) Appl. No.: 13/401,654

(22) Filed: Feb. 21, 2012

(65) Prior Publication Data

US 2013/0002725 A1    Jan. 3, 2013

(30) Foreign Application Priority Data

Jun. 28, 2011  (KR) .................... 10-2011-0062800

(51) Int. Cl.
*G06F 3/048* (2013.01)
*G06F 9/44* (2006.01)
*G06F 3/0482* (2013.01)
*G06F 3/0481* (2013.01)

(Continued)

(52) U.S. Cl.
CPC ............ *G06F 9/4445* (2013.01); *G06F 3/0482* (2013.01); *G06F 3/0488* (2013.01); *G06F 3/04817* (2013.01); *G06F 3/04842* (2013.01); *G06F 3/04883* (2013.01); *H04L 67/025* (2013.01)

(58) Field of Classification Search
CPC .......... G06F 3/04815; G06F 17/30873; G06F 3/0482; G06F 3/04883; G06F 3/0481; G06F 3/04842; G06F 3/0488; G06F 3/04817; G09G 2340/12; G09G 5/377; H04L 67/025

USPC ........................................................ 715/864
See application file for complete search history.

(56) References Cited

U.S. PATENT DOCUMENTS 5,831,609 A    11/1998  London et al.
7,681,134 B1 *  3/2010  Grechishkin ......... G06F 9/4443
                                                       709/205

(Continued)

FOREIGN PATENT DOCUMENTS

EP          2146269 A1      1/2010
EP          2242240 A1     10/2010
WO     WO 2009/148781 A1  12/2009

OTHER PUBLICATIONS

Golub et al., "MVM—An Environment for Running Multiple Dos, Windows and DPMI Programs on the Microkernel," USENIX Association Proceedings, Mach III Symposium, Apr. 19, 1993, pp. 173-190, XP000933787.

(Continued)

*Primary Examiner* — Tuyetlien T Tran
*Assistant Examiner* — Jaime Duckworth
(74) *Attorney, Agent, or Firm* — Birch, Stewart, Kolasch & Birch, LLP

(57) ABSTRACT

A mobile terminal including a communication unit configured to communicate with at least one external terminal; a memory configured to store at least first and second operating systems including at least first and second modes, respectively; and a controller configured to activate the first mode using the first operating system, to display, in a first display region of a display unit of the mobile terminal, the activated first mode, and to display in a second display region of the display unit, at least one second indicator that when selected, activates a second corresponding application in the second mode.

20 Claims, 48 Drawing Sheets

(51) Int. Cl.
  *H04L 29/08* (2006.01)
  *G06F 3/0484* (2013.01)
  *G06F 3/0488* (2013.01)

(56) References Cited

U.S. PATENT DOCUMENTS

| | | | |
|---|---|---|---|
| 7,912,822 B2* | 3/2011 | Bethlehem et al. | 707/705 |
| 2004/0268364 A1* | 12/2004 | Faraj | 719/316 |
| 2007/0150842 A1* | 6/2007 | Chaudhri | G06F 3/04883 715/863 |
| 2007/0152979 A1 | 7/2007 | Jobs et al. | |
| 2007/0213041 A1* | 9/2007 | Horie | 455/419 |
| 2008/0318616 A1* | 12/2008 | Chipalkatti et al. | 455/550.1 |
| 2009/0153289 A1* | 6/2009 | Hope et al. | 340/5.1 |
| 2010/0088639 A1* | 4/2010 | Yach et al. | 715/825 |
| 2010/0293508 A1* | 11/2010 | Hwang et al. | 715/846 |
| 2011/0153853 A1 | 6/2011 | London et al. | |
| 2012/0110315 A1* | 5/2012 | Lee | G06F 9/45558 713/100 |
| 2012/0174021 A1* | 7/2012 | Dharawat | 715/779 |

OTHER PUBLICATIONS

Patterson, "The implications of window sharing for a virtual terminal protocol," International Conference on Communications, New York, IEEE, vol. 1 of 4, Apr. 15-19, 1990, pp. 66-70, XP000147381.

* cited by examiner (a)

|  | P mode | — 501 |
|---|---|---|

Schedule 1

| Contents | |
|---|---|

| Participants | | — 931 |
|---|---|---|
| Time | | — 932 |

OK (a)

|  | B mode | — 502 |
|---|---|---|

Schedule 2

| Contents | |
|---|---|

| Participants | | — 941 |
|---|---|---|
| Time | | — 942 |
| Notifications | E-mail sending | — 943 |

| A | B | C | D |
|---|---|---|---|
| E | .. | .. | .. |
| .. | .. | .. | .. |
| .. | .. | .. | Z |

P mode (a)

| Q | W | E | .. | .. | P |
|---|---|---|---|---|---|
| A | S | .. | .. | .. | L |
| Z | X | .. | .. | .. | M |
| 1 | 2 | .. | .. | .. | O |

B mode (b)

| Indicator | | | |
|---|---|---|---|
| Settings 2210 | | Settings 2220 | |
| (i) Wiress and network | | (i) Airplane Mode | |
| (i) Call settings | | (i) Wi-Fi | Off > |
| (i) Sound | | (i) Personal Hotspot | > |
| (i) Display | 1<sup>th</sup> mode screen screen | (i) Notif 2<sup>nd</sup> mode screen screen | On |
| (i) Gesture | | (i) Location Services | On |
| (i) Location & security | | (i) Carrier | VZW |
| (i) Applications | | (i) Sound | > |

(Note: superscripts rendered as $1^{th}$ mode screen and $2^{nd}$ mode screen)

MOBILE TERMINAL AND DISPLAY CONTROLLING METHOD THEREIN

Pursuant to 35 U.S.C. §119(a), this application claims the benefit of earlier filing date and right of priority to Korean Application No.10-2011-0062800, filed on Jun. 28, 2011, the contents of which are hereby incorporated by reference herein in their entirety.

BACKGROUND OF THE INVENTION

1. Field of the Invention

The present invention relates to a mobile terminal and corresponding method for executing and displaying information regarding applications operating in different modes.

2. Discussion of the Related Art

Generally, terminals can be classified into mobile/portable terminals and stationary terminals. The mobile terminals can be classified into handheld terminals and vehicle mount terminals.

As functions of the terminal are diversified, the terminal is implemented as a multimedia player provided with composite functions such as photographing of photos or moving pictures, playback of music or moving picture files, game play, broadcast reception and the like for example.

Recently, the mobile terminal tends to be used for a business need as well as a personal need. However, a mobile terminal according to a related art fails in providing an environment in which the mobile terminal can be separately used for the purpose of the personal need or the business need.

SUMMARY OF THE INVENTION

Accordingly, one object of the present invention is to provide a mobile terminal and display controlling method therein that substantially obviate one or more problems due to limitations and disadvantages of the related art.

Another object of the present invention is to provide a mobile terminal and display controlling method therein, by which a terminal use environment in accordance with various usages including a private usage, a business usage and the like can be provided.

Another object of the present invention is to provide a mobile terminal and display controlling method therein, by which an access from one mode to another mode is facilitated or by which information on an application corresponding to another mode can be provided, when implementing a plurality of modes to correspond to various usages including a private usage, a business usage and the like.

Still another object of the present invention is to provide a mobile terminal and display controlling method therein, by which an application of one mode can be provided as a launcher application of another mode.

To achieve these objects and other advantages and in accordance with the purpose of the invention, as embodied and broadly described herein, the present invention provides in one aspect a mobile terminal including a communication unit configured to communicate with at least one external terminal; a memory configured to store at least first and second operating systems including at least first and second modes, respectively; and a controller configured to activate the first mode using the first operating system, to display, in a first display region of a display unit of the mobile terminal, the activated first mode, and to display in a second display region of the display unit, at least one second indicator that when selected, activates a second corresponding application in the second mode.

In another aspect, the present invention provides a method of controlling a mobile terminal, and which includes allowing, via a communication unit on the mobile terminal, communication with at least one external terminal; storing, in a memory of the mobile terminal, at least first and second operating systems including at least first and second modes, respectively; activating, via a controller of the mobile terminal, the first mode using the first operating system; displaying, in a first display region of a display unit of the mobile terminal, the activated first mode; and displaying, in a second display region of the display unit, at least one second indicator that when selected, activates a second corresponding application in the second mode.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIGS. 22A and 22B are display screens illustrating executing a common application corresponding to a common application indicator displayed on a specific region according to an embodiment of the present invention.

DETAILED DESCRIPTION OF THE INVENTION

In the following detailed description, reference is made to the accompanying drawing figures which form a part hereof, and which show by way of illustration specific embodiments of the invention. It is to be understood by those of ordinary skill in this technological field that other embodiments may be utilized, and structural, electrical, as well as procedural changes may be made without departing from the scope of the present invention. Wherever possible, the same reference numbers will be used throughout the drawings to refer to the same or similar parts.

First, mobile terminals described in this disclosure can include a mobile phone, a smart phone, a laptop computer, a digital broadcast terminal, a PDA (personal digital assistant), a PMP (portable multimedia player), a navigation system and the like. With the exception of a mobile terminal only, the configurations described in this disclosure are applicable to such a stationary terminal as a digital TV, a desktop computer and the like.

Figure 1:
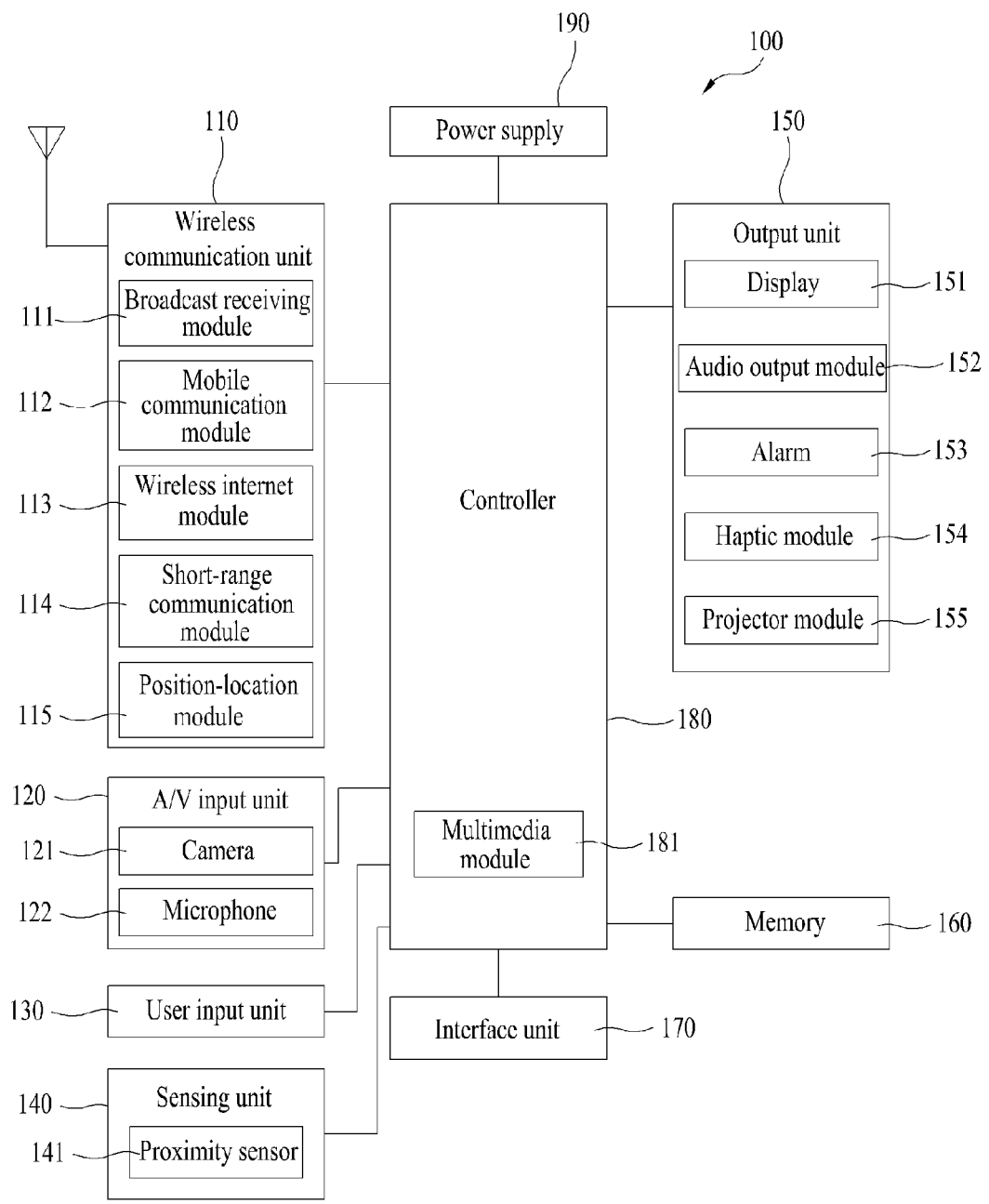
FIG. 1 is a block diagram of a mobile terminal according to one embodiment of the present invention.

First, FIG. 1 is a block diagram of a mobile terminal 100 according to one embodiment of the present invention. Referring to FIG. 1, the mobile terminal 100 according to one embodiment of the present invention includes a wireless communication unit 110, an A/V (audio/video) input unit 120, a user input unit 130, a sensing unit 140, an output unit 150, a memory 160, an interface unit 170, a controller 180, a power supply unit 190 and the like. FIG. 1 shows the mobile terminal 100 having various components, but all of the illustrated components are not required. Greater or fewer components may alternatively be implemented.

The wireless communication unit 110 generally includes one or more components which permits wireless communication between the mobile terminal 100 and a wireless communication system or network within which the mobile terminal 100 is located. For instance, the wireless communication unit 110 can include a broadcast receiving module 111, a mobile communication module 112, a wireless internet module 113, a short-range communication module 114, a position-location module 115 and the like.

The broadcast receiving module 111 receives a broadcast signal and/or broadcast associated information from an external broadcast managing server via a broadcast channel. The broadcast channel may include a satellite channel and a terrestrial channel.

The broadcast managing server generally refers to a server which generates and transmits a broadcast signal and/or broadcast associated information or a server which includes a previously generated broadcast signal and/or broadcast associated information and then transmits the provided signal or information to a terminal. The broadcast signal may be implemented as a TV broadcast signal, a radio broadcast signal, and a data broadcast signal, among others. If desired, the broadcast signal may further include a broadcast signal combined with a TV or radio broadcast signal.

Further, the broadcast associated information includes information associated with a broadcast channel, a broadcast program, a broadcast service provider, etc. In addition, the broadcast associated information can be provided via a mobile communication network. In this instance, the broadcast associated information can be received by the mobile communication module 112.

The broadcast associated information can be implemented in various forms. For instance, broadcast associated information may include an electronic program guide (EPG) of digital multimedia broadcasting (DMB) and electronic service guide (ESG) of digital video broadcast-handheld (DVB-H).

The broadcast receiving module 111 may be configured to receive broadcast signals transmitted from various types of broadcast systems. In a non-limiting example, such broadcasting systems include digital multimedia broadcasting-terrestrial (DMB-T), digital multimedia broadcasting-satellite (DMB-S), digital video broadcast-handheld (DVB-H), the data broadcasting system known as media forward link only (MediaFLO®) and integrated services digital broadcast-terrestrial (ISDB-T). Optionally, the broadcast receiving module 111 can be configured suitable for other broadcasting systems as well as the above-explained digital broadcasting systems.

The broadcast signal and/or broadcast associated information received by the broadcast receiving module 111 may be stored in a suitable device, such as a memory 160. In addition, the mobile communication module 112 transmits/receives wireless signals to/from one or more network entities (e.g., base station, external terminal, server, etc.). Such wireless signals may represent audio, video, and data according to text/multimedia message transceivings, among others.

The wireless internet module 113 supports Internet access for the mobile terminal 100. This module may be internally or externally coupled to the mobile terminal 100. In this instance, the wireless Internet technology can include WLAN (Wireless LAN) (Wi-Fi), Wibro (Wireless broadband), Wimax (World Interoperability for Microwave Access), HSDPA (High Speed Downlink Packet Access), etc.

The short-range communication module 114 facilitates relatively short-range communications. Suitable technologies for implementing this module include radio frequency identification (RFID), infrared data association (IrDA), ultra-wideband (UWB), as well as the networking technologies commonly referred to as Bluetooth and ZigBee, to name a few. Further, the position-location module 115 identifies or otherwise obtains the location of the mobile terminal 100. If desired, this module may be implemented with a global positioning system (GPS) module.

Referring to FIG. 1, the audio/video (A/V) input unit 120 is configured to provide audio or video signal input to the mobile terminal 100. As shown, the A/V input unit 120 includes a camera 121 and a microphone 122. The camera 121 receives and processes image frames of still pictures or video, which are obtained by an image sensor in a video call mode or a photographing mode. In addition, the processed image frames can be displayed on the display unit 151.

The image frames processed by the camera 121 can be stored in the memory 160 or can be externally transmitted via the wireless communication unit 110. Optionally, at least two cameras 121 can be provided to the mobile terminal 100 according to environment of usage.

The microphone 122 receives an external audio signal while the portable device is in a particular mode, such as phone call mode, recording mode and voice recognition. This audio signal is processed and converted into electric audio data. The processed audio data is transformed into a format transmittable to a mobile communication base station via the mobile communication module 112 when in call mode. The microphone 122 typically includes assorted noise removing algorithms to remove noise generated in the course of receiving the external audio signal.

The user input unit 130 generates input data responsive to user manipulation of an associated input device or devices. Examples of such devices include a keypad, a dome switch, a touchpad (e.g., static pressure/capacitance), a jog wheel, a jog switch, etc.

The sensing unit 140 provides sensing signals for controlling operations of the mobile terminal 100 using status measurements of various aspects of the mobile terminal. For instance, the sensing unit 140 may detect an open/close status of the mobile terminal 100, relative positioning of components (e.g., a display and keypad) of the mobile terminal 100, a change of position of the mobile terminal 100 or a component of the mobile terminal 100, a presence or absence of user contact with the mobile terminal 100, orientation or acceleration/deceleration of the mobile terminal 100. As an example, consider the mobile terminal 100 being configured as a slide-type mobile terminal. In this configuration, the sensing unit 140 may sense whether a sliding portion of the mobile terminal is open or closed. Other examples include the sensing unit 140 sensing the presence or absence of power provided by the power supply 190, the presence or absence of a coupling or other connection between the interface unit 170 and an external device. In addition, the sensing unit 140 can include a proximity sensor 141.

The output unit 150 generates outputs relevant to the senses of sight, hearing, touch and the like. In addition, the output unit 150 includes the display unit 151, an audio output module 152, an alarm unit 153, a haptic module 154, a projector module 155 and the like.

The display unit 151 is typically implemented to visually display (output) information associated with the mobile terminal 100. For instance, if the mobile terminal is operating in a phone call mode, the display will generally provide a user interface (UI) or graphical user interface (GUI) which includes information associated with placing, conducting, and terminating a phone call. As another example, if the mobile terminal 100 is in a video call mode or a photographing mode, the display unit 151 may additionally or alternatively display images which are associated with these modes, the UI or the GUI.

The display module 151 may be implemented using known display technologies including, for example, a liquid crystal display (LCD), a thin film transistor-liquid crystal display (TFT-LCD), an organic light-emitting diode display (OLED), a flexible display and a three-dimensional display. The mobile terminal 100 may include one or more of such displays.

Some of the above displays can be implemented in a transparent or optical transmittive type, which can be named a transparent display. As a representative example of the transparent display, there is TOLED (transparent OLED) or the like. A rear configuration of the display unit 151 can be implemented in the optical transmittive type as well. In this configuration, a user can see an object in rear of a terminal body via the area occupied by the display unit 151 of the terminal body.

At least two display units 151 can be provided to the mobile terminal 100 in accordance with the implemented configuration of the mobile terminal 100. For instance, a plurality of display units can be arranged on a single face of the mobile terminal 100 by being spaced apart from each other or being built in one body. Alternatively, a plurality of display units can be arranged on different faces of the mobile terminal 100.

When the display unit 151 and a sensor for detecting a touch action (hereinafter called 'touch sensor') configures a mutual layer structure (hereinafter called 'touchscreen'), it can use the display unit 151 as an input device as well as an output device. In this instance, the touch sensor can be configured as a touch film, a touch sheet, a touchpad or the like.

The touch sensor can be configured to convert a pressure applied to a specific portion of the display unit 151 or a variation of a capacitance generated from a specific portion of the display unit 151 to an electric input signal. Moreover, it can configure the touch sensor to detect a pressure of a touch as well as a touched position or size.

If a touch input is made to the touch sensor, signal(s) corresponding to the touch is transferred to a touch controller. The touch controller processes the signal(s) and then transfers the processed signal(s) to the controller 180. Therefore, the controller 180 can know whether a prescribed portion of the display unit 151 is touched.

Referring to FIG. 1, a proximity sensor 141 can be provided to an internal area of the mobile terminal 100 enclosed by the touchscreen or around the touchscreen. The proximity sensor 141 is the sensor that detects a presence or non-presence of an object approaching a prescribed detecting surface or an object existing around the proximity sensor using an electromagnetic field strength or infrared ray without mechanical contact. Hence, the proximity sensor has durability longer than that of a contact type sensor and also has utility wider than that of the contact type sensor.

The proximity sensor 141 can include one of a transmittive photoelectric sensor, a direct reflective photoelectric sensor, a mirror reflective photoelectric sensor, a radio frequency oscillation proximity sensor, an electrostatic capacity proximity sensor, a magnetic proximity sensor, an infrared proximity sensor and the like. When the touchscreen includes the electrostatic capacity proximity sensor, it is configured to detect the proximity of a pointer using a variation of electric field according to the proximity of the pointer. In this instance, the touchscreen (touch sensor) can be classified as the proximity sensor.

In the following description, for clarity, an action that a pointer approaches without contacting with the touchscreen to be recognized as located on the touchscreen is named 'proximity touch'. In addition, an action that a pointer actually touches the touchscreen is named 'contact touch'. The meaning of the position on the touchscreen proximity-touched by the pointer means the position of the pointer which vertically opposes the touchscreen when the pointer performs the proximity touch.

The proximity sensor 141 detects a proximity touch and a proximity touch pattern (e.g., a proximity touch distance, a proximity touch duration, a proximity touch position, a proximity touch shift state, etc.). In addition, information corresponding to the detected proximity touch action and the detected proximity touch pattern can be output to the touchscreen.

The audio output module 152 functions in various modes including a call-receiving mode, a call-placing mode, a recording mode, a voice recognition mode, a broadcast reception mode and the like to output audio data which is received from the wireless communication unit 110 or is stored in the memory 160. During operation, the audio output module 152 outputs audio relating to a particular function (e.g., call received, message received, etc.). The audio output module 152 is often implemented using one or more speakers, buzzers, other audio producing devices, and combinations thereof.

The alarm unit 153 is output a signal for announcing the occurrence of a particular event associated with the mobile terminal 100. Typical events include a call received event, a message received event and a touch input received event. The alarm unit 153 can output a signal for announcing the event occurrence by way of vibration as well as video or audio signal. The video or audio signal can be output via the display unit 151 or the audio output unit 152. Hence, the display unit 151 or the audio output module 152 can be regarded as a part of the alarm unit 153.

The haptic module 154 generates various tactile effects that can be sensed by a user. Vibration is a representative one of the tactile effects generated by the haptic module 154. Strength and pattern of the vibration generated by the haptic module 154 are controllable. For instance, different vibrations can be output by being synthesized together or can be output in sequence.

The haptic module 154 can generate various tactile effects as well as the vibration. For instance, the haptic module 154 generates the effect attributed to the arrangement of pins vertically moving against a contact skin surface, the effect attributed to the injection/suction power of air though an injection/suction hole, the effect attributed to the skim over a skin surface, the effect attributed to the contact with electrode, the effect attributed to the electrostatic force, the effect attributed to the representation of hold/cold sense using an endothermic or exothermic device and the like.

The haptic module 154 can be implemented to enable a user to sense the tactile effect through a muscle sense of finger, arm or the like as well as to transfer the tactile effect through a direct contact. Optionally, at least two haptic modules 154 can be provided to the mobile terminal 100 in accordance with the corresponding configuration type of the mobile terminal 100.

The projector module 155 is the element for performing an image projector function using the mobile terminal 100. In addition, the projector module 155 can display an image, which is identical to or partially different at least from the image displayed on the display unit 151, on an external screen or wall according to a control signal of the controller 180.

In particular, the projector module 155 can include a light source generating light (e.g., laser) for projecting an image externally, an image producing mechanism for producing an image to output externally using the light generated from the light source, and a lens for enlarging to output the image externally in a predetermined focus distance. In addition, the projector module 155 can further include a device for adjusting an image projected direction by mechanically moving the lens or the whole module.

The projector module 155 can be classified into a CRT (cathode ray tube) module, an LCD (liquid crystal display) module, a DLP (digital light processing) module or the like according to a device type of a display means. In particular, the DLP module is operated by the mechanism of enabling the light generated from the light source to reflect on a DMD (digital micro-mirror device) chip and can be advantageous for the downsizing of the projector module 151.

Preferably, the projector module 155 can be provided in a length direction of a lateral, front or backside direction of the mobile terminal 100. In addition, it is understood that the projector module 155 can be provided to any portion of the mobile terminal 100 according to the necessity thereof.

The memory unit 160 is generally used to store various types of data to support the processing, control, and storage requirements of the mobile terminal 100. Examples of such data include program instructions for applications operating on the mobile terminal 100, contact data, phonebook data, messages, audio, still pictures, moving pictures, etc. In addition, a recent use history or a cumulative use frequency of each data (e.g., use frequency for each phonebook, each message or each multimedia) can be stored in the memory unit 160. Moreover, data for various patterns of vibration and/or sound output when a touch input to the touchscreen can be stored in the memory unit 160.

The memory 160 may be implemented using any type or combination of suitable volatile and non-volatile memory or storage devices including hard disk, random access memory (RAM), static random access memory (SRAM), electrically erasable programmable read-only memory (EEPROM), erasable programmable read-only memory (EPROM), programmable read-only memory (PROM), read-only memory (ROM), magnetic memory, flash memory, magnetic or optical disk, multimedia card micro type memory, card-type memory (e.g., SD memory, XD memory, etc.), or other similar memory or data storage device. In addition, the mobile terminal 100 can operate in association with a web storage for performing a storage function of the memory 160 on Internet.

The interface unit 170 is often implemented to couple the mobile terminal 100 with external devices. The interface unit 170 receives data from the external devices or is supplied with the power and then transfers the data or power to the respective elements of the mobile terminal 100 or enables data within the mobile terminal 100 to be transferred to the external devices. The interface unit 170 may be configured using a wired/wireless headset port, an external charger port, a wired/wireless data port, a memory card port, a port for coupling to a device having an identity module, audio input/output ports, video input/output ports, an earphone port and/or the like.

The identity module is the chip for storing various kinds of information for authenticating a use authority of the mobile terminal 100 and can include User Identify Module (UIM), Subscriber Identity Module (SIM), Universal Subscriber Identity Module (USIM) and/or the like. A device having the identity module (hereinafter called 'identity device') can be manufactured as a smart card. Therefore, the identity device is connectible to the mobile terminal 100 via the corresponding port.

When the mobile terminal 110 is connected to an external cradle, the interface unit 170 becomes a passage for supplying the mobile terminal 100 with a power from the cradle or a passage for delivering various command signals input from the cradle by a user to the mobile terminal 100. Each of the various command signals input from the cradle or the power can operate as a signal enabling the mobile terminal 100 to recognize that it is correctly loaded in the cradle.

The controller 180 generally controls the overall operations of the mobile terminal 100. For example, the controller 180 performs the control and processing associated with voice calls, data communications, video calls, etc. The controller 180 may include a multimedia module 181 that provides multimedia playback. The multimedia module 181 may be configured as part of the controller 180, or implemented as a separate component.

Moreover, the controller 180 can perform a pattern recognizing process for recognizing a writing input and a picture drawing input carried out on the touchscreen as characters or images, respectively. Further, the power supply unit 190 provides power used by the various components for the mobile terminal 100. The power may be internal power, external power, or combinations thereof.

Various embodiments described herein may be implemented in a computer-readable medium using, for example, computer software, hardware, or some combination thereof. For a hardware implementation, the embodiments described herein may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof. Such embodiments may also be implemented by the controller 180.

For a software implementation, the embodiments described herein may be implemented with separate software modules, such as procedures and functions, each of which perform one or more of the functions and operations described herein. The software codes can be implemented with a software application written in any suitable programming language and may be stored in memory such as the memory 160, and executed by a controller or processor, such as the controller 180.

Figure 2A:
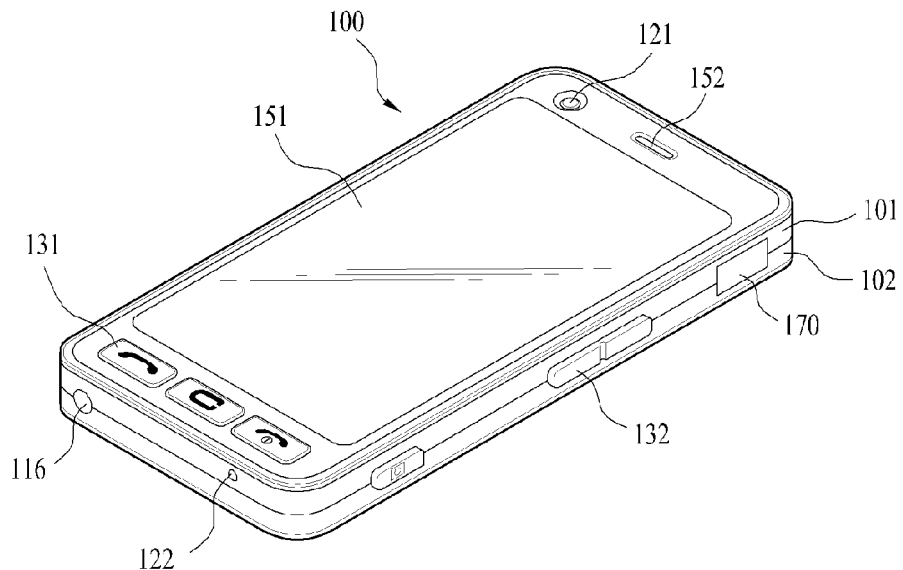
FIG. 2A is a front perspective diagram of a mobile terminal according to one embodiment of the present invention.

Next, FIG. 2A is a front perspective diagram of the mobile terminal 100 according to one embodiment of the present invention. The mobile terminal 100 shown in the drawing has a bar-type terminal body. However, the mobile terminal 100 may be implemented in a variety of configurations, including folder-type, slide-type, rotational-type, swing-type and combinations thereof. For clarity, further disclosure will primarily relate to a bar-type mobile terminal 100. However such teachings apply equally to other types of mobile terminals.

Referring to FIG. 2A, the mobile terminal 100 includes a case (casing, housing, cover, etc.) configuring an exterior thereof. In the present embodiment, the case can be divided into a front case 101 and a rear case 102. Various electric/electronic parts are loaded in a space provided between the front and rear cases 101 and 102. Optionally, at least one middle case can be further provided between the front and rear cases 101 and 102 in addition. The cases 101 and 102 are formed by injection molding of synthetic resin or can be formed of metal substance such as stainless steel (STS), titanium (Ti) or the like for example.

A display unit 151, an audio output unit 152, a camera 121, user input units 130/131 and 132, a microphone 122, an interface 180 and the like can be provided to the terminal body, and more particularly, to the front case 101. The display unit 151 occupies most of a main face of the front case 101. The audio output unit 151 and the camera 121 are provided to an area adjacent to one of both end portions of the display unit 151, while the user input unit 131 and the microphone 122 are provided to another area adjacent to the other end portion of the display unit 151. The user input unit 132 and the interface 170 can be provided to lateral sides of the front and rear cases 101 and 102.

The input unit 130 is manipulated to receive a command for controlling an operation of the terminal 100. In addition, the input unit 130 can include a plurality of manipulating units 131 and 132. The manipulating units 131 and 132 can be named a manipulating portion and may adopt any mechanism of a tactile manner that enables a user to perform a manipulation action by experiencing a tactile feeling.

Content input by the first or second manipulating unit 131 or 132 can be diversely set. For instance, such a command as start, end, scroll and the like is input to the first manipulating unit 131. In addition, a command for a volume adjustment of sound output from the audio output unit 152, a command for a switching to a touch recognizing mode of the display unit 151 or the like can be input to the second manipulating unit 132. A retractable antenna 116 can also be provided.

Figure 2B:
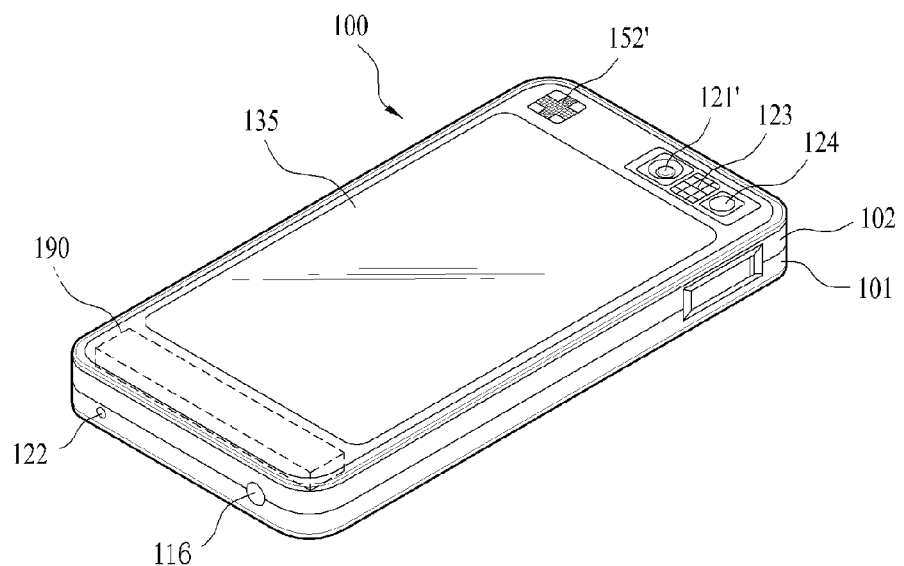
FIG. 2B is a rear perspective diagram of a mobile terminal according to one embodiment of the present invention.

Next, FIG. 2B is a perspective diagram of a backside of the terminal shown in FIG. 2A. Referring to FIG. 2B, a camera 121' can be additionally provided to a backside of the terminal body, and more particularly, to the rear case 102. The camera 121' has a photographing direction that is substantially opposite to that of the former camera 121 shown in FIG. 21A and may have pixels differing from those of the former camera 121.

Preferably, for instance, the former camera 121 has low pixels enough to capture and transmit a picture of user's face for a video call, while the latter camera 121' has high pixels for capturing a general subject for photography without transmitting the captured subject. In addition, each of the cameras 121 and 121' can be installed at the terminal body to be rotated or popped up.

A flash 123 and a mirror 124 are additionally provided adjacent to the camera 121'. The flash 123 projects light toward a subject when photographing the subject using the camera 121'. When a user attempts to take a picture of the user (self-photography) using the camera 121', the mirror 124 enables the user to view user's face reflected by the mirror 124.

An additional audio output unit 152' can be provided to the backside of the terminal body. The additional audio output unit 152' can implement a stereo function together with the former audio output unit 152 shown in FIG. 2A and may be used for implementation of a speakerphone mode in talking over the terminal.

A broadcast signal receiving antenna 124 can be additionally provided to the lateral side of the terminal body as well as an antenna for communication or the like. The antenna 124 constructing a portion of the broadcast receiving module 111 shown in FIG. 1 can be retractably provide to the terminal body.

The power supply unit 190 for supplying a power to the terminal 100 is provided to the terminal body. In addition, the power supply unit 190 can be configured to be built within the terminal body. Alternatively, the power supply unit 190 can be configured to be detachably connected to the terminal body.

A touchpad 135 for detecting a touch can be additionally provided to the rear case 102. The touchpad 135 can be configured in a light transmittive type like the display unit 151. In this instance, if the display unit 151 is configured to output visual information from its both faces, it can recognize the visual information via the touchpad 135 as well. The information output from both of the faces can be entirely controlled by the touchpad 135. Alternatively, a display is further provided to the touchpad 135 so that a touchscreen can be provided to the rear case 102 as well.

The touchpad 135 is activated by interconnecting with the display unit 151 of the front case 101. The touchpad 135 can be provided in rear of the display unit 151 in parallel. The touchpad 135 can have a size equal to or smaller than that of the display unit 151.

First, the mobile terminal mentioned in the following description includes at least some of the components shown in FIG. 1. In addition, in order to perform an operation using the components (e.g., touchscreen, wireless communication unit, memory, etc.), the controller 180 can control an individual operation of each of the components or interconnected operations among a plurality of the components.

Applications mentioned in this disclosure may be embodied as software programs drivable in the mobile terminal. The driven application executes a corresponding function or operation. The application can be stored in the mobile terminal 100 (particularly the memory 160) or can be downloaded from an external server of an external terminal.

For example, the applications can include a compass, an augmented reality, a camera, a video player, a music player, a game, news, a web browser, a message, a phonebook, a memo, a schedule management, and the like. The allocations are non-limited by this example and can be implemented in various other ways.

Contents or data associated with the applications are possible as well. In this instance, the associated content or data is stored in the memory 160 or can be stored in an external server having a storage space. For instance, the contents can include an audio file (associated with the music player), a video file (associated with the video player), a document file (associated with an e-book), and the like. In addition, the data can include a message content (associated with the message), a memo content (associated with the memo), a counterpart information (associated with the phonebook), a schedule content (associated with the schedule management), and the like.

According to an embodiment of the present invention, the mobile terminal can configure a plurality of modes differing from each other in application configuration for data security for one mode against another mode or data security between different modes. In addition, the mobile terminal according to an embodiment of the present invention can implement a plurality of the modes selectively or simultaneously (or sequentially).

When a specific application is executed in a prescribed mode, at least one application interoperable with the specific application can be executed in the prescribed mode. For instance, if a specific application is a voice call application, an application interoperable with the voice call operation can include a phonebook, a message and the like.

Regarding mode discrimination in application configuration, an application executable in each of a plurality of modes can include at least one application (hereinafter named a dedicated application) executable by being dedicated to each of a plurality of the modes or at least one application (hereinafter named a common application) executable in any one of a plurality of the modes. In particular, the common application can change at least one feature in each of a plurality of the modes in which the corresponding application is executable. For instance, at least one of configuration, representation, security and the like of the common application is changeable. This shall be described in detail later.

The common application may not change its feature in each of a plurality of the modes in which the corresponding application is executable. For instance, if the common application includes such a basic terminal application as a voice call, a message and the like, it may not change its feature.

For example, if first to third applications are executed in a first mode and if the third application, a fourth application and a fifth application are executed in a second mode, the first and second applications, the third application and the fourth and fifth application can be called the dedicated applications of the first mode, the common application of the first and second modes and the dedicated applications of the second mode, respectively.

A plurality of modes can include a first mode (i.e., a private mode) facilitating user's personal life, a second mode (i.e., a business mode) facilitating a user's work life, and the like. This enables a mobile terminal to be discriminatively used in consideration of a user's personal life (e.g., privacy) and a user's public life (e.g., work life). In particular, in aspect of security reinforcement, when either a private mode or a business mode is implemented, restriction can be put on an access to information corresponding to the other mode.

The above-described private mode and the business mode are just examples for describing a plurality of the modes. If the above-described private mode and the business mode are suitable for the mode discrimination reference mentioned in this disclosure, they are non-limited by their names. Although the mode discrimination of a plurality of the modes is explained in the above description based on the application configuration, it shall be described in detail with reference to the accompanying drawings later.

Implementation and activation of a plurality of modes mentioned in the description of the present invention shall be defined as follows. First, according to an embodiment of the present invention, a mobile terminal can implement a plurality of modes and can activate one of a plurality of the currently implemented modes. For instance, if a plurality of the modes include a first mode and a second mode, the mobile terminal boots an operating system capable of implementing both of the first and second modes and can then activate the implemented first or second mode selectively.

In particular, if both of the first and second modes are already implemented, the mode for displaying an executed screen on a current screen, the mode for designating the currently executed application, the mode having a high priority or the like can be called an activated mode. In this instance, a non-activated mode (or a deactivated mode) can be regarded as operating as a background despite being implemented in the mobile terminal. In more detail, if an executed screen of the first mode and an executed screen of the second mode are being displayed on a first region and a second region of the screen through screen partition, respectively, the mode selected by a user, the mode for activating the corresponding region currently, the mode for designating a currently executed application, the mode having a high priority or the like can be regarded as activated.

Occasionally, after the mobile terminal has implemented and activated one mode, if the mobile terminal attempts to switch the current mode to the other mode, the mobile terminal can implement and activate the other mode (i.e., selective implementation and activation of mode).

In the following description, implementation of a plurality of modes and operations of components used for inter-mode switching for a plurality of the modes are explained in detail with reference to FIGS. 3A to 4C. In particular, FIGS. 3A to 3C are block diagrams of components used for controlling a plurality of modes and switching of the modes according to an embodiment of the present invention.

Figure 3A:
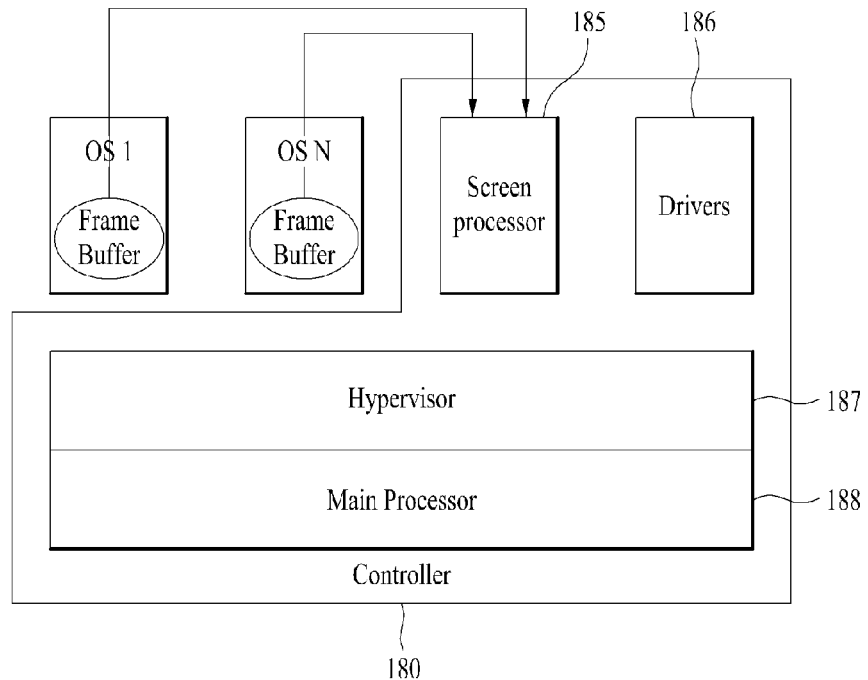
FIGS. 3A to 3C are block diagrams of components for controlling a plurality of modes and switching of the modes according to an embodiment of the present invention.
Figure 3B:
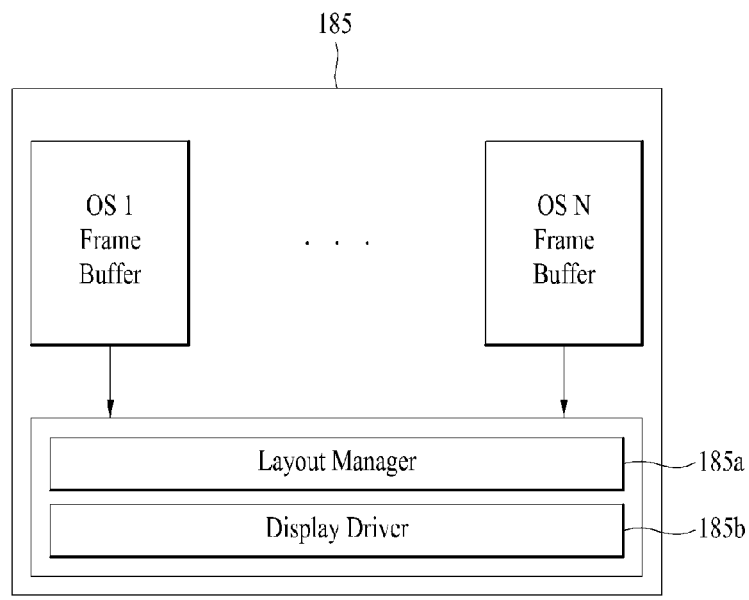
Figure 3C:
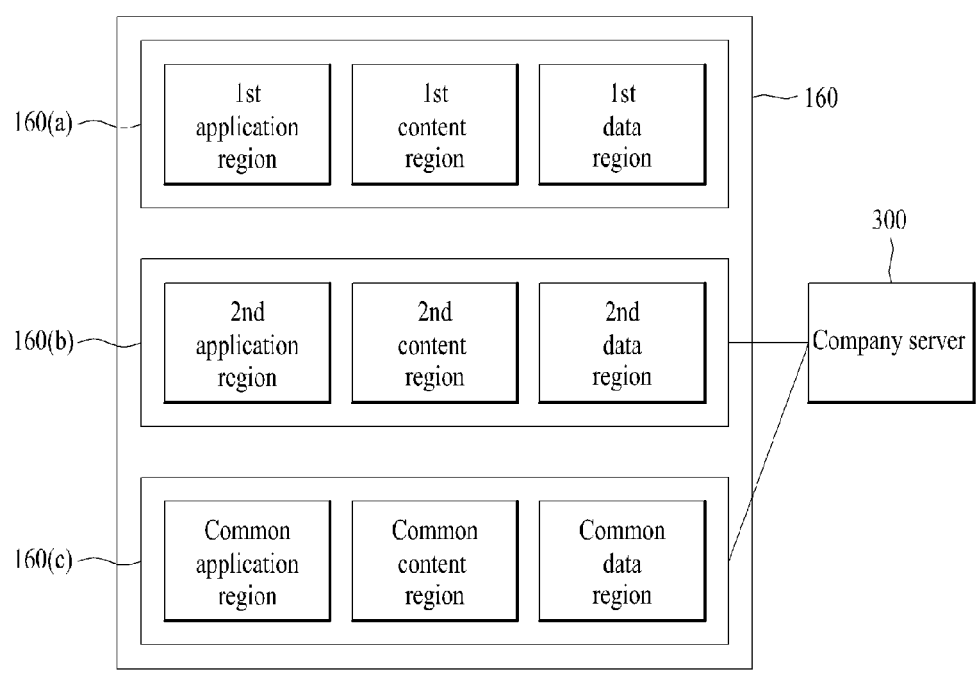

FIG. 3A is a block diagram of the controller 180 for driving a plurality of operating systems (OSs) and con ring a dedicated screen of a plurality of operating systems. In addition, FIG. 3B is a block diagram of a screen processor 185 shown in FIG. 3A. In particular, FIGS. 3A and 3B show a situation in which a plurality of the operating systems are provided in parallel with each other (FIGS. 4A(a) and 4B).

According to an embodiment of the present invention, a plurality of the modes can be implemented by a plurality of the operating systems, respectively. In particular, the operating system for supporting implementation can differ per mode.

Referring to FIG. 3A, the controller 180 includes the screen processor 185, a driver 186, a hypervisor 187 and a main processor 188. In this instance, the hypervisor 187 can be called a virtual engine (virtual machine), a virtualizing module (virtualization), a virtual engine monitor (virtual machine monitor), a virtualization module monitor (virtualization monitor) and the like. This terminology is just exemplary. In addition, a component capable of performing the same function of the hypervisor 187 is non-limited by the corresponding terminology.

Further, a frame buffer is provided to each of a plurality of the operating systems stored in the memory 160. When the plurality of operating systems are driven, the screen processor 185 receives a frame corresponding to a dedicated screen of the corresponding operating system from each of the frame buffers and then determines whether to display the dedicated screen of a prescribed one of the operating systems on a screen of the display unit 151 under the control of the main processor 188.

Under the control of the main processor 188, the screen processor 185 displays the dedicated screen of the specific operating system on the whole screen of the display unit 151 (e.g., when implementing one mode only). Alternatively, the screen processor 185 generates one integrated frame by combining and/or editing the frames received from the frame buffers and can then display an integrated dedicated screen including all the dedicated screens of a plurality of the operating systems (e.g., when implementing a plurality of the modes).

Figure 4A:
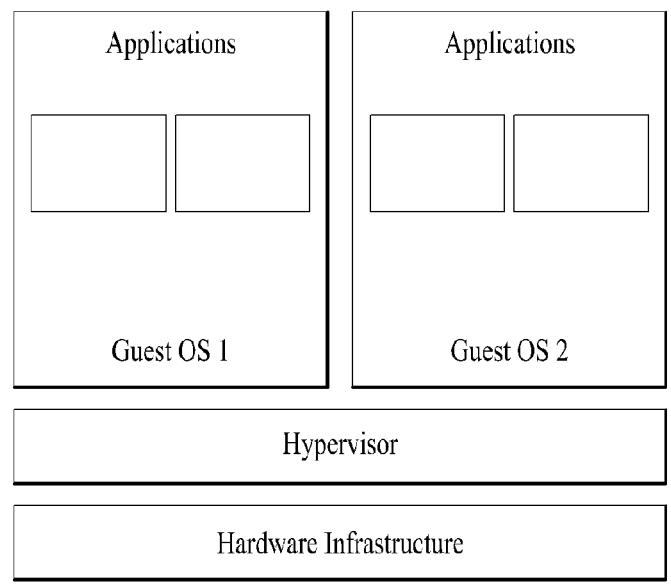
FIGS. 4A to 4C are block diagrams of components for operating a plurality of operating systems and modes according to an embodiment of the present invention.
Figure 4A:
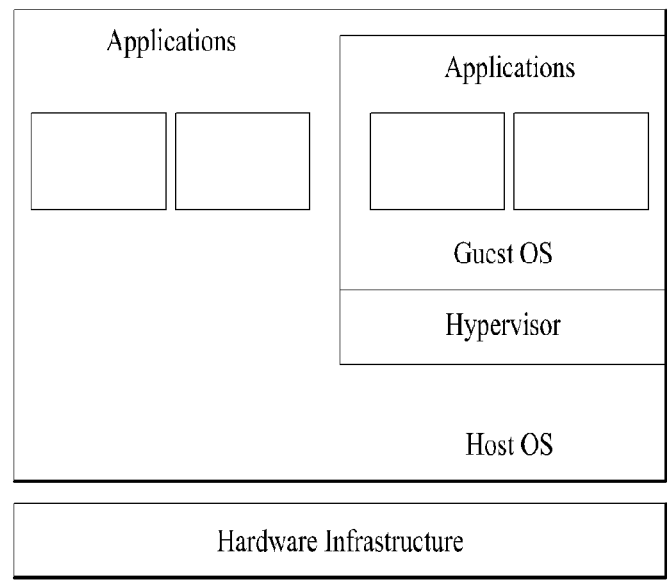
Figure 4B:
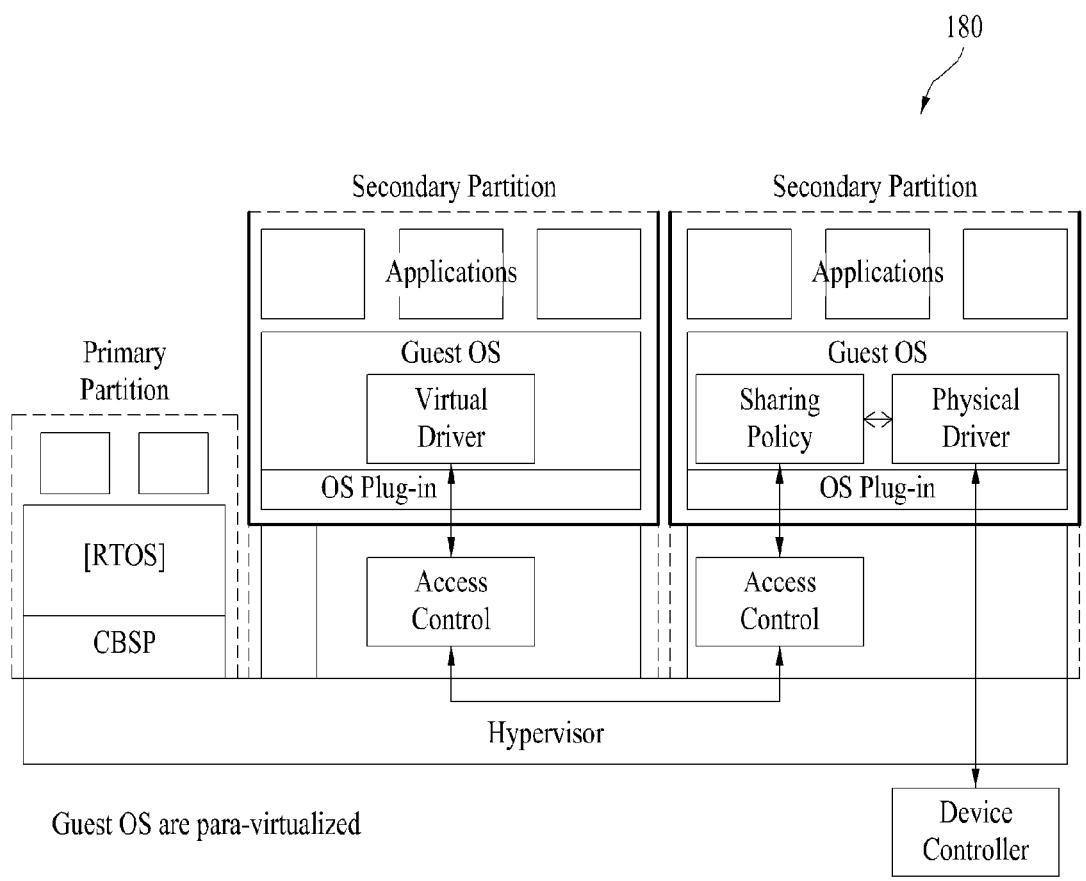

Referring to FIG. 3A, a plurality of the operating systems OS 1, . . . OS N are prepared in parallel with each other, which can be described in detail with reference to FIGS. 4A(a) and 4B as follows. FIGS. 4A(a) and 4B show a scheme of booting a plurality of operating systems Guest OS 1 and Guest OS 2 respectively supporting different modes in parallel by loading a hypervisor (hereinafter named a first scheme).

Referring to FIGS. 4A(a) and 4B, the mobile terminal 100 can implement Guest OS 1 and Guest OS 2 selectively, sequentially or simultaneously. In addition, a different mode can be designated to each of the Guest OS 1 and the Guest OS 2. In this instance, the operation of the Guest OS 1 and the Guest OS 2 and the corresponding mode activation can be performed by the hypervisor. The components shown in FIG. 4B can perform general operations related to the virtualization engine technology.

Multi-OS booting and mode activation corresponding to the multi-OS booting are described in detail as follows. First, when (1) activating a mode corresponding to the currently booted Guest OS 1 or Guest OS 2 or (2) booting the Guest OS 1 corresponding to first mode and the Guest OS 2 corresponding to a second mode sequentially or simultaneously, the controller 180 (particularly, the hypervisor) implements and activates either the first mode or the second mode (2-1) or can activate either the first or second mode despite implementing both of the first and second modes (2-2).

Referring now to FIG. 3B, the screen processor 185 includes a layout manager 185a and a display driver 185b. Under the control of the main processor 188, the layout manager 185a generates one integrated frame by combing or editing the frames received from the frame buffers and the display driver 185b then controls the frame generated by the layout manager 185a to be displayed on the display unit 151.

The driver 186 controls the operating systems to be driven. Further, the hypervisor 187 is a middleware between the main processor 188 and each of the operating systems and includes a virtualization engine configured to a plurality of the operating systems to be usable in the mobile terminal 100 according to an embodiment of the present invention. In addition, the main processor 188 controls all operations related to the driving of a plurality of the operating systems according to an embodiment of the present invention.

As mentioned in the above description, the screen processor 185, the driver 186, the hypervisor 187 and the main processor 188 can be included in the controller 180 or can be stored as software in the memory 160.

Next, FIG. 3C is a block diagram of the memory 160 having a database storage region corresponding to each of a plurality of the modes. According to an embodiment of the present invention, the mobile terminal 100 can manage the database storage regions of a plurality of the modes discriminatively. In particular, when a plurality of the modes are implemented by the different operating systems, respectively, the mobile terminal 100 can manage the database storage regions of a plurality of the modes discriminatively.

Generally, when at least one operating system capable of implementing a first mode and a second mode is provided, the memory 160 can store an application corresponding to each of the at least one operating system. Therefore, the provided operating systems can be booted selectively or simultaneously under the control of the controller 180.

For instance, the operating system can include such a commercial OS as Android OS, Linux based OS, Windows Mobile OS, Apple OS and the like. In addition, a dedicated application can be differently set for each of the operating systems. In addition, a multi-OS can include different kinds of operating systems (e.g., Android OS, Apple OS, etc.) and the same kinds of operating systems (e.g., 2.1 version of Android OS, 2.2 version of Android OS, etc.) differing from each other in version.

According to an embodiment of the present invention as shown in FIG. 3C, assuming that both the first mode and the second mode can be implemented, the memory 160 can include a first database storage region 160(a) corresponding to the first mode, a second database storage region 160(b) corresponding to the second mode, and a common database storage region 160(c) in common with the first mode and the second mode. Occasionally, the common database storage region 160(c) can be omitted. In this instance, a commonly-designated application and content or data associated with the corresponding application can be stored in the database storage region of the corresponding mode.

In particular, in configuring the first, second and common database storage regions, the mobile terminal 100 uses memories different from each other in hardware as the storage regions, puts restriction on accessing the storage regions per mode despite providing the storage regions within a same memory, or can discriminate the storage regions from each other using a storage partition per mode.

In this instance, the same operating system implements the first mode and the second mode or different operating systems can implement the first mode and the second mode, respectively. Moreover, at least two or modes can be implemented by the mobile terminal 100. If so, the database storage regions can be further subdivided.

In particular, the first database storage region 160(a) can include a region (i.e., a first application region) for storing at least one first application executable in the first mode, a region (i.e., a first content region) for storing a content associated with the first application and a region (i.e., a first data region) for storing data associated with the first application.

In addition, the second database storage region 160(b) can include a region (i.e., a second application region) for storing at least one second application executable in the second mode, a region (i.e., a second content region) for storing a content associated with the second application and a region (i.e., a second data region) for storing data associated with the second application.

Moreover, the common database storage region 160(c) can include a region (i.e., a common application region) for storing at least one common application executable in both of the first mode and the second mode, a region (i.e., a common content region) for storing a content associated with the common application and a region (i.e., a common data region) for storing data associated with the common application.

When the second mode is a business mode that facilitates a user's public life, information stored in the second database storage region 160(b) and information corresponding to the second mode in the common database storage region 160(c)

can be utilized only if the corresponding information is stored by being shared with a company server 300, the corresponding information is stored in the company server 300 (i.e., the second database storage region 160(*b*) is unnecessary) or the company server 300 is accessed. In this instance, the company server 300 can include a server of a company, for which a user works, a server of a specific company designated by a user (or a company where the user works), or the like.

While the first mode is activated, the mobile terminal 100 can utilize the information stored in the first database storage region 160(*a*) and the information corresponding to the first mode in the common database storage region 160(*c*). While the second mode is activated, the mobile terminal 100 can utilize all the information stored in the first, second and common database storage regions 160(*a*), 160(*b*) and 160(*c*).

Alternatively, while the second mode is activated, the mobile terminal 100 can utilize the information stored in the first database storage region 160(*a*) and the information corresponding to the second mode in the common database storage region 160(*c*). While the first mode is activated, the mobile terminal 100 can utilize all the information stored in the first, second and common databases storage regions 160(*a*), 106(*b*) and 160(*c*).

Optionally, the mobile terminal 100 can be set not to utilize the information on the first mode in the course of the activated second mode. Besides, although the drawing shows that the application region, the content region and the data region are situated in the database storage region, the application region, the content region and the data region can be integrated together if desired.

Next, FIGS. 4A(b) and 4C show a scheme of driving a hypervisor on a Host OS for supporting one mode to boot a Guest OS for supporting another mode (hereinafter named a second scheme). In particular, a mode supported by the Host OS can include a private mode. In addition, a mode supported by the Guest OS can include a business mode.

Figure 4C:
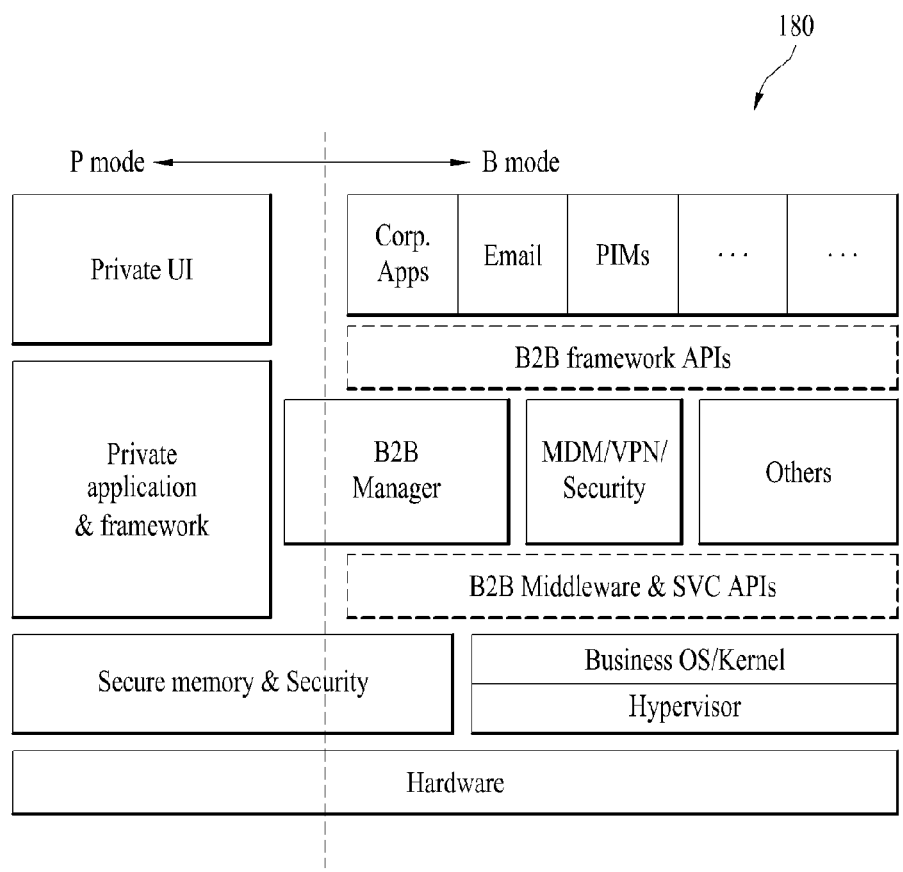

In more detail, referring to FIG. 4C, a B2B manager can perform a switching operation between a private mode (hereinafter abbreviated a P mode) and a business mode (hereinafter abbreviated a B mode). Components shown in a P mode region of the two regions partitioned by a dotted line can operate when the private mode is implemented, components shown in the B mode region can operate when the business mode is implemented, and components included in both of the modes can operate in both of the modes.

According to an embodiment of the present invention, the mobile terminal 100 can implement a plurality of modes on an operating system selectively, simultaneously or sequentially. A different operating system (hereinafter named an individual operating system) is designated to each of a plurality of the modes or a common operating system can be designated to a plurality of the modes. Specifically, implementation of a plurality of the modes can be controlled by the hypervisor 187.

In particular, a currently implemented or activated mode in accordance with an individual or common operating system is defined as follows. For clarity and convenience of the following description, assume that a plurality of modes include a first mode and a second mode. At least two or more modes can exist if desired.

First, when a common operating system is booted, the controller 180 implements and activates either the first mode or the second mode or activates either the first mode or the second mode despite implementing both of the first and second modes.

When an individual operating system is booted, the controller (1) implements and activates a mode corresponding to a currently booted individual operating system, (2) implements and activates a mode corresponding to one of the first mode and the second mode when booting a first operating system corresponding to the first mode and a second operating system corresponding to the second mode sequentially or simultaneously, or (3) activates either the first mode or the second mode despite implementing both of the first mode and the second mode.

The following description describes how to discriminate a plurality of modes from each other. First, according to an embodiment of the present invention, each of a plurality of modes can be discriminated by at least one of a mode indicator, a database storage region, an operating system, a user access authority, an application configuration, a content configuration, a data configuration, an application feature, an application group, a group identifier and the like.

Discriminating a plurality of modes using a mode indicator according to a first embodiment is explained as follows. First, each of a plurality of modes can have an indicator different to indicate a corresponding mode. An indicator per mode is basically stored in the mobile terminal 100 or can be downloaded from an external server or an external terminal. The indicator per mode is set or selected by a user or can be randomly set by the controller 180.

For instance, each of a plurality of the modes can have a different one of a mode icon, a mode image, a background image, a background color/brightness, a letter font/color/size, a home screen picture (number of pages and page indicator included), an application arrangement structure (e.g., the number of applications included in one home screen, etc.), an application identifier, an LED color, an alarm sound such as a bell sound and the like, a keypad type (backlight color of keypad included), a mode switching key zone, a group identifier (described later) and the like. These examples of the mode indicator are just exemplary and can include all display elements for discriminating a mode. This is explained in detail with reference to FIGS. 5A to 5D.

Figure 5A:
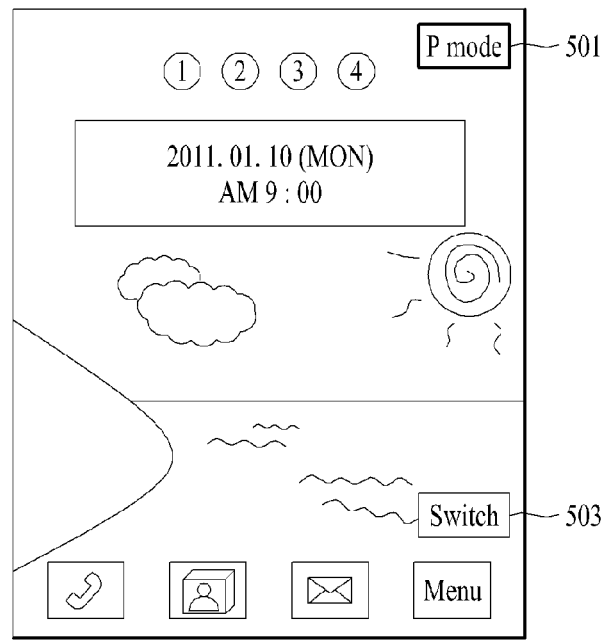
FIGS. 5A to 10C are display screens illustrating discriminating a plurality of modes according to an embodiment of the present invention.
Figure 5A:
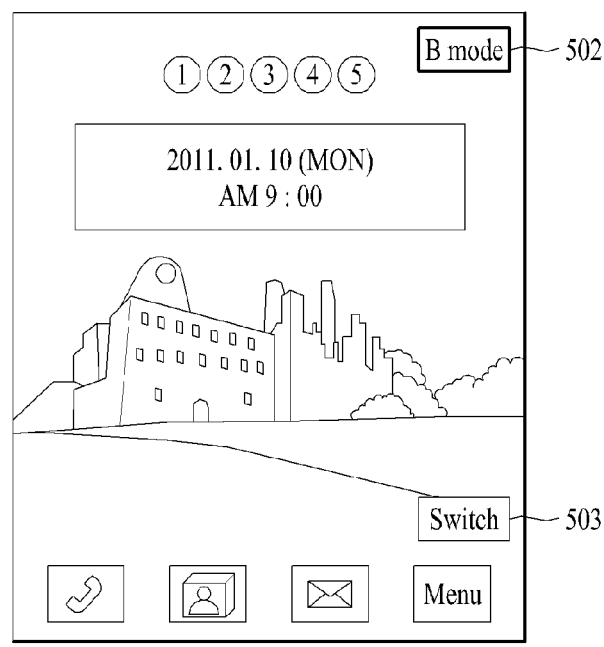

For clarity and convenience, the following description assumes the first mode is the private mode and the second mode is the business mode. Either the private mode or the business mode is also assumed to be in an active state. FIGS. 5A to 10C are diagrams for discriminating a plurality of modes according to an embodiment of the present invention. Referring to FIG. 5A, if a personal mode is currently activated, the mobile terminal 100 can display an icon (P mode) 501 corresponding to the private mode on a prescribed region of a screen (FIG. 5A(a)). If a business mode is currently activated, the mobile terminal 100 can display an icon (B mode) 502 corresponding to the business mode on a prescribed region of a screen (FIG. 5A(b)).

Figure 5B:
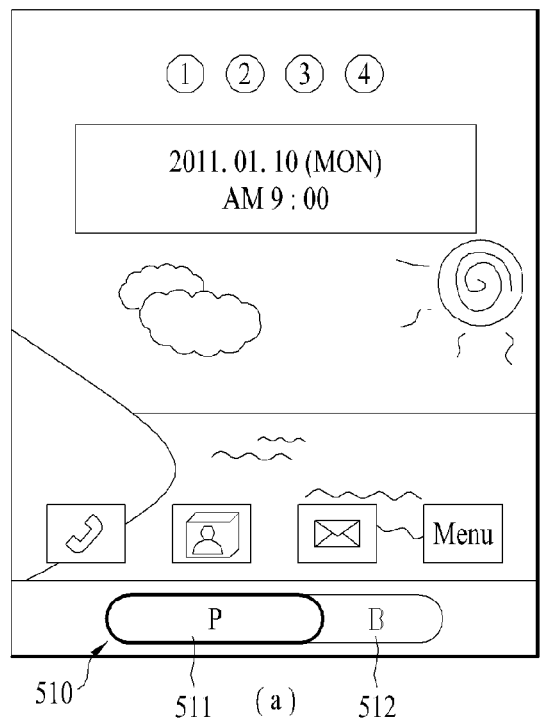
Figure 5B:
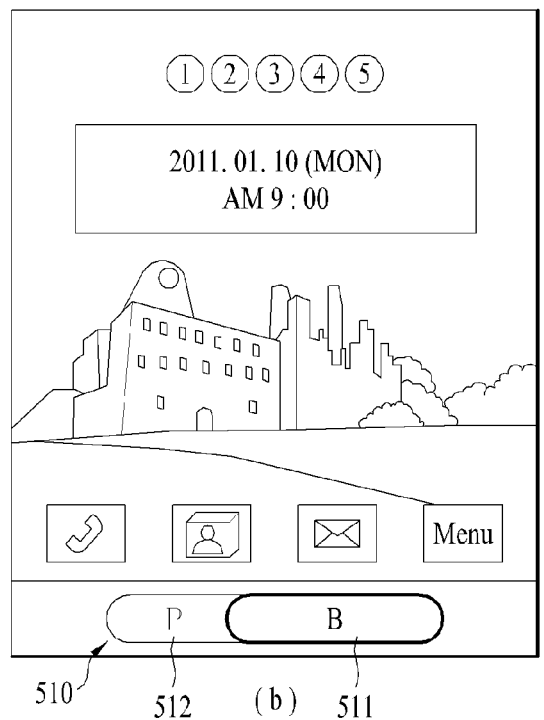

Referring to FIG. 5B, the mobile terminal 100 includes a mode switching key region 510 provided to a prescribed region of the screen. If the private mode is currently activated, the mobile terminal 100 can discriminatively display a zone (P) 511 corresponding to the private mode in the mode switching key region 510 (FIG. 5B(a)). If the business mode is currently activated, the mobile terminal 100 can discriminatively display a zone (B) 512 corresponding to the business mode in the mode switching key region 510 (FIG. 5B(b)).

Figure 5C:
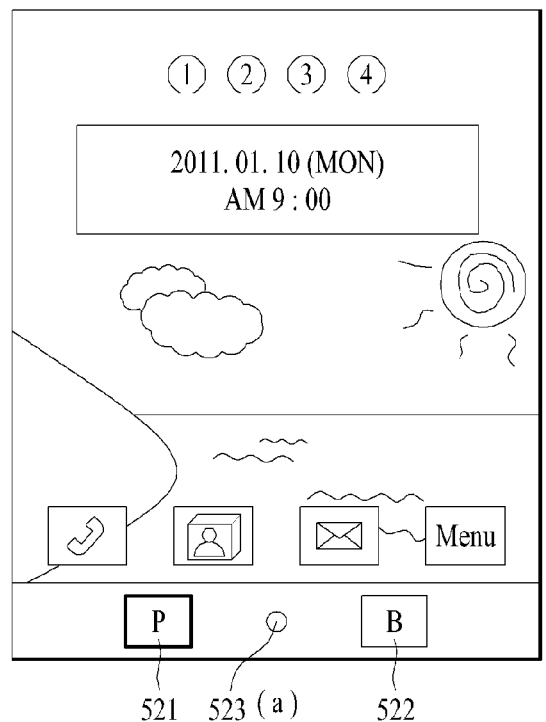
Figure 5C:
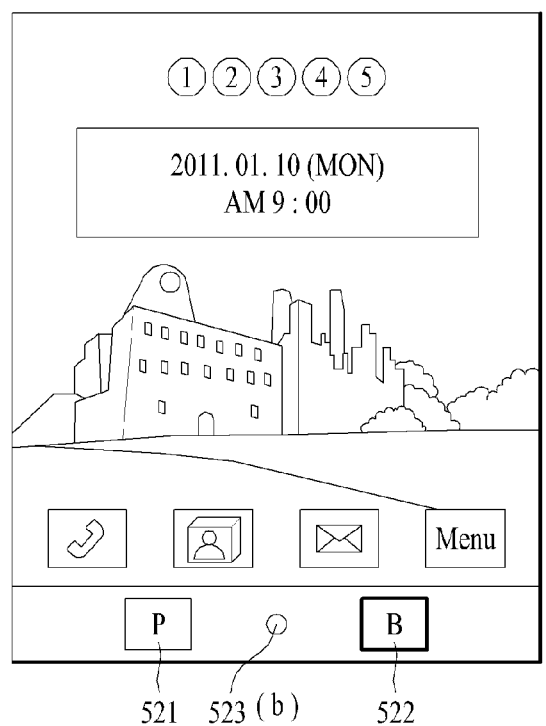

Referring to FIG. 5C, a private mode zone 521, a business mode zone 522 and a switching command zone 523 are provided to the screen of the mobile terminal 100. If the private mode is currently activated, the mobile terminal 100 can discriminatively display the private mode zone (P) 521 (FIG. 5C(a)). If the business mode is currently activated, the mobile terminal 100 can discriminatively display the business mode zone (B) 522 (FIG. 5C(b)).

Figure 5D:
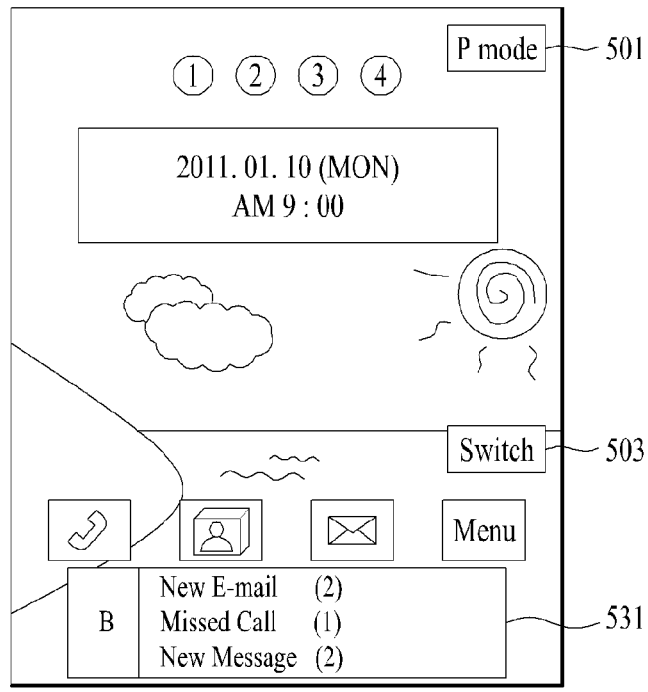
Figure 5D:
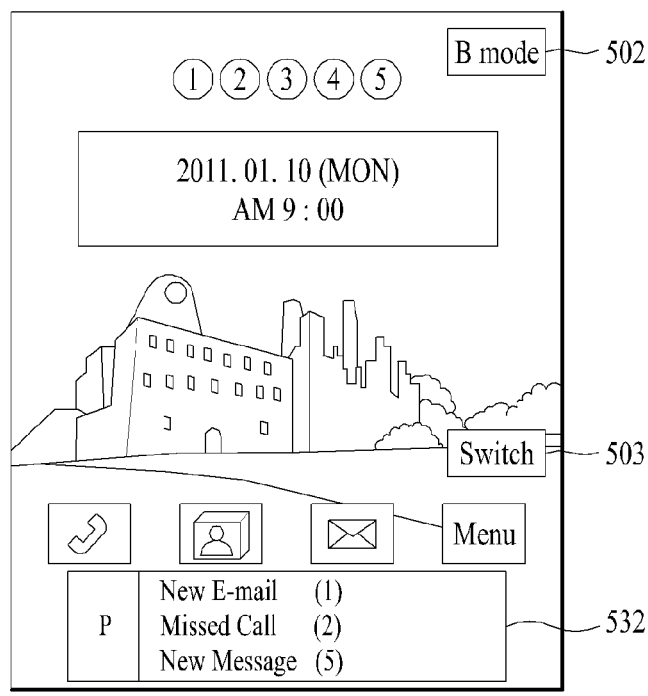

Referring to FIG. 5D, if the private mode is currently activated, the mobile terminal 100 can display an announcement window 531 for announcing events (e.g., email, message, call, etc.) occurring in association with the business mode or the number of the events (or, occurrence time, counterpart information, etc.) on a prescribed region of the screen (FIG. 5D(a)). If the business mode is currently activated, the mobile terminal 100 can display an announcement window 532 for announcing events (e.g., email, message, call, etc.) occurring in association with the private mode or the number of the events (or, occurrence time, counterpart information, etc.) on a prescribed region of the screen (FIG. 5D(b)).

The following description describes discriminating a plurality of modes using a database storage region according to a second embodiment. First, a plurality of the modes can discriminatively have database storage regions within the memory 160, respectively (FIG. 3C).

Each of a plurality of the modes can utilize the information stored in the corresponding database storage region or the corresponding information stored in the common database storage region only. Moreover, the information on one mode can be set not to be utilized in other modes. Besides, one (e.g., business mode) of a plurality of the modes can utilize information on another mode (e.g., private mode), whereas the latter mode can be set not to use the information on the former mode.

If the information on the first mode can be utilized in the second mode (yet the first mode is unable to utilize the information on the second mode), that means an access restriction has been placed on the second mode or that a higher security level has been set on the second mode. This is explained in detail later with reference to FIGS. 7A to 7B.

Figure 6A:
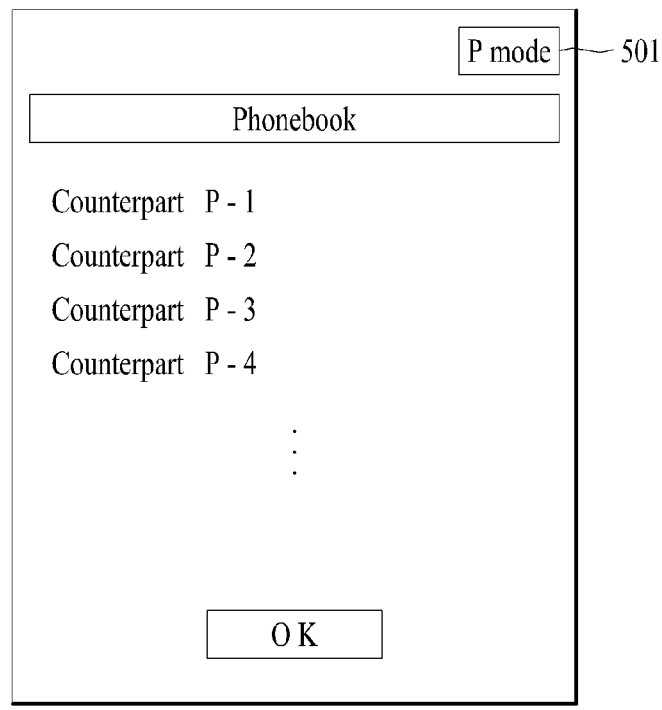

Referring to FIG. 6A, when a phonebook (example of a common application) is being executed in the private mode, the mobile terminal 100 extracts counterpart information corresponding to the private mode from counterpart information associated with the phonebook only and can then display the extracted counterpart information.

Figure 6B:
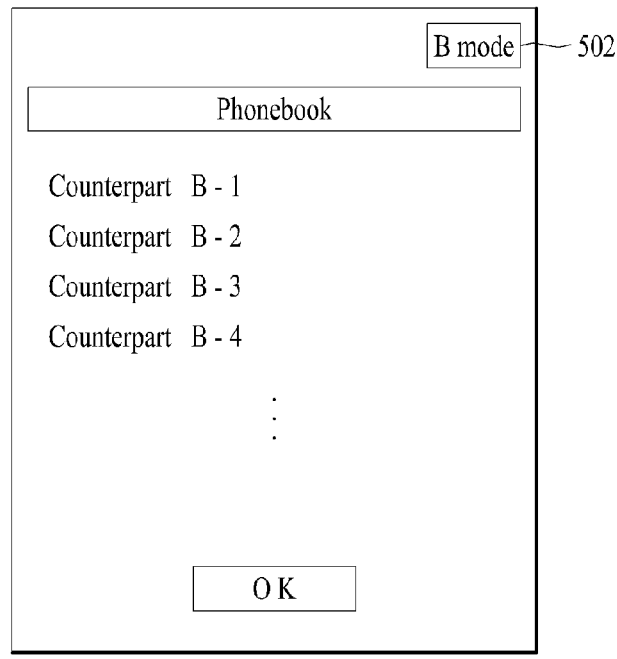
Figure 6B:
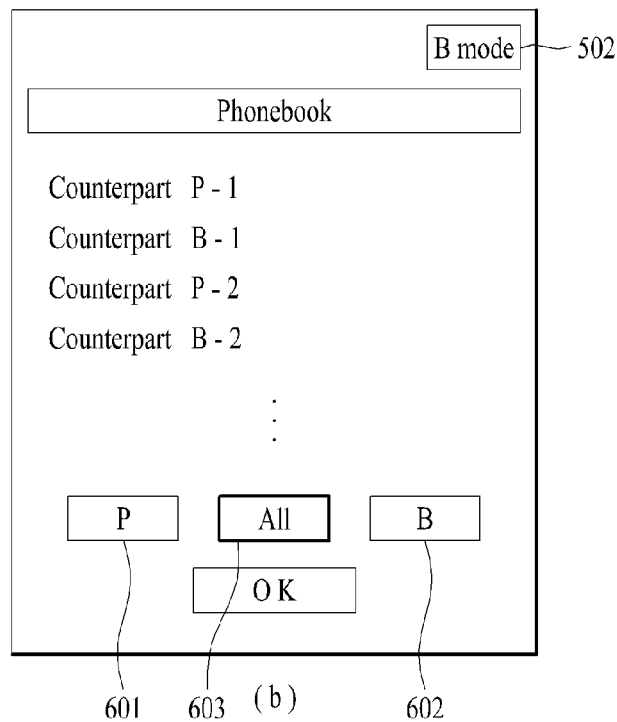

Referring to FIG. 6B, when executing a phonebook in the private mode, the mobile terminal 100 extracts counterpart information corresponding to the business mode from counterpart information associated with the phonebook and then displays the extracted counterpart information (FIG. 6B(a)). Alternatively, the mobile terminal 100 extracts counterpart information corresponding to either the private mode or the business mode and can then display the extracted counterpart information (FIG. 6B(b)).

In particular, FIG. 6B(b) shows a zone (All) 603 as activated. If a privacy zone (P) 601 is activated, the mobile terminal 100 can selectively display the counterpart information corresponding to the private mode only. If a business zone (B) 602 is activated, the mobile terminal 100 can selectively display the counterpart information corresponding to the business mode only.

Figure 7A:
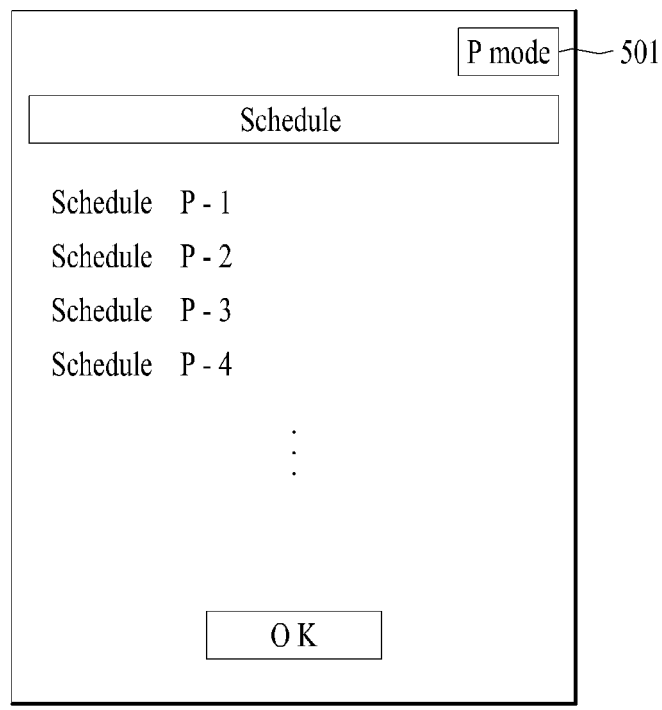

Referring to FIG. 7A, when a schedule management (example of a common application) is being executed in the private mode, the mobile terminal 100 extracts schedules corresponding to the private mode from schedules associated with the schedule management only and can then display the extracted schedules.

Figure 7B:
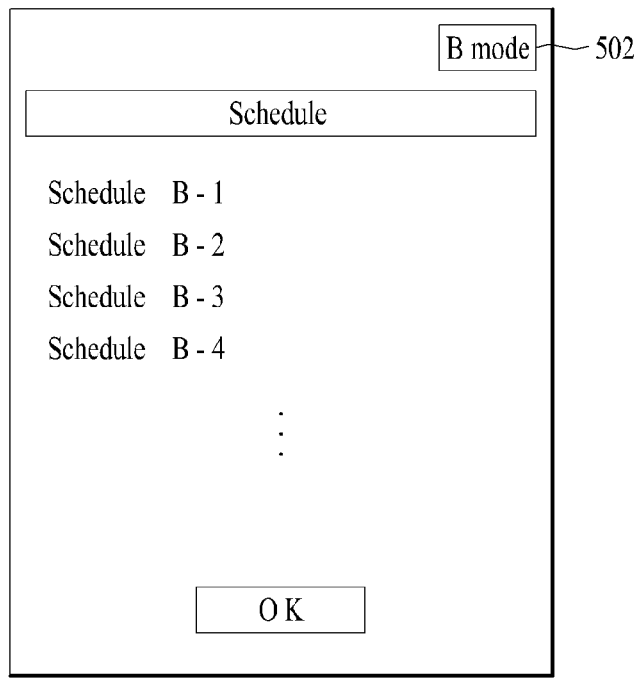
Figure 7B:
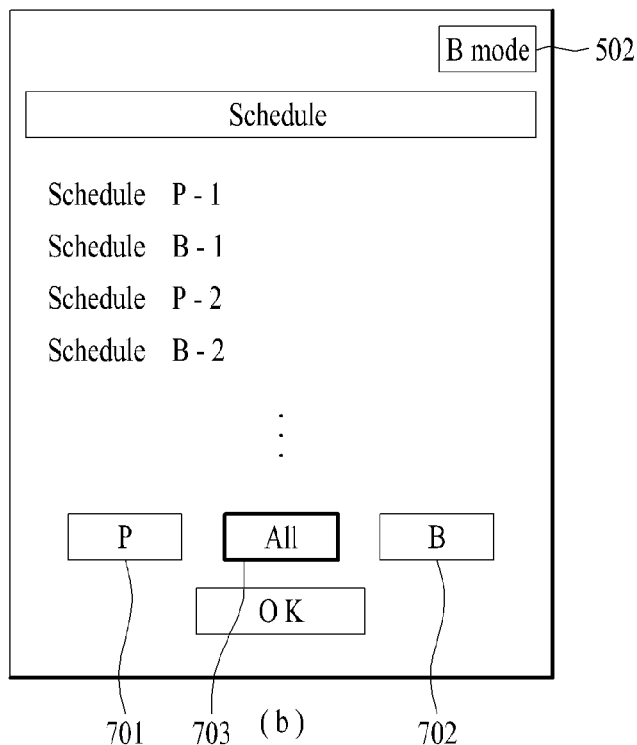

Referring to FIG. 7B, when executing a schedule management in the private mode, the mobile terminal 100 extracts schedules corresponding to the business mode from schedules associated with the schedule management and then displays the extracted schedules (FIG. 7B(a)). Alternatively, the mobile terminal 100 extracts schedules corresponding to either the private mode or the business mode and can then display the extracted schedules (FIG. 7B(b)).

In particular, FIG. 7B(b) shows a zone (A11) 703 as activated. If a privacy zone (P) 701 is activated, the mobile terminal 100 can selectively display the schedules corresponding to the private mode only. If a business zone (B) 702 is activated, the mobile terminal 100 can selectively display the schedules corresponding to the business mode only.

Specifically, referring to FIGS. 6A to 7B, although the private mode is unable to access the information on the business mode or the database storage region storing the information on the business mode, the business mode can freely access the information on the private mode or the database storage region storing the information on the private mode.

According to a third embodiment, each of a plurality of modes can be discriminated by a corresponding user access authority.

Regarding each of a plurality of the modes, as a different security level is set, a user access authority can be changed. Regarding each of a plurality of the modes, if an access restriction is put on one mode but an access restriction is not put on the other mode, a user access authority can be changed.

For this, in order to enter a specific one of a plurality of the modes, an authentication procedure can be requested. Hence, the specific mode can be entered only if a valid authentication procedure is performed to enter the specific mode. In particular, if an access restriction or a security level over a predetermined reference is put on the specific mode, an authentication procedure can be requested.

For instance, in a mode having a high user access authority, information corresponding to a mode having a low user access authority or a database storage region of the corresponding information is freely accessed and can be freely utilized. On the contrary, in a mode having a low user access authority, it is unable to access information corresponding to a mode having a high user access authority or a database storage region of the corresponding information.

When entering or switching to a mode having a high user access authority, an input of a user authentication information is requested. If a valid user authentication information is input, the mobile terminal 100 can enter or switch to the mode having the high user access authority (example of an authentication procedure). When a mode having a low security level is implemented, the mobile terminal 100 is requested to input a user authentication information (e.g., name, social security number, etc.) of a low level. When a mode having a high security level is implemented, the mobile terminal 100 is requested to input a user authentication information (e.g., name, social security number, specific touch pattern, specific password, etc.) of a high level.

Regarding management (e.g., input, inquiry, editing, etc.) of information (e.g., content, data, etc.) on an application in accordance with a user access authority, three kinds of cases are described in detail as follows. For clarity and convenience of the following description, assume that a plurality of modes include a first mode and a second mode.

According to a first embodiment, applications in which contents or data can be input regardless of a mode are possible. For instance, the content or data input application can include such an application for performing a basic function in using a terminal as a schedule management, a scheduler, an email, a message, a messenger, a conference call, a video call, an internet, a phonebook and the like.

According to a second embodiment, like the first embodiment, an information input is possible without mode discrimination. However, a database storage region can be discriminated pre mode (FIG. 3C).

In particular, inter-mode information exchange is impossible but unilateral information exchange is possible. For instance, an information transfer from a private mode to a business mode is possible but an information transfer from a business mode to a private mode is impossible. For another instance, by setting a plurality of modes to different security levels, respectively, an information transfer from a low level to a high level is possible but an information transfer from a high level to a low level is impossible.

In a specific situation, an external terminal having a predetermined authority in a remote place deletes information (e.g., application, content, data, etc.) on a specific mode only or can shut down the specific mode itself. For instance, the specific situation can include one of an employee taking out a terminal without authorization, a terminal being stolen, an unregistered storage medium being loaded into a terminal, a terminal accessing an unsubscribed network, and the like.

Furthermore, regarding a user access authority, an authority for accessing an application, a content, a data or the like, which is available for a business mode, can be differentiated in accordance with a user level (e.g., a rank in company, a duty attribute in company, a department in company, etc.) of the mobile terminal 100. In addition, a function for a specific application can be differentiated. For instance, when a user level (e.g., a group head) is equal to or higher than a predetermined reference, an approval grant function is usable. Yet, when a user level (e.g., a company employee) is lower than a predetermined reference, an approval grant function is deactivated. Moreover, the same application can have a usable content/data that differs in accordance with a user level or the same content/data can have a different range of the provided information in accordance with a user level (e.g., a different data field can be configured in accordance with a user level). Besides, in accordance with a user's authority, an icon associated with a job failing to belong to the corresponding authority is not displayed on a terminal itself Even if the icon is displayed on the terminal, it can be set not to be executed.

According to a third embodiment, applications (e.g., dedicated applications) accessible to corresponding information as well as operable in either a first mode or a second mode are possible. For instance, for security matters in a business mode, a photographing function is restricted, a conditional access to a network is granted, or a print function is blocked. When the business mode is implemented, a business related application is provided. Whereas in the private mode, the business related application may not be provided. When the private mode is implemented, a privacy-related application is provided. Whereas in the business mode, the privacy-related application may not be provided.

Meanwhile, a content or application specialized in a unilateral mode only is possible. For instance, the application specialized for the business mode can include a company business related application. In addition, the company business related application can perform a function of an upload to a company server, a function of a download to the company server and the like.

In addition, an access restriction (or entry) per mode can be set in accordance with a place or time. For instance, a business mode can be set not to be entered at home. In another instance, a private mode can be set not to be entered within a specific time zone. Occasionally, a separately authorized person can enter the business mode at home or the private mode at the office within a specific time zone. Moreover, because an interface is provided to be shared with users in the business mode, information can be shared with the users. If the business mode is switched to the private mode, the interface provided for the information sharing can be shut down.

Furthermore, one hardware module (e.g., a common module) usable for a plurality of modes in common or another hardware module (e.g., a dedicated module) usable for a specific one of a plurality of the modes is possible. Hence, if a first mode is currently activated, a common module and a dedicated mode of the first mode are activated, while a dedicated module of a second module is not activated. In this instance, the common module and the dedicated module are designated in accordance with a user selection or can be designated by a decision made by the controller 180 or the company server 300.

For instance, assuming that a first mode and a second mode are a private mode and a business mode, respectively, a common module can include one of the mobile communication module 112 for call and message transmission and reception, the power supply unit 190, the display unit 151, the memory 160 and the like. A dedicated module of the private mode can include one of the camera 121, the position location module 115 and the like. In addition, a dedicated module of the business mode can include the projector module 155 or the like. The above examples of the communication module and the dedicated module are just exemplary, by which the communication module and the dedicated module are non-limited. In addition, the communication module and the dedicated module can be configured in other various ways.

In the following description, a user access authority is explained in detail with reference to FIGS. 8A and 8B. For clarity and convenience of the following description, assume that the same content is accessed.

Figure 8A:
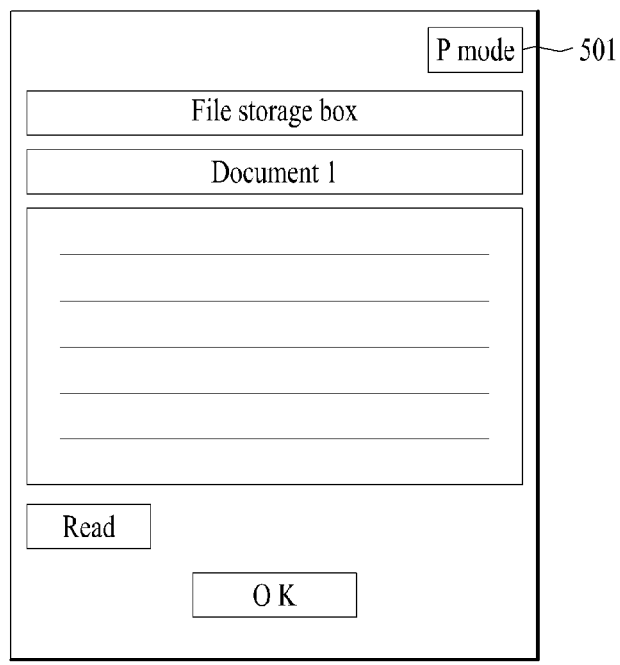
Figure 8A:
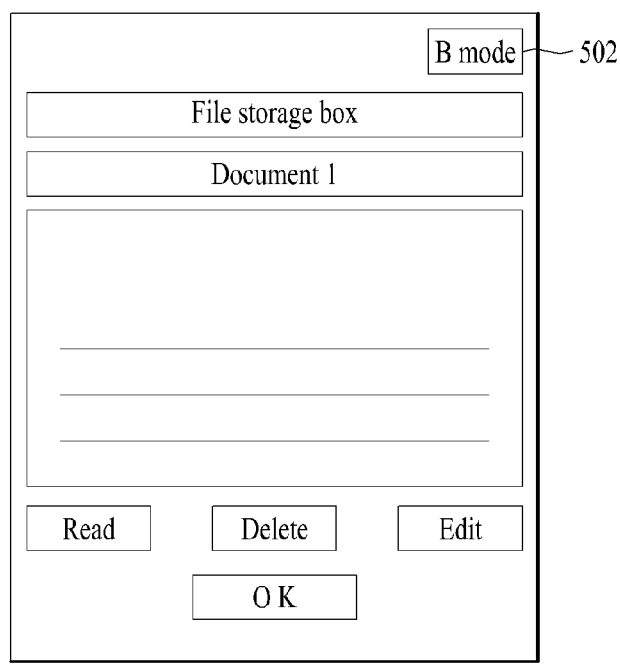

Referring to FIG. 8A, when a document 1 (example of content) is accessed in a private mode, the mobile terminal 100 can grant 'read authority' for the document 1 (FIG. 8A(a)). When a document 1 is accessed in a business, the mobile terminal 100 can grant 'read authority, delete authority, edit authority' for the document 1 (FIG. 8A(b)). Moreover, if a user is authorized over a predetermined level in a company, an approval authority can be granted to the user for the document 1 that requires approval or authorization.

Figure 8B:
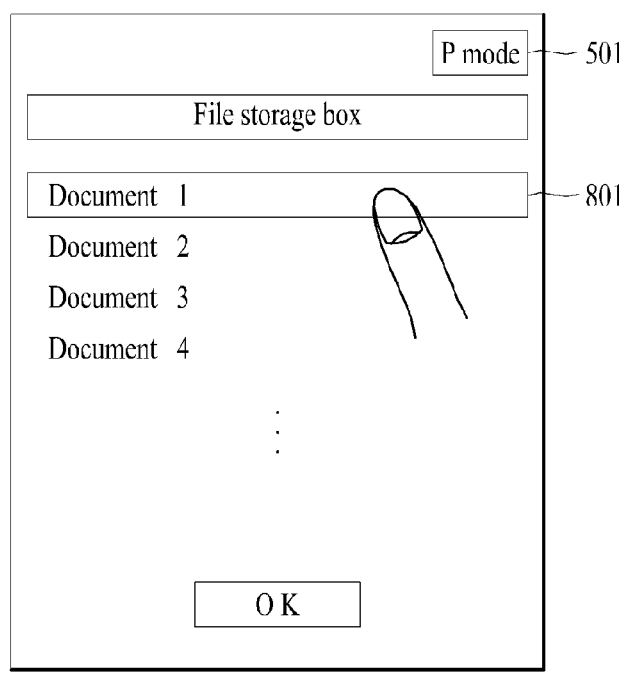
Figure 8B:
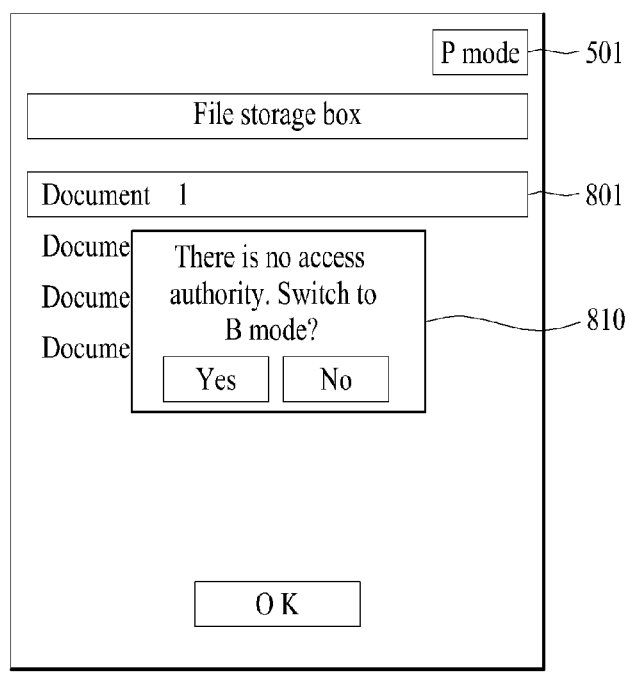

Referring to FIG. 8B, when a file 1 (example of content) corresponding to a business mode is selected from a file list in a private mode (FIG. 8B(a)), the mobile terminal 100 informs a user that there is no access authority on the file 1 and enables the user to select whether to switch the private mode to the business mode to check the file 1 (FIG. 8B(b)).

When implementing the private mode in FIG. 8B, a file corresponding to the business mode may not be included in the file list. In addition, an indicator indicating whether the file corresponds to the privacy or business mode can be displayed on the file list. Although the user access authority is set per mode in the above description, it can be set per application, content or data if desired. Therefore, a user authorized with the user access authority can check the same content, whereas an unauthorized user is unable to check the same content.

According to a fourth embodiment, each of a plurality of modes can be discriminated in accordance with at least one of an application configuration, a content configuration and a data configuration. Each of a plurality of the modes can configure an application differently per mode. Even if an application is a common application, each of a plurality of the modes can configure a content or data corresponding to the application differently.

Figure 10A:
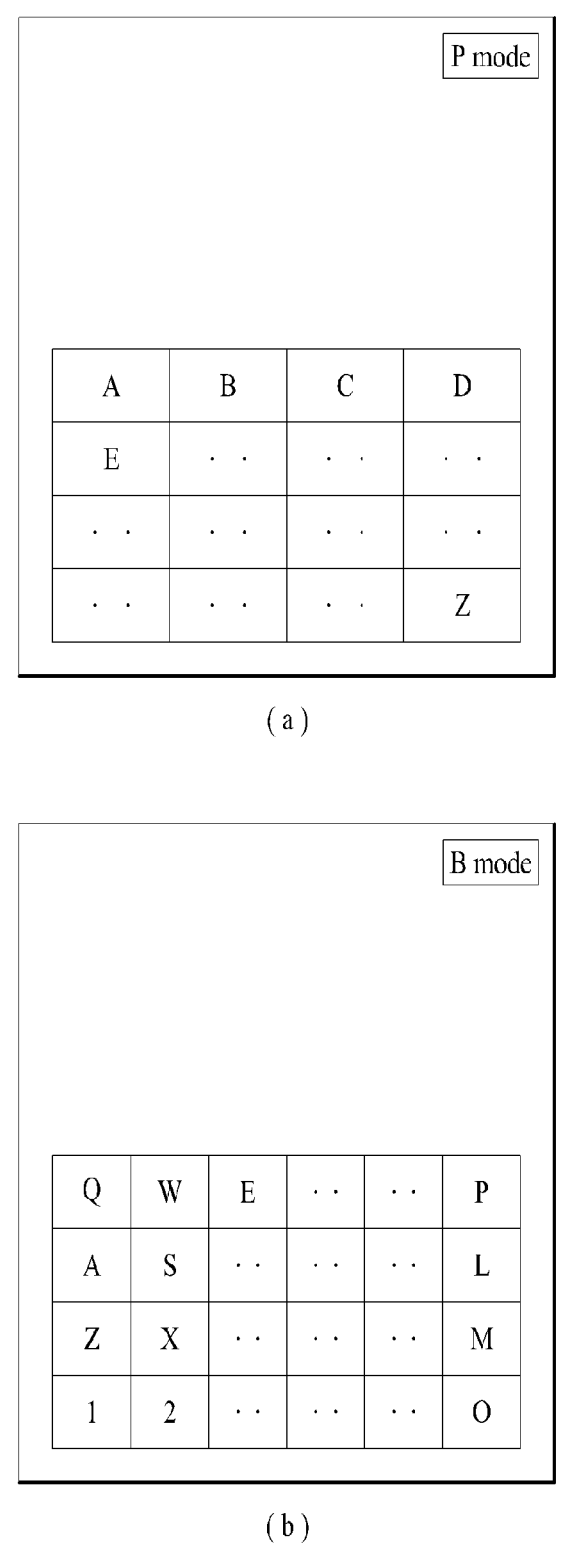
Figure 10B:
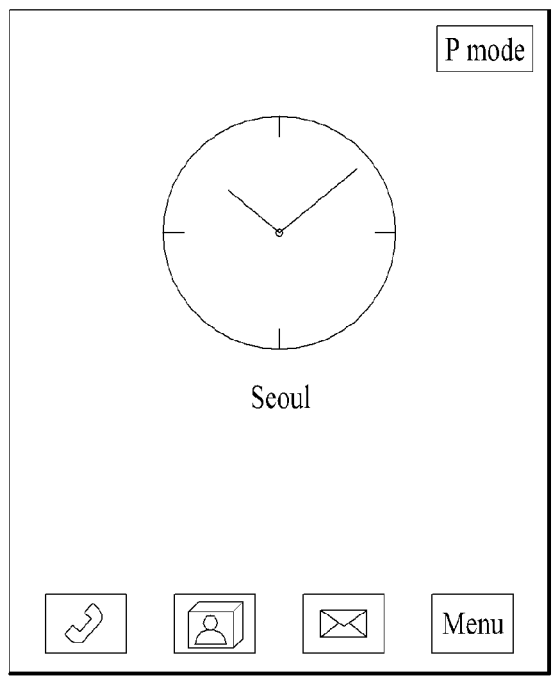
Figure 10B:
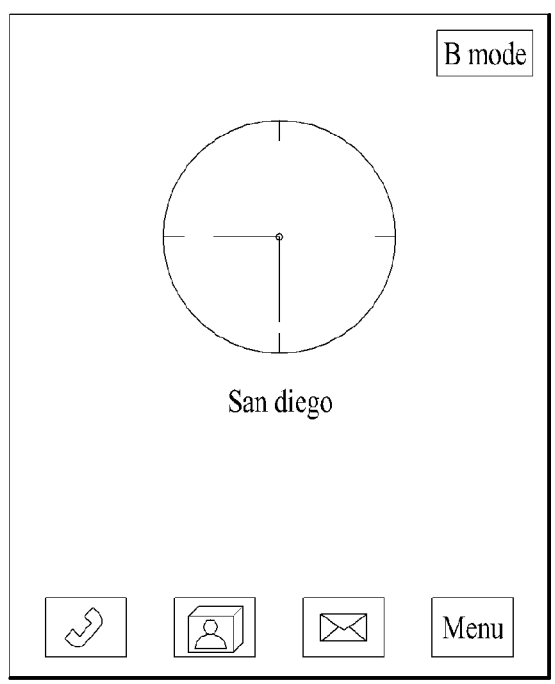
Figure 10C:
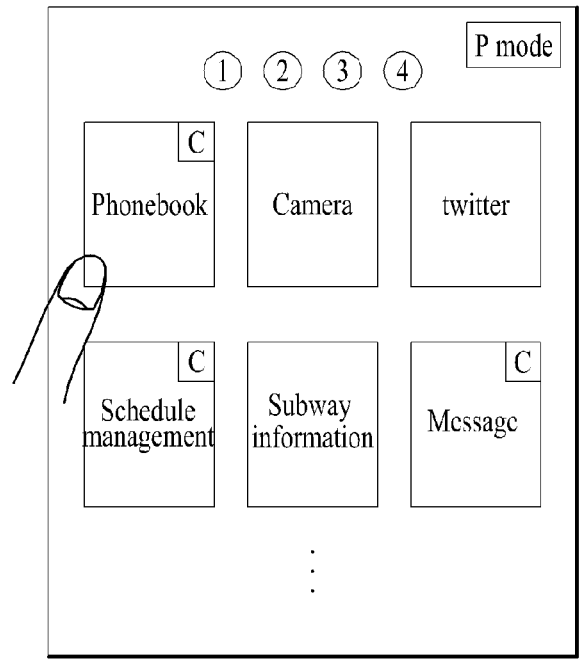
Figure 10C:
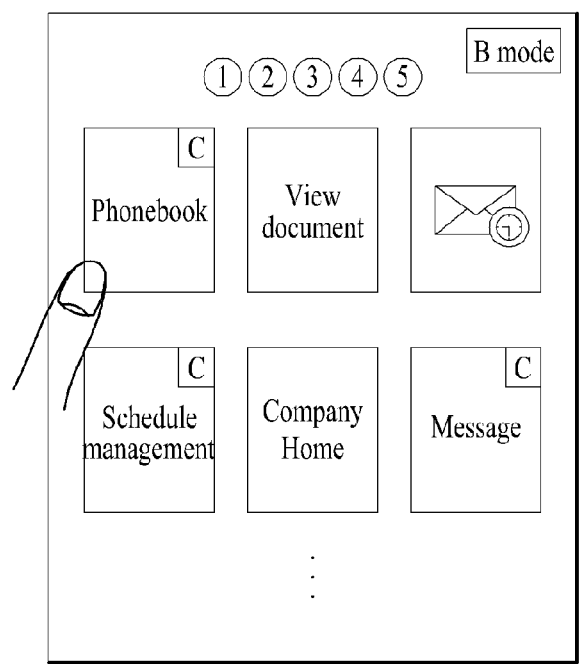

In this instance, the configuration of the application being different means that at least one application (hereinafter named a first dedicated application) dedicated to a first mode and at least one application (hereinafter named a common application) in common with the first mode and a second mode are executed in the first mode or that at least one application (hereinafter named a second dedicated application) dedicated to the second mode and at least one application (hereinafter named a common application) in common with the first mode and the second mode are executed in the second mode (FIG. 10C).

The configuration of the content/data being different can include both a substance of the content/data being different and a substance of the content/data being different in part. Specifically, the latter case can mean that a substance of a specific content corresponding to each of the first mode and the second mode is different even if the specific content is designated to both of the first mode and the second mode. This is enabled by configuring a data field differently per mode for the same content or data.

Figure 9A:
Figure 9A:

This is explained in detail with reference to FIGS. 9A and 9B as follows. Referring to FIG. 9A, in storing the same counterpart information, the mobile terminal 100 designates different contacts 911 and 921 and different emails 912 and 922 to a private mode and a business mode, respectively, further designates a blog address 913 and a birthday information 914 to the private mode, and further designates an approval authority 923, a rank 924 and a department 925 to the private mode.

Referring to FIG. 9B, in storing the same schedule, even if a content and participant information 931 and a content and participant information 941 are identically designated to a private mode and a business mode, respectively, the mobile terminal 100 can further designate a time information 932 to the private mode and is also able to further designate a conference room information 942 and a notification 943 to the business mode.

The mobile terminal 100 can set a keypad type differently per mode (FIG. 10A) or can set a time zone differently per mode (FIG. 10B). The mobile terminal 100 can set a different application and a different backup level of information associated with the application per mode. For instance, the mobile terminal 100 backs up information of a recent week in the private mode and can back up information of a recent month or real-time information in the business mode. The backup level per mode is set by a user or can be randomly set by the controller 180.

In particular, in the business mode, if a counterpart terminal is not in the business mode or a working hour (or a holiday) currently in consideration of a status (e.g., a currently activated mode, a current location, a time zone, etc.) of the counterpart terminal, with which the mobile terminal 100 currently attempts to contact, the mobile terminal 100 informs a user of the unavailability of the counterpart terminal to enable the user to select whether to make a contact. In doing so, the mobile terminal 100 can receive information indicating the status of the counterpart terminal from the counterpart terminal or a company server and can then obtain the status of the counterpart terminal using the received information.

In the business mode, all previously stored schedules can be modified to a currently belonging time zone by reflecting a current time zone (when a time zone is changed).

When there is no user input action made for a predetermined period of time in the business mode, the business mode can be locked or shut down automatically or in accordance with a user selection. In this instance, in order to unlock the locked state or cancel the shutdown, a user authentication information corresponding to the business mode is input or an authentication should be granted by the company server. Moreover, in the business mode, when an overseas roaming function is loaded on a user terminal, if a current location of a user is domestic, the overseas roaming function is automatically deactivated. If a current location of a user is overseas, the overseas roaming function can be automatically activated.

According to a fifth embodiment, when at least one common application is executed, each of a plurality of modes can vary its feature to correspond to a currently activated mode. In other words, when a specific application is a common application of a first mode and a second mode, the feature of the specific application can vary in accordance with whether the currently activated mode is the first mode or the second mode.

In this instance, a feature varying per mode means that a configuration (e.g., a corresponding content/data configuration included), display or security of an application is varied. For instance, a feature varying per mode means that a structure (e.g., configuration of a corresponding menu item) of an application, an executed screen (e.g., background image, letter type, letter size, provided information, etc.) of an application, a configuration of content/data associated with an application (FIG. 9A, FIG. 9B), an application function, a security of an application (content, data, etc.) or the like is different per mode. As the examples of the application features are just exemplary, any situation in which a common application is configured to be different per mode is applicable to the present embodiment.

For instance, when the application function is different, a photographing function is allowed to a camera in a private mode but may not be allowed in a business mode. In another instance, when an authority of access to an application is different, a phonebook provides a counterpart name, a phone number and a personal email address in a private mode and can further provide a company email address, a rank, a department and an approval authority information in a business mode.

This is explained in detail with to FIG. 10C as follows. Referring to FIG. 10C, the mobile terminal 100 can receive an input of an execution command signal for executing a phonebook (i.e., an example of a common application) from a user.

The mobile terminal 100 determines a mode activated at the input timing point of the execution command signal. If a private mode is currently activated, the mobile terminal 100 executes the phonebook in accordance with a feature corresponding to the private mode and then displays an executed screen of the phonebook (FIG. 6A or FIG. 9A(a)). On the contrary, if a business mode is activated, the mobile terminal 100 executes the phonebook in accordance with a feature corresponding to the business mode and then displays an executed screen of the phonebook (FIG. 6B or 9A(b)).

For instance, a situation in which a security of an application is different is explained as follows. First, when attempting to execute a common application in a first mode, either an authentication procedure is not requested or a low-level security set authentication information can be input. Yet, when attempting to execute a common application in a second mode, an authentication procedure is requested or a high-level security set authentication information should be input. In doing so, the application execution can include an output of content or data associated with the application as well as an executed screen display of the application.

According to a sixth embodiment, a plurality of modes can be discriminated from each other using user information corresponding to the modes, respectively. In this instance, the user information can include a user name (or title), a user image, a user phone number, a user email address, a user blog address and the like.

For instance, first and second user information different from each other can be set for first and second modes, respectively. In particular, when a first phone number and a second phone number (e.g., dual SIM) are assigned to the mobile terminal 100, the first phone number and the second phone number can be set for the first mode and the second mode, respectively.

In the above description, the definitions of the modes mentioned in the disclosure are explained. In addition, when a plurality of modes exist, the method of discriminating a plurality of the modes is explained as well. According to a seventh embodiment, each of a plurality of modes can be discriminated by an application group including at least one application executed in the corresponding mode.

For instance, when at least one application is executable in each of a plurality of modes, the controller 180 can configure an application group including executable application(s) per mode. Moreover, the application group can be configured in accordance with an application type as well as the corresponding mode. For example, if an application type is a call, call related applications are included in the corresponding application group. If an application type is a camera, camera related applications can be included in the corresponding application group.

Moreover, the mobile terminal 100 displays a per-mode group identifier corresponding to a per-mode application group on the screen. If a specific group identifier is selected, the mobile terminal 100 can display indicators of applications belonging to the corresponding application group or can switch a current mode to a mode corresponding to the specific group identifier (assuming that it is not a currently activated mode).

Figure 11:
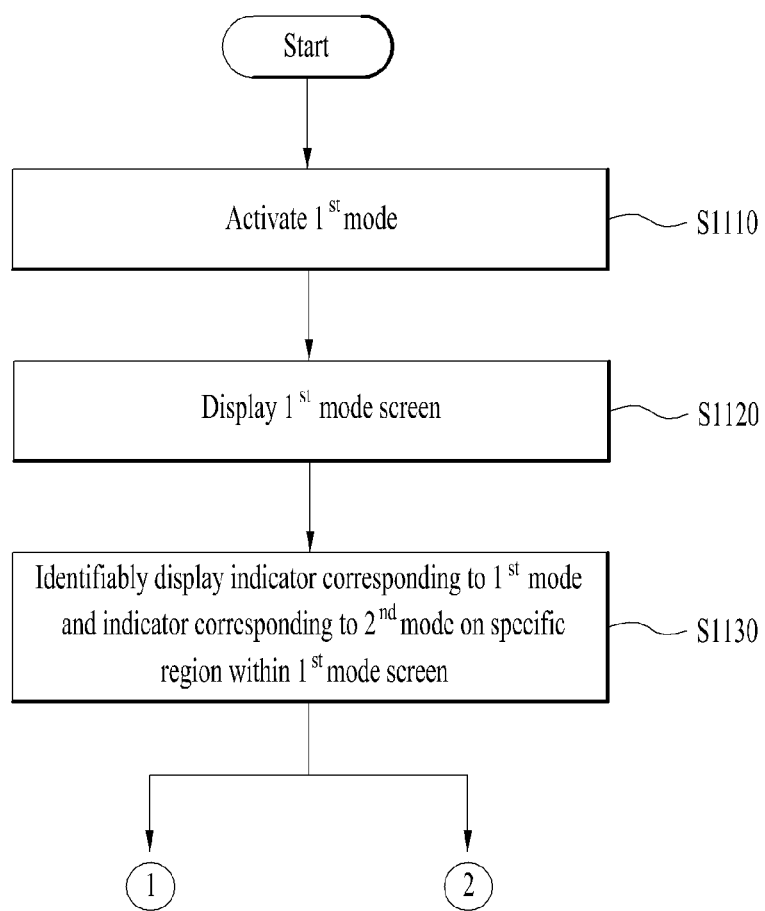
FIGS. 11 to 13 are flowcharts illustrating a display controlling method in a mobile terminal according to one embodiment of the present invention.

Next, FIG. 11 is a flowchart illustrating a display controlling method in a mobile terminal according to one embodiment of the present invention. In particular, FIG. 11 shows a process for identifiably displaying an indicator corresponding to each of a first mode and a second mode within a specific region.

For clarity and convenience of the following description, a plurality of modes are limited to the first mode and the second mode. Further, an application executable in both of the first mode and the second mode is called a common application, and an application executable in either the first mode or the second mode is called a dedicated application. For instance, a dedicated application of the first mode is named a first dedicated application, and a dedicated application of the second mode is named a second dedicated application.

Referring to FIG. 11, while the first mode and the second mode are implemented, the controller 180 activates the first mode (S1110).

In doing so, if an operating system is designated per mode, the controller 180 can implement the first mode and the second mode using a first individual operating system and a second individual operating system (i.e., a first OS and a second OS in a multi-OS) corresponding to the first mode and the second mode, respectively. If an operating system per mode is common, the controller 180 can implement the first mode and the second mode using a common operating system (i.e., a single OS).

In the first mode activating step S1110, the mobile terminal 100 can execute a common application or a dedicated application in accordance with a feature corresponding to the first mode. For instance, when the first mode and the application are a private mode and a phonebook, respectively, the mobile terminal 100 can display a counterpart information list including counterpart information associated with the private mode or a specific counterpart information including a data field corresponding to the private mode.

In the following description, a mode implemented for OS booting per multi-Os type (see FIGS. 4A to 4C) is explained.

For instance, multi-OS types can include a first multi-OS type (e.g., Guest OS 1 and Guest OS 2 included: This type corresponds to a first scheme) and a second multi-OS type (e.g., Host OS and Guest OS: This type corresponds to a second scheme.). Assume that Guest OS 1 and Host OS correspond to a private mode, and assume that Guest OS 2 and Guest OS correspond to a business mode.

Also, according to the first multi-OS type, if the hypervisor included in the controller 180 is driven, the mobile terminal 100 can boot Guest OS 1 and Guest OS 2 simultaneously or sequentially. If a specific one of the private mode and the business mode is selected by the user or the controller 180, the mobile terminal 100 activates the specific mode on the Guest OS corresponding to the selected specific mode and can then execute a corresponding application in the activated specific mode. Meanwhile, when the specific mode selecting step is omitted, the mobile terminal 100 can activate the private mode using the Guest OS 1 designated as default.

According to the second multi-OS type, the controller 180 preferentially boots the Host OS corresponding to the private mode and can then preload the Guest OS corresponding to the business mode. The mobile terminal 100 activates the private mode on the Host OS and can then execute the application in the private mode.

Moreover, when the Guest OS preloaded by the hypervisor is booted, the controller 180 activates the business mode on the Guest OS and can then execute the corresponding application in the business mode. Meanwhile, when post-loading the Guest OS, if the hypervisor is driven to load the Guest OS, the controller 180 can post-load the Guest OS.

In doing so, when preloading the Guest OS, an initial OS booting takes a considerable time. However, since two operating systems are already booted after completion of the booting process, a mode switching process can be quickly performed. When post-loading the Guest OS, an initial OS booting is quickly performed. However, when switching a current mode to a mode corresponding to the Guest OS, it may take a considerable time for the mode switching process due to the time consumption attributed to the Guest OS booting.

The Guest Os loading process is described in detail as follows. First, the mobile terminal 100 downloads an application corresponding to the Guest OS from a server for managing and providing applications, executes the downloaded application, and can then load the Guest OS. Subsequently, as the loaded Guest OS is booted, the mobile terminal 100 can activate the business mode corresponding to the Guest OS.

Referring now to FIG. 11, in the activating step S1110, the controller 180 can activate either the first mode or the second mode in accordance with the user selection or a prescribed reference for an operating system booting. The activation of the first mode described in the activating step S1110 is just one example of the selective activation and does not mean that the first mode is preferentially activated.

For instance, for the single OS, any one of the first and second modes can be activated in accordance with the single OS booting process. In another instance, for the multi-OS, a mode selected by the user from the first mode and the second mode or a firstly OS-booting completed one of the first mode and the second mode is activated in accordance with the booting of the multi-OS. In particular, for the sequential booting of the multi-OS, the controller 180 can preferentially boot the OS, which meets a prescribed condition. For instance, the controller 180 can preferentially boot the OS that meets one of the conditions such as an OS having a preferential booting order, an OS designated by the user to be preferentially booted and an OS supporting a mode corresponding to a current terminal status.

After the first mode is activated, the controller 180 displays a screen (hereinafter named a first mode screen) of the first mode using the display unit 151 (S1120). In the following description, the display unit 151 is limited to a touchscreen, and the same reference number '151' of the display unit 151 is given to the touchscreen as well. Further, the first mode screen can include at least one of an executed screen of an application executed in the first mode, a screen (e.g., a home screen, a menu screen, etc.) containing indicators of applications executable in the first mode, a screen containing a widget executed in the first mode, a configuration setting screen for setting an execution configuration of the first mode and the like, by which the present invention is non-limited. Also, any screen displayed in a first mode activated state can be called a first mode screen.

Specifically, when the first mode screen includes a plurality of pages, the first mode screen displayed in the displaying step S1120 can include a specific one of a plurality of the pages. Of course, a page turning action can be performed between the pages. The controller 180 also displays at least one indicator (hereinafter named a first mode corresponding indicator) indicating at least one application executed in the first mode and at least one indicator (hereinafter named the second mode corresponding indicator) indicating at least one application executed in the second mode on a specific region of the first mode screen (S1130).

If the mobile terminal 100 is in a mode screen display status, the mobile terminal 100 can designate an application, of which indicator is set to be provided to the user all the time despite that the mobile terminal 100 is not in an application search status currently. In addition, the mobile terminal 100 can display the indicator of the designated application on a specific region all the time. Meanwhile, the indicator many not be displayed in the executed status of the corresponding application.

In addition, the designation of the application is performed in accordance with one of the user selection, the user preference, an application use frequency and the like or a basic application (e.g., call, message, internet, etc.) can be automatically designated. Further, an application, of which indicator is displayed on a specific region, can be called a start application or a launcher application.

Moreover, the mobile terminal 100 can set an application, which will be displayed on a specific region, on each of the first mode and the second mode. Hence, no matter which one of the first mode and the second mode is activated, the mobile terminal 100 can display an indicator of the application set on each of the first mode and the second mode on the specific region.

In the displaying step S1130, the controller 180 sets a partial region, on which an indicator corresponding to a currently deactivated second mode will be stationarily displayed, within the specific region. The controller 180 can also display the indicator corresponding to the second mode within the set partial region. Moreover, even if an indicator scroll action (explained later) is performed, the indicator corresponding to the second mode can be displayed within the set partial region only and a scroll action on the indicator corresponding to the second mode can be performed within the set partial region only. Besides, if a partial region is fixed, an indicator scroll action may not be performed.

An indicator displayed on a specific region can be configured by the controller 180 by differing in accordance with what kind of a mode is currently activated. This is described in detail as follows. For clarity and convenience of the following description, assume that an indicator corresponding to the first mode and an indicator corresponding to the second mode are displayed on a specific region.

If the first mode is currently activated, the mobile terminal 100 displays an indicator of an application, which is designated to be displayed on a specific region, as an indicator corresponding to the first mode and can display an indicator of a random one (according to application sorted order) of applications executable in the second mode, an indicator of an application having an executed frequency over a predetermined reference, an indicator of a basic application, an indicator of an application designated to a preferred application by the user, an indicator of a finally executed application, or an indicator of an application having a currently occurring event or an unidentified event as an indicator corresponding to the second mode. This is applicable to the second mode activated state.

Moreover, under the control of the controller 180 or in accordance with the user selection, the mobile terminal 100 can change a region display scheme of a position, size and color of a specific region and the like and can change an indicator display scheme of the number (particularly, the number of indicators corresponding to each of the first mode and the second mode) of applications displayed on a specific region, an indicator size, an indicator shape, an indicator position, an indicator order and the like.

In the displaying step S1130, the controller 180 can identifiably display an indicator corresponding to the first mode displayed on the specific region and an indicator corresponding to the second mode displayed on the specific region. This is to indicate that the indicator corresponding to each of the first mode and the second mode corresponds to which mode. Moreover, the controller 180 identifiably displays whether the indicator displayed on the specific region indicates a common application or a dedicated application. In particular, the controller 180 can identifiably display that the dedicated application corresponds to which one of the first mode and the second mode.

For instance, the controller 180 partitions the specific region into a first region and a second region and can then display the indicator corresponding to the first mode and the indicator corresponding to the second mode on the first region and the second region, respectively. In another instance, the controller 180 displays an identifier (e.g., symbol, text, image, etc.) indicating the first mode on the indicator corresponding to the first mode and also displays an identifier indicating the second mode on the indicator corresponding to the second mode.

In another instance, the controller 180 can display the indicator corresponding to the first mode and the indicator corresponding to the second mode with different colors, respectively. Further, the controller 180 represents an indicator indicating a common application as an overlaid icon and represents an indicator indicating a dedicated application as a single icon.

In addition, the controller 180 partitions the specific region into first to third regions and can then display an indicator of a common application, an indicator corresponding to a private mode and an indicator corresponding to the business mode on the first region, the second region and the third region, respectively. The controller 180 also displays a text or symbol, which indicates 'common', on an indicator indicating a common application and also displays a text or symbol, which indicates 'dedicated', on an indicator indicating a dedicated application. The above examples are just exemplary. The identifiable display of indicators per mode or the identifiable display of dedicated/common indicators are non-limited by the above examples and can be implemented in various ways.

When receiving an input of a command signal for an indicator display on a specific region in the first mode screen display status (S1120), the controller 180 can perform the displaying step S1130. In this instance, the command signal for the indicator display on the specific region is not an indicator corresponding to a currently activated first mode but a signal for commanding a display of indicators corresponding to the first and second modes.

For instance, the command signal for the indicator display on the specific region can be input if the user selection action on a corresponding menu item/key/key zone is input. In another instance, the command signal for the indicator display on the specific region can be input if a corresponding terminal motion is input. The command signal for the indicator display on the specific region can also be input if a corresponding speech is input.

Meanwhile, although the drawing shows that the first mode screen display S1120 and the indicator display within the specific region S1130 are performed in order, both of the first mode screen display and the indicator display within the specific region can be simultaneously performed (i.e., a separate command corresponding to the indicator display within the specific region is not required).

In the following description, a process for displaying an indicator on a specific region is explained with reference to FIGS. 14A to 14D. For clarity and convenience of the following description, the first mode and the second mode include the private mode and the business mode, respectively. Also, the private mode is currently activated. An indicator corresponding to a private mode is also indicated by 'P (abbreviation of 'private') to indicate the private mode, and an indicator corresponding to the business mode is indicated by 'B (abbreviation of 'business') to indicate the business mode.

Figure 14A:
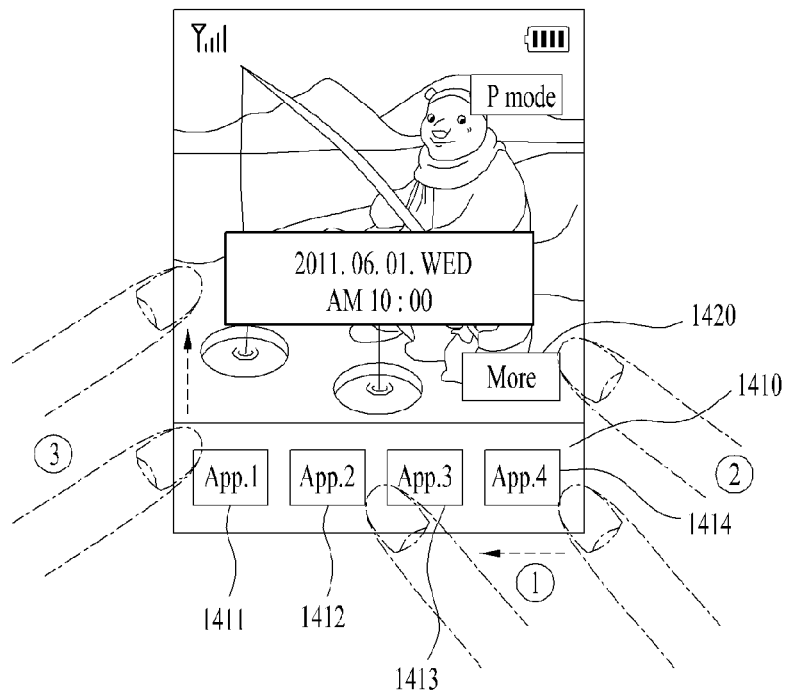
FIGS. 14A to 14D are display screens illustrating displaying an application indicator on a specific region according to an embodiment of the present invention.

In particular, FIGS. 14A to 14D are display screens illustrating displaying an application indicator on a specific region according to the embodiment of the present invention. Referring to FIG. 14A, in the private mode activated state, the mobile terminal 100 displays $1^{st}$ to $4^{th}$ indicators 1411 to 1414 indicating $1^{st}$ to $4^{th}$ applications, which are executed in a private mode, within a specific region 1410. In doing so, an indicator corresponding to the business mode can be displayed if a command signal for an indicator display within the specific region containing the indicator corresponding to the business mode is input (see FIGS. 15A to 16).

Figure 14B:
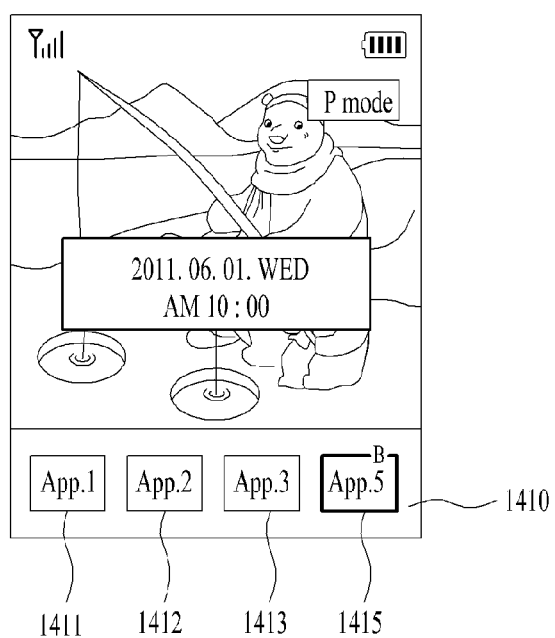

Referring to FIG. 14B, in the private mode activated state, the mobile terminal 100 can display $1^{st}$ to $3^{rd}$ indicators 1411 to 1413 corresponding to the private mode and a $5^{th}$ indicator 1415 of a $5^{th}$ application having a highest use frequency among applications executed in the business mode within a specific region 1410. In this instance, the $5^{th}$ application can include one of a basic application of the second mode, an application most recently executed in the second mode and an application having a current occurring event.

Figure 14C:
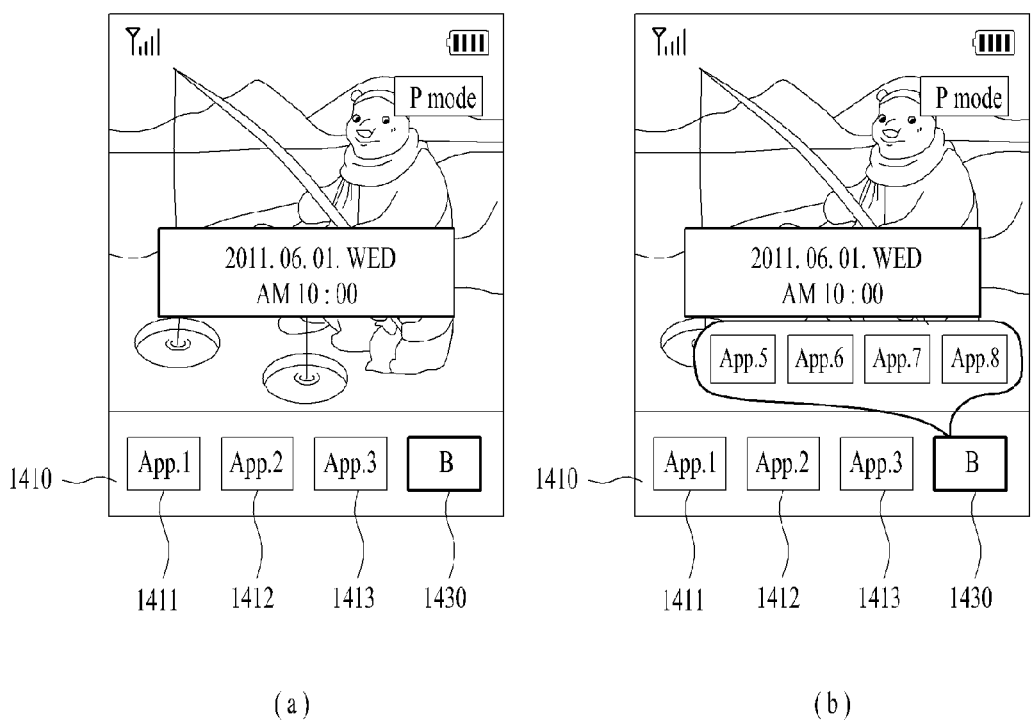

Referring to FIG. 14C, in the private mode activated state, the mobile terminal 100 can display $1^{st}$ to $3^{rd}$ indicators 1411 to 1413 corresponding to the private mode and a representative indicator 1430 indicating a business mode (FIG. 14C(a)). If the user selects the representative icon 1430, the mobile terminal 100 can further display $5^{th}$ to $8^{th}$ indicators of $5^{th}$ to $8^{th}$ applications designated as start applications among applications executed in the second mode (FIG. 14C(b)).

Figure 14D:
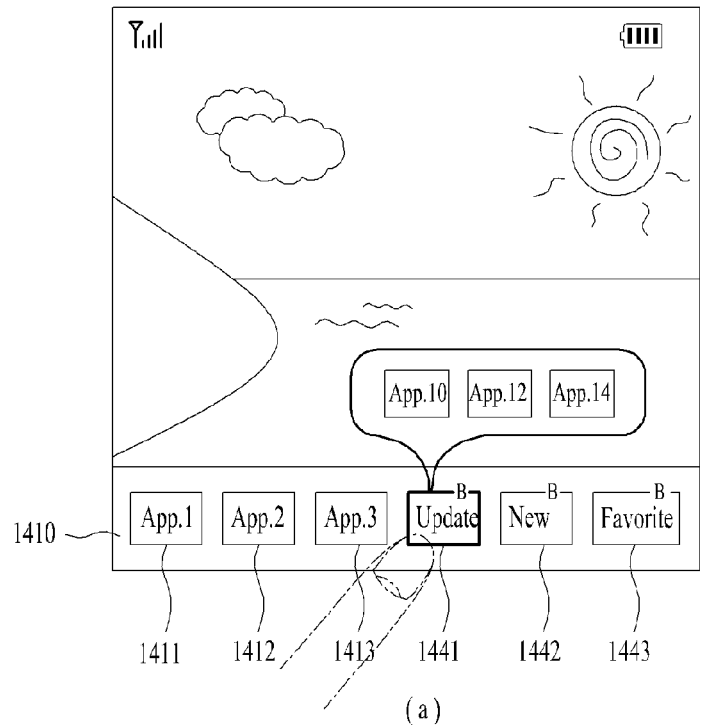
Figure 14D:
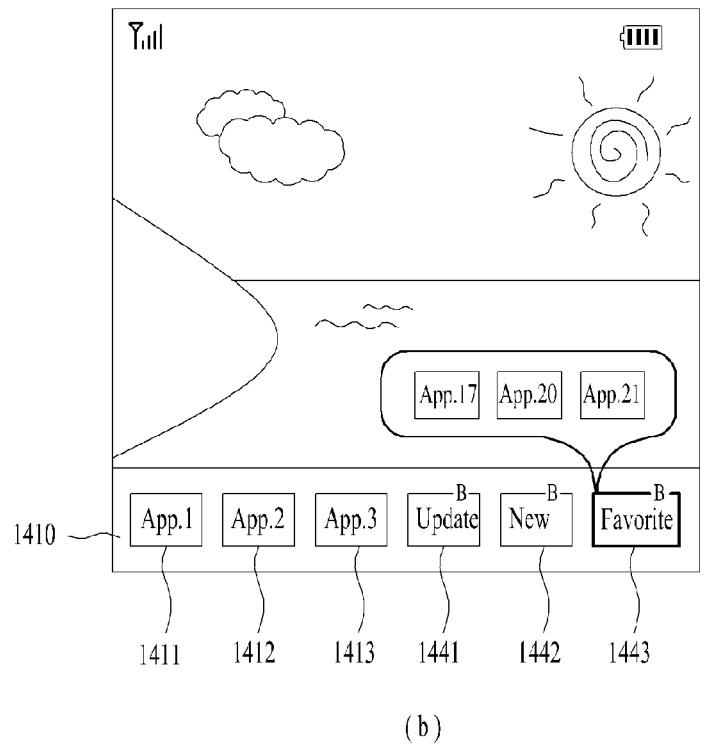

Referring to FIG. 14D, in the private mode activated state, the mobile terminal 100 can display $1^{st}$ to $3^{rd}$ indicators 1411 to 1413 corresponding to the private mode and indicators 1441 to 1443 reflecting application statuses in a business mode on the specific region 1410. For instance, the indicators 1441 to 1443 can include an update indicator 1441, a new indicator 1442 and a favorite indicator 1443.

In particular, referring to FIG. 14D(a), if the update indicator 1441 is selected, the mobile terminal 100 can further display indicators of recently updated applications or update target applications among application executed in the second mode. Alternatively, referring to FIG. 14D(b), if the favorite indicator 1443 is selected, the mobile terminal 100 can further display indicators of applications designated as favorite application by the user or indicators of applications having high use frequency, among the applications executed in the second mode. Meanwhile, if the new indicator 1442 is selected, indicators of applications newly installed for a recent predetermined period of time in the second mode.

In the following description, a process for displaying an indicator on a specific region is explained in detail with reference to FIGS. 15A to 17. For clarity and convenience of the following description, assume that the first mode and the second mode include the private mode and the business mode, respectively, and the private mode is currently activated.

In particular, FIGS. 15A to 17 are display screens illustrating displaying an application indicator of each of the private mode and the business mode on a specific region according to an embodiment of the present invention. In the state shown in FIG. 14A (i.e., the indicator corresponding to the currently activated private mode is displayed within the specific region), assume that the mobile terminal 100 receives an input of a display command for displaying an indicator corresponding to the private mode and an indicator corresponding to the business mode within the specific region 1410.

For instance, referring to FIG. 14A(a) in one of a case ① of receiving an input of a touch & drag action (or a flicking action) on the specific region 1410, a case ② of receiving a selection action on the corresponding key zone (More) 1420 and a case ③ of receiving an input of a touch & drag action from one point within the specific region 1410 to another point outside the specific region 1410, a display command for displaying an indicator corresponding to the private mode and an indicator corresponding to the business mode within the specific region 1410 is input.

Meanwhile, when an indicator corresponding to the private mode and an indicator corresponding to the business mode within the specific region 1410 are displayed within the specific region 1410, an input of a separate display command corresponding to this case is not needed.

Figure 15A:
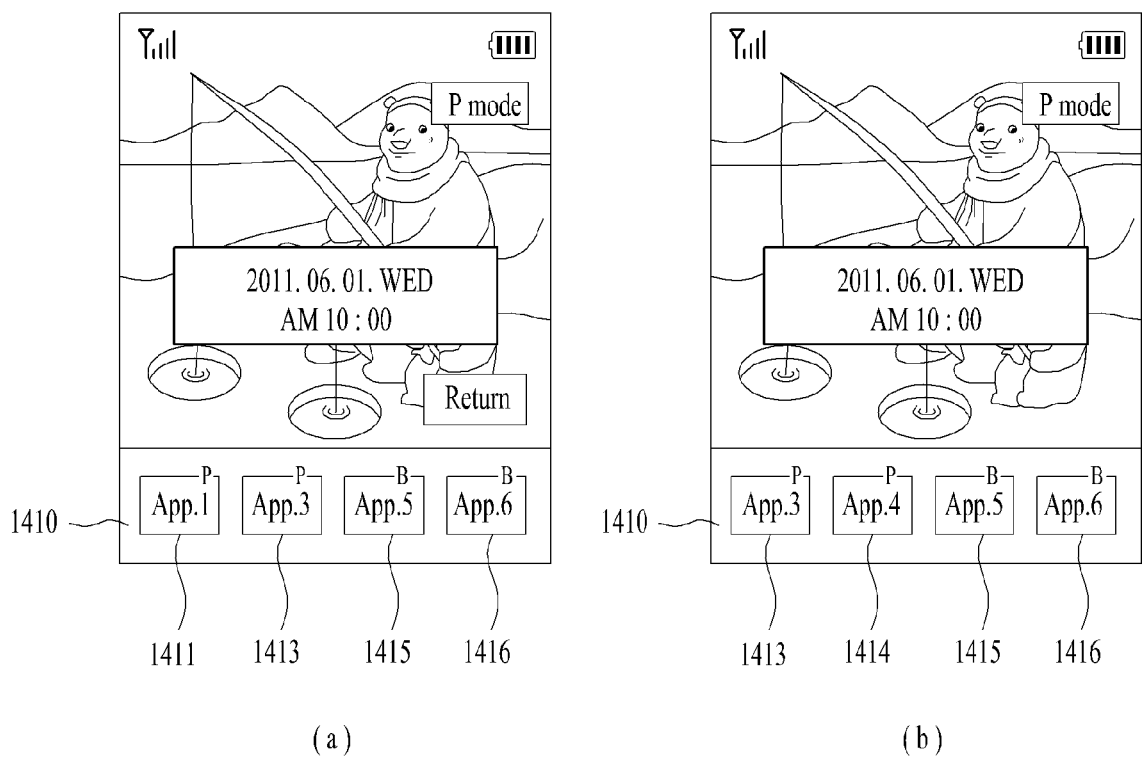
FIGS. 15A to 17 are display screens illustrating displaying an application indicator of each of a private mode and a business mode on a specific region according to an embodiment of the present invention.

Referring to FIG. 15A(a), if the key zone (More) 1420 is selected in FIG. 14A, the mobile terminal 100 displays $1^{st}$ and $3^{rd}$ indicators 1411 and 1413 of $1^{st}$ and $3^{rd}$ applications, which have a high execution frequency (or high user preference) and are selected from $1^{st}$ to $4^{th}$ applications designated to be displayed on a specific region 1410, among a plurality of applications executed in the private mode within the specific region 1410. Further, the mobile terminal 100 can sequentially display $5^{th}$ and $6^{th}$ indicators 1415 and 1416 of $5^{th}$ and $6^{th}$ applications, which are designated to be displayed on the specific region 1410, among a plurality of applications executed in a business mode.

Referring to FIG. 15A(b), if a touch & drag action is input in FIG. 14A, the mobile terminal 100 can perform an indicator scroll action within the specific region to correspond to a distance and direction of the touch & drag action. For instance, $1^{st}$ to $4^{th}$ indicators corresponding to the private mode and $5^{th}$ to $8^{th}$ indicators corresponding to the business mode can be sequentially scrolled. During the scrolling operation, the indicator(s) corresponding to the private mode can be displayed within the specific region 1410 together with the indicator(s) corresponding to the business mode or the indicators corresponding to the business mode can be displayed within the specific region 1410 only.

Figure 15B:
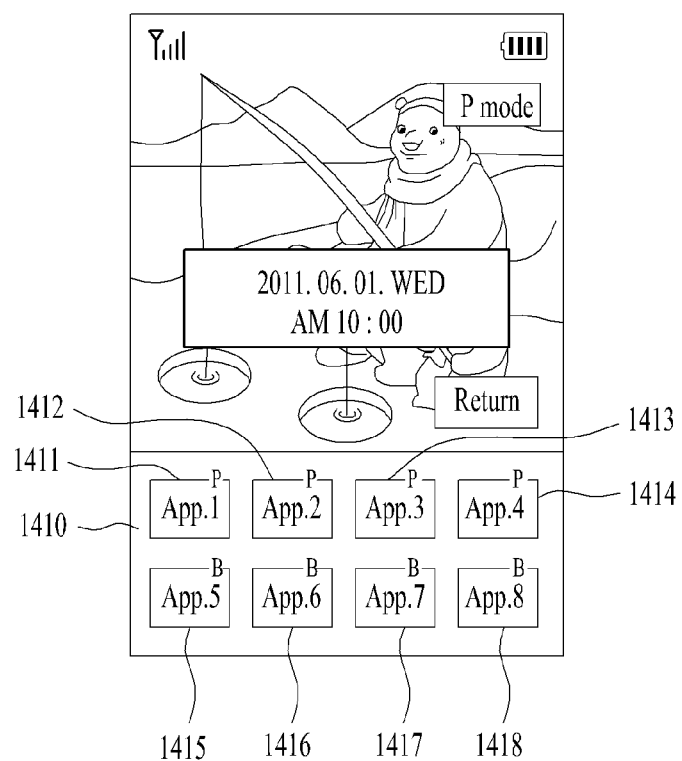

Referring to FIG. 15B, when receiving an input of a touch & drag action from one point within the specific region to another point outside the specific region 1410 in FIG. 14A, the mobile terminal 100 enlarges the specific region 1410 and can then display $1^{st}$ to $4^{th}$ indicators 1411-1414 corresponding to the private mode and $5^{th}$ to $8^{th}$ indicators 1415-1418 corresponding to the business mode all within the enlarged specific region 1410. Of course, if it is difficult for all of the $1^{st}$ to $8^{th}$ indicators to be contained within the enlarged specific region 1410, the controller 180 can perform an indicator display action within the specific region 1410 sequentially or selectively in accordance with the indicator scroll action (see FIG. 15A(b)) or the selection action (see FIG. 15A(a)) on the key zone (More) 1420.

Figure 16:
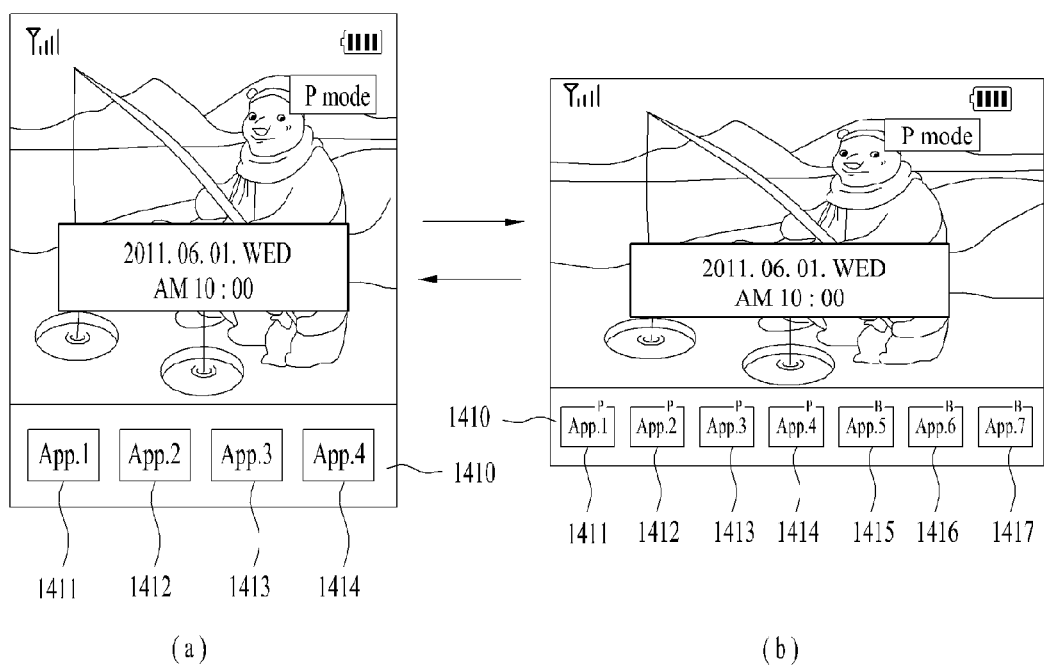

Referring to FIG. 16, in a portrait view mode, the mobile terminal 100 displays $1^{st}$ to $4^{th}$ indicators 1411 to 1414 corresponding to a currently activated private mode within the specific region 1410. If the portrait view mode is switched to a landscape view mode, the mobile terminal 100 can display the $1^{st}$ to $4^{th}$ indicators 1411 to 1414 corresponding to the private mode and $5^{th}$ to $7^{th}$ indicators 1415 to 1417 corresponding to the business mode within the specific region 1410. In this instance, if the landscape view mode is entered, a size of the specific region 1410 can be regarded as enlarged. If the portrait view mode is re-entered, the $1^{st}$ to $4^{th}$ indicators 1411 to 1414 corresponding to the private mode can be displayed within the specific region 1410 only.

Figure 17:
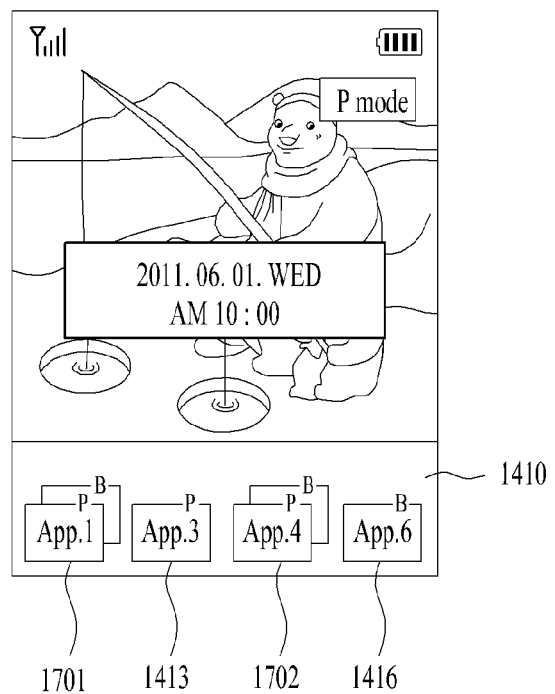

Referring to FIG. 17, the mobile terminal 100 can display $1^{st}$ and $4^{th}$ common indicators 1701 and 1702 indicating $1^{st}$ and $4^{th}$ applications common to the private mode and the business mode, a $3^{rd}$ dedicated indicator 1413 indicating a $3^{rd}$ application dedicated to the private mode, and a $6^{th}$ dedicated indicator 1416 indicating a $6^{th}$ application dedicated to the business mode within a specific region 1410.

In addition, the common indicator can be represented as an overlaid icon, while the dedicated indicator can be represented as a single icon. An identifier of the private mode and an identifier of the business mode are marked on the common indicator, while an identifier of the corresponding mode can be marked on the dedicated indicator.

Referring again to FIG. 11, in the displaying step 51130, the mobile terminal 100 can display an event information on an event occurring in association with a corresponding application for each of the indicators displayed within the specific region under the control of the controller 180. For instance, when an application is a message application, the event information includes the number/reception hour/counterpart information of unchecked message(s), counterpart information of a most recently sent/received message, sent/received hour of the most recently sent/received message, and the like. When an application is a call application, the event information includes the number/received hour/counterpart information of missed call(s), counterpart information/call time/call hour of a most recent call, and the like.

Moreover, the controller 180 can identifiably display the event information of the first mode and the event information of the second mode. When a specific indicator displayed within a specific region indicates a common application of the first and second modes, the controller 180 can identifiably display the event information on the corresponding common application for the specific indicator per mode. For instance, the event information of the first mode can be represented as red, while the event information of the second mode can be represented as blue.

Furthermore, an event information of a deactivated mode can be limitedly provided. In particular, the event information of the deactivated mode can be limitedly provided if the deactivated mode is the business mode. For instance, assuming that an application is a message application or a call application, a message sent/received counterpart information or call counterpart information may not be displayed as the event information of the deactivated mode. Occasionally, only if a prescribed authentication procedure, which will be explained in detail in the following description later, the event information of the deactivated mode can be provided without limitation.

In the following description, an event information displaying process is explained in detail with reference to FIGS. 18A and 18B. For clarity and convenience of the following description, the first mode and the second mode include the private mode and the business mode, respectively, and the private mode is currently activated. Moreover, the event information is the event occurrence number (or the unchecked event number).

Figure 18A:
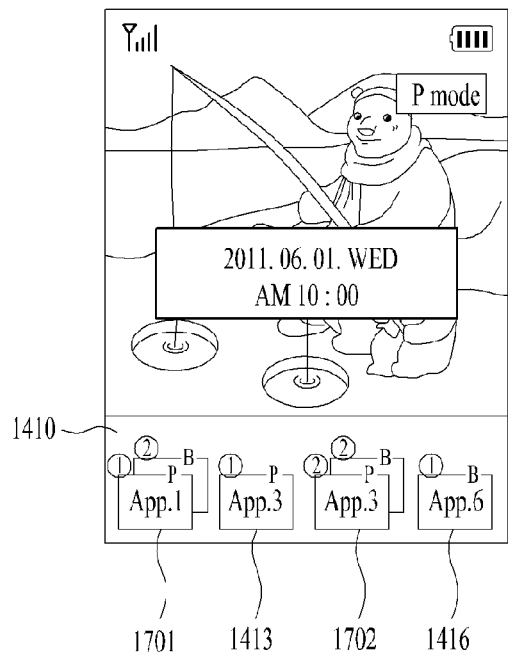
FIGS. 18A and 18B are display screens illustrating displaying an event information of a corresponding application for an application indicator displayed on a specific region according to the present invention.
Figure 18B:
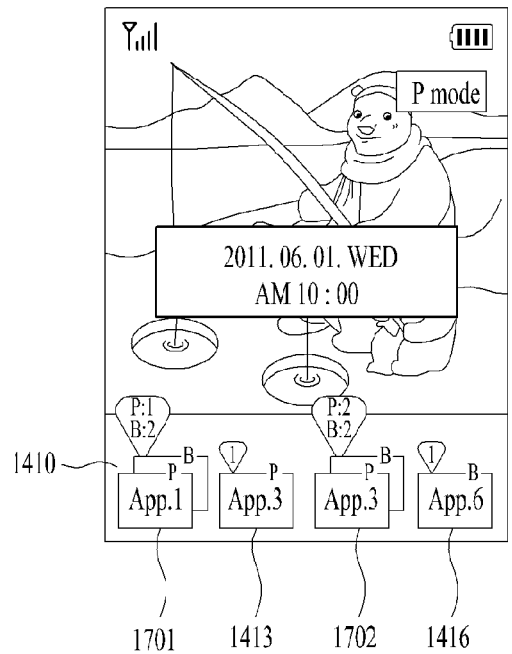

In particular, FIGS. 18A and 18B are display screens illustrating displaying an event information of a corresponding application for an application indicator displayed on a specific region according to an embodiment of the present invention. Referring to FIG. 18A, the mobile terminal 100 displays event information (private mode P ①, business mode B ②) on a $1^{st}$ application for each of the private mode and the business mode on a $1^{st}$ common indicator 1701, displays event information on a first application for the private mode on a $3^{rd}$ dedicated indicator 1413, displays event information (private mode P ②, business mode B ②) on a $4^{th}$ application for each of the private mode and the business mode on a $4^{th}$ common indicator 1702, and displays event information ① on a $6^{th}$ application for a business mode on a $6^{th}$ dedicated indicator 1416. In addition, FIG. 18B shows that event information is represented in a word balloon format unlike FIG. 18A.

Figure 12:
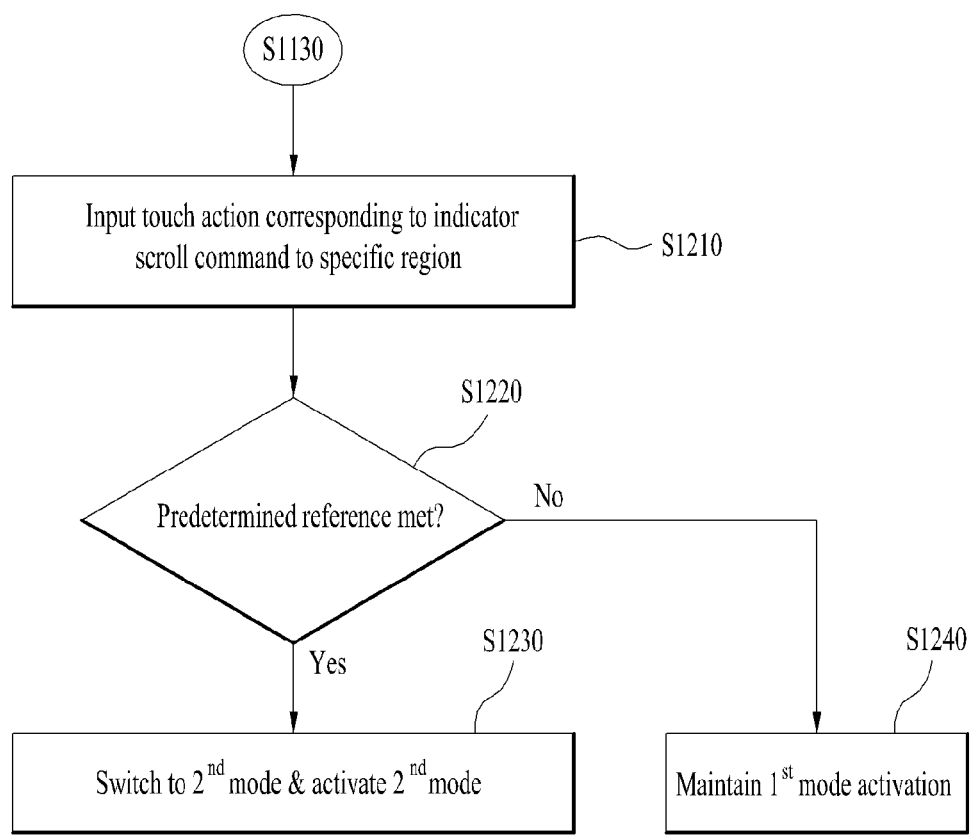

Next, FIG. 12 is a second flowchart illustrating a display controlling method in a mobile terminal according to an embodiment of the present invention. In particular, FIG. 12 shows a process for performing a mode switching operation by adjusting the number of indicators displayed within a specific region.

Referring to FIG. 12, while the indicator corresponding to the first mode and the indicator corresponding to the second mode are displayed within the specific region (S1130 in FIG. 11), the mobile terminal 100 receives an input of a touch action for scrolling the indicator on the specific region (S1210). For instance, the touch action for scrolling the indicator can include one of a touch & drag action of a predetermined distance in a prescribed direction, a flicking action in a prescribed direction and the like.

The controller 180 then scrolls the indicator displayed within the specific region to correspond to the input touch action and determines whether the number of the indicators corresponding to the second mode within the specific region meets a predetermined reference as a result of the scroll action (S1220).

For instance, the predetermined reference can include one of a case that the number of the indicators corresponding to the second mode is greater than that of the number of the indicators corresponding to the first mode, a case that the number of the indicators corresponding to the second mode is greater than the reference number, and a case that the indicators displayed within the specific region include the indicators corresponding to the second mode only. In this instance, the reference number can be set by the user or can be randomly set by the controller 180.

If the mobile terminal 100 determines that the number of the indicators corresponding to the second mode meets the predetermined reference in the determining step S1220, the mobile terminal 100 deactivates the first mode and activates the second mode by switching the first mode to the second mode (S1230). The second mode activating step S1230 can refer to the former description of the first mode activating step S1110.

In the second mode activating step S1230, the controller 180 can display at least one of a home screen or a screen corresponding to a $1^{st}$ page among a plurality of screens corresponding to the second mode, a most recently displayed screen, the user designated screen, an executed screen (e.g., a screen in an early stage of an execution, a screen displayed when an execution end) of an application most recently executed in the second mode, and a screen (explained in detail in the following description) related to the screen displayed last in the first mode before switching to the second mode. Of course, the above examples are just exemplary and non-limits the present invention.

In the following description, a mode switching operation in a multi-OS configuration is explained. First of all, according to a first multi-OS type, if a mode switching command is input in an activated state of the private mode or the business mode, the mobile terminal 100 activates the business mode by driving a hypervisor for Guest OS 2 or can activate the private mode by driving a hypervisor for Guest OS 1.

Secondly, according to a second multi-OS type, if a mode switching command is input in an activated state of the private mode or the business mode, the mobile terminal 100 activates the business mode by driving a hypervisor for Guest OS or can activate the private mode by driving a hypervisor for Host OS.

In addition, the controller 180 can request an authentication procedure before performing a mode switching operation of switching to the second mode. After the authentication procedure has been validly completed, the controller 180 can perform the mode switching operation of switching to the second mode.

The controller 180 can request the authentication procedure in one of a case that a conditional access is set on the second mode to switch to, a case that a security level set on the second mode is higher than that set on the first mode despite that a security level is set on each of the first mode and the second mode, and a case that the first mode and the second mode are the private mode and the business mode, respectively.

In particular, the authentication procedure receives an input of the user authentication information from the user and then determines whether the input user authentication information is valid. If the input user authentication information is valid, the authentication procedure can grant the switching to the second mode.

For instance, the user authentication information includes the user authentication information set dedicated to the second mode or the user authentication information for the mode switching in common without being limited to the second mode. Moreover, the user authentication information can be set different in accordance with a conditional access level (or a security level) of the second mode. For instance, if the conditional access level is high, the user authentication information can be complicated. If the conditional access level is low, the user authentication information can be simple.

When the second mode is entered plural times, the controller 180 can request the user authentication information differing each entry. The controller 180 can also receive an input of the user authentication information at the user-specific timing point of entering the second mode from the user.

After the authentication procedure for the switching to the second mode has been successfully completed, the authentication procedure can be skipped when re-switching to the second mode later. For instance, the corresponding authentication procure can be skipped when a re-switching operation for a predetermined period of time (e.g., duty hours, a day, a week, etc.), a re-switching operating for a period between terminal-on and terminal-off, and the like. Moreover, if the authentication procedure is not validly performed, the controller 180 maintains the first mode activated state or can just execute a basic one (e.g., call, message, schedule, etc.) of applications of the second mode by switching to the second mode.

Meanwhile, if the controller 180 determines that the number of the indicators corresponding to the second mode does not meet the predetermined reference in the determining step S1220, the controller 180 can maintain the first mode activated state (S1240).

In the following description, a mode switching operation using an adjustment of the number of indicators within a specific region is explained in detail with reference to FIGS. 19A to 19D. For clarity and convenience of the following description, assume that the first mode and the second mode are the private mode and a business mode, respectively, and the private mode is currently activated.

Figure 19A:
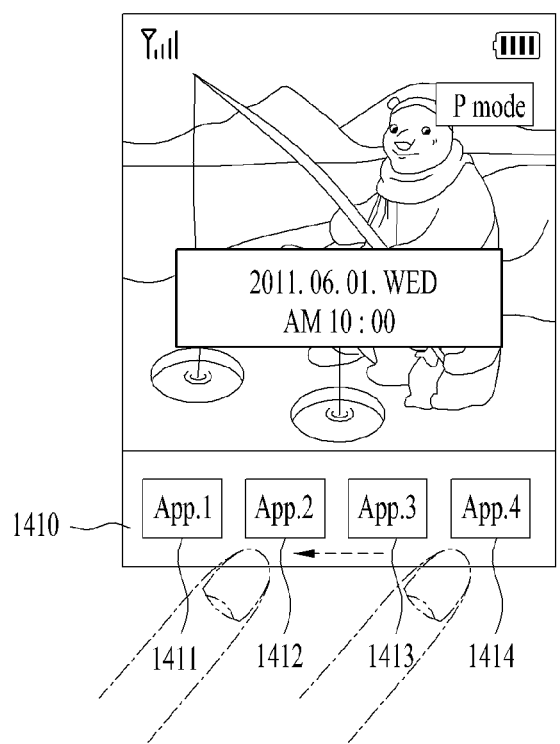
FIGS. 19A to 19D are first display screens illustrating performing a mode switching operation according to an embodiment of the present invention.

In particular, FIGS. 19A to 19D are first display screens illustrating performing a mode switching operation according to an embodiment of the present invention. Referring to FIG. 19A, the mobile terminal 100 receives an input of a touch & drag action for scrolling indicators on the specific region 1410. In this instance, on the specific region 1410, indicators corresponding to a currently activated private mode are displayed only or both of the indicators corresponding to the private mode and the indicators (corresponding to the number failing in meeting a predetermined reference) corresponding to a business mode can be displayed.

Figure 19B:
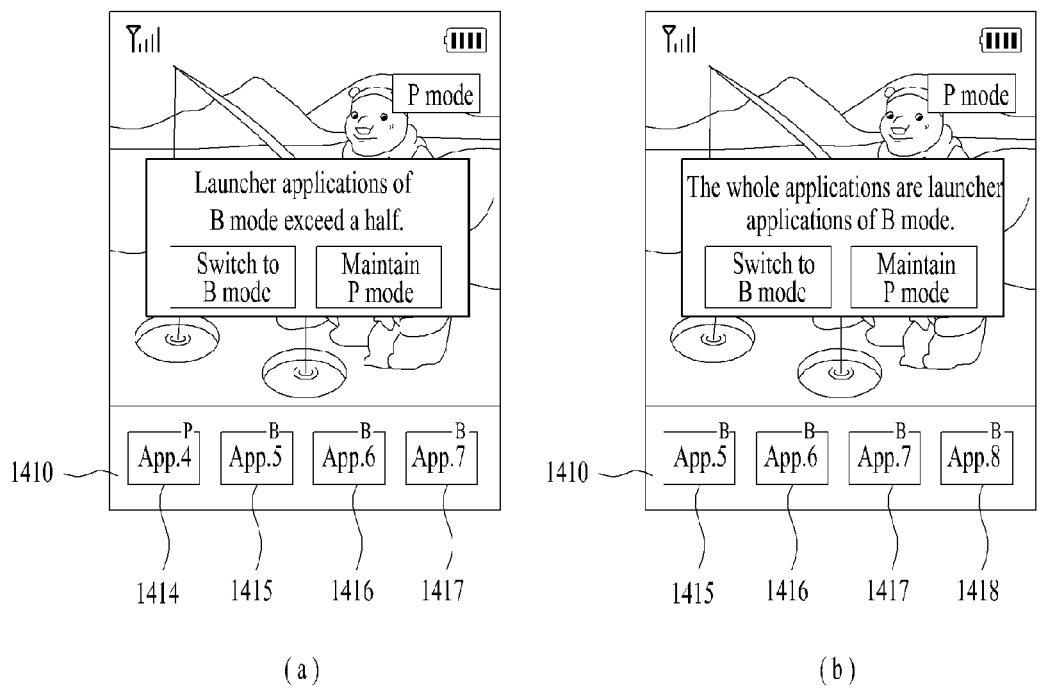

Referring to FIG. 19B, by way of an indicator scroll action, if the number of the indicators corresponding to the business mode is greater than the number of the indicators corresponding to the private mode within the specific region 1410 (FIG. 19B(a)) or the indicator displayed within the specific region 1410 is the indicator corresponding to the business mode (FIG. 19B(b)), the mobile terminal 100 can perform a switching operation of a switching to the business mode.

In doing so, the mobile terminal 100 displays a window for enabling the user to select a switching to the business mode (B mode switching) or a maintaining of the private mode (P mode maintaining) If the user selects the switching to the business mode, the mobile terminal 100 can perform the switching operation of the switching to the business mode.

Of course, if the mobile terminal 100 determines that the number of the indicators corresponding to the business mode meets the predetermined reference, the mobile terminal 100 can directly perform the switching operation of the switching to the business mode irrespective of a selection made by the user.

Figure 19C:
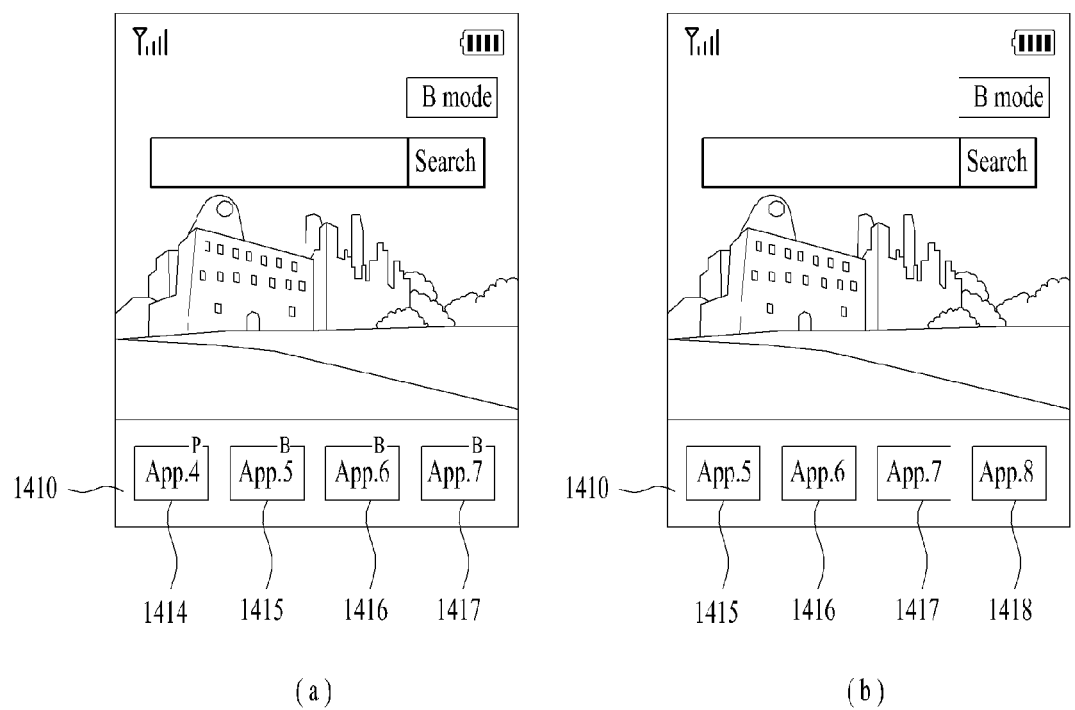

Referring to FIG. 19C, if the switching operation of the switching to the business mode is performed, the mobile terminal 100 activates the business mode and can then display a business mode screen. In doing so, a display of the specific region 1410 can be maintained within the business mode screen.

Figure 19D:
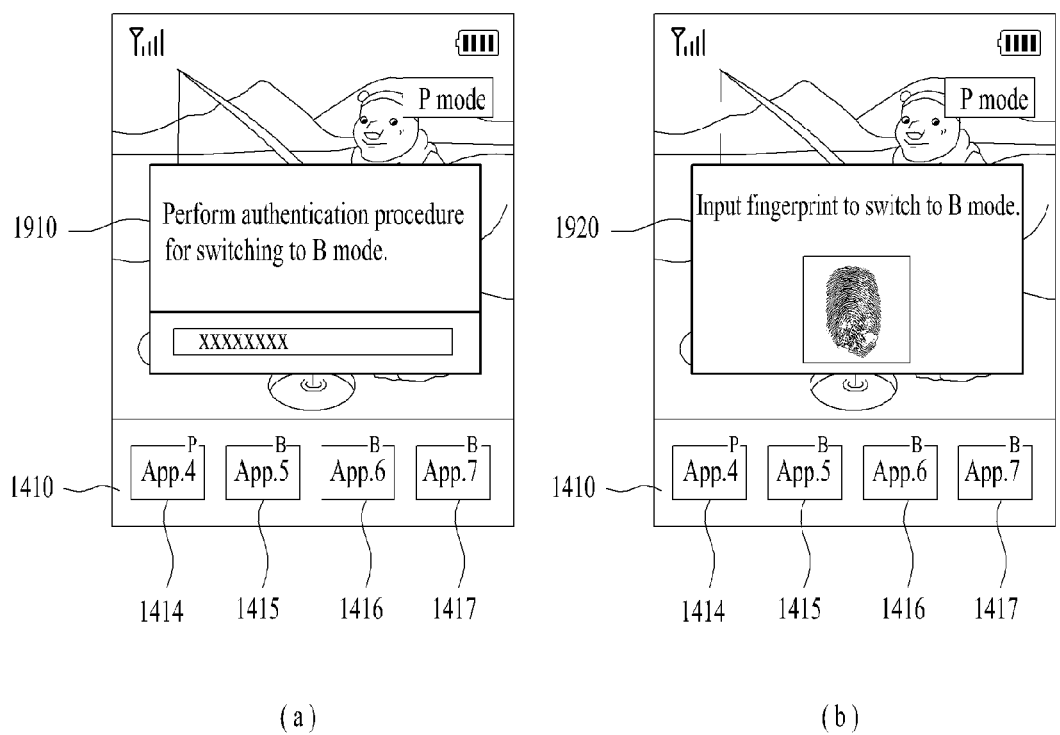

Referring to FIG. 19D, the mobile terminal 100 can request a prescribed authentication procedure before the switching to the business mode. As shown, in the course of performing the authentication procedure, the mobile terminal 100 receives an input of a password from the user (FIG. 19D(a)) or can receive an input of a fingerprint from the user (FIG. 19D(b)). Therefore, only if the input password/fingerprint matches a previously registered password/fingerprint, the mobile terminal 100 validly performs the authentication procedure and can then perform the switching operation of the switching to the business mode.

Figure 13:
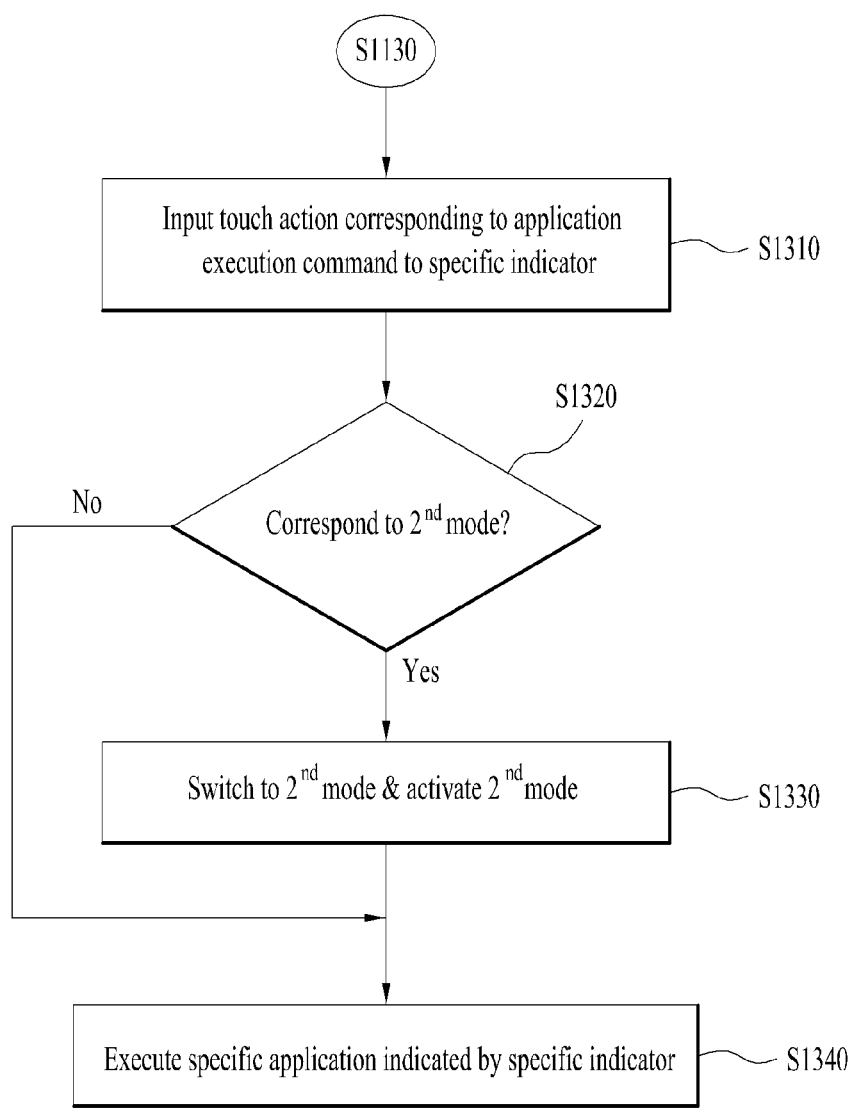

Next, FIG. 13 is a third flowchart illustrating a display controlling method in a mobile terminal according to an embodiment of the present invention. In particular, FIG. 13 shows a process for executing a specific application indicated by a specific indicator displayed on a specific region.

Referring to FIG. 13, while the indicators corresponding to the first mode or the second mode are displayed within the specific region (S1130 in FIG. 11), the mobile terminal 100 receives an input of a touch action corresponding to an application executing command on a specific indicator displayed within the specific region (S1310). For instance, the touch action corresponding to the application execution command can include a touch to a specific indicator for a predetermined duration or a predetermined count of touches.

When receiving the input of the touch action corresponding to the application execution command, the controller 180 determines whether a specific application indicated by the specific indicator having the touch action input thereto is executable in the first mode or the second mode (S1320). Besides, when the specific application is executable in both of the first mode and the second mode will be described later in the following description.

For instance, if the specific indicator is an indicator corresponding to the first mode, the controller 180 determines that the specific application corresponds to the first mode. In another instance, if the specific indicator is an indicator corresponding to the second mode, the controller 180 determines that the specific application corresponds to the second mode.

As a result of the determination, if the specific application indicated by the specific indicator is executable in the second mode (Yes in S1320), the controller 180 deactivates the first mode and activates the second mode by switching the first mode to the second mode (S1330). In particular, the second mode switching and activating step S1330 can refer to the former description of the second mode switching and activating step S1230 shown in FIG. 12.

Subsequently, the controller 180 executes the specific application in the second mode activated state (S1340). Meanwhile, if the specific application is executable in the first mode as a result of the determination (No in S1320), the controller 180 can execute the specific application in the first mode activated state.

In the following description, a mode switching operation according to a specific indicator selection and a specific application execution are explained in detail with reference to FIGS. 20A and 20B. For clarity and convenience of the following description, assume that the first mode and the second mode are the private mode and the business mode, respectively, and the private mode is currently activated.

Figure 20A:
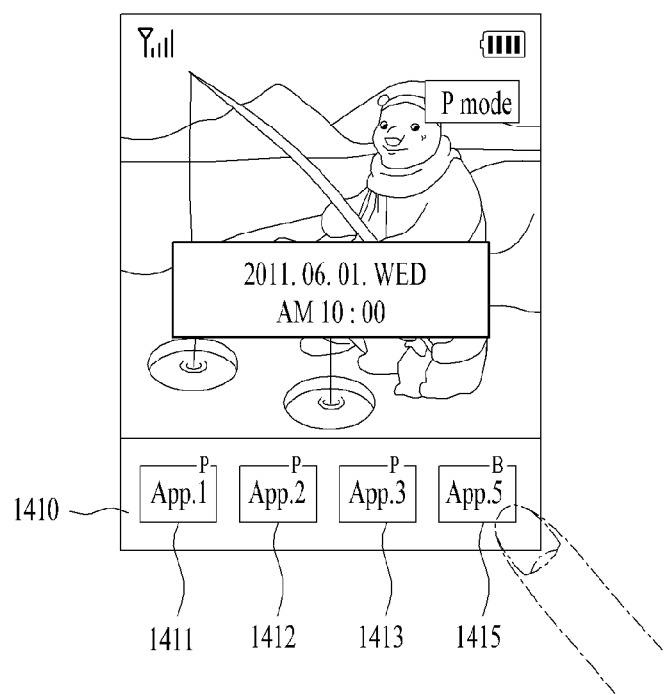
FIGS. 20A to 20E are first display screens illustrating performing a mode switching operation according to an embodiment of the present invention.
Figure 20B:
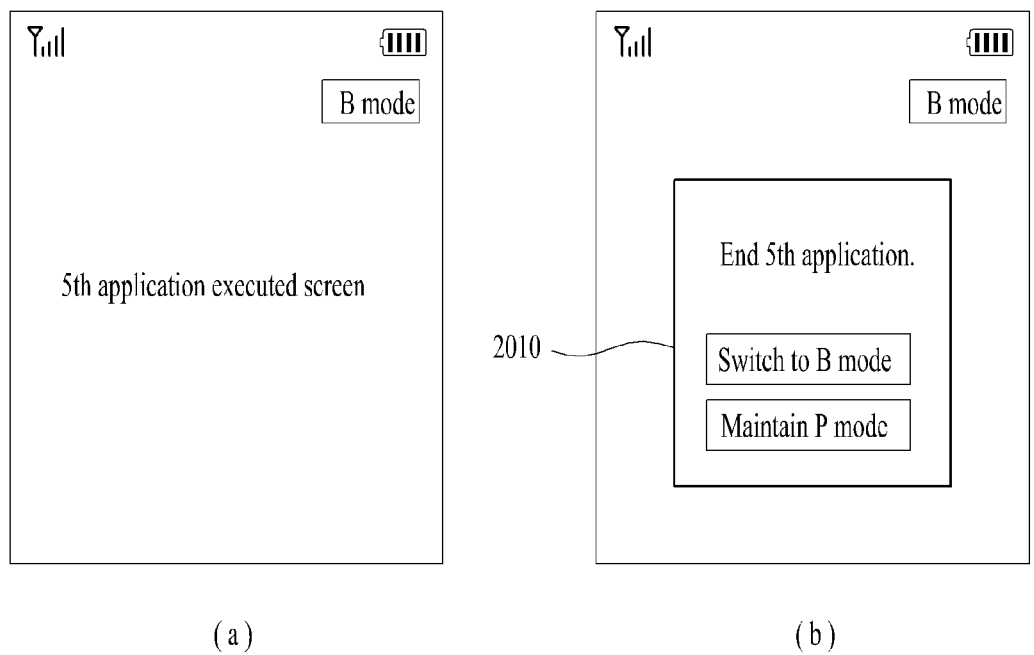

In particular, FIGS. 20A and 20B are first display screens illustrating performing a mode switching operation according to an embodiment of the present invention. Referring to FIG. 20A, the mobile terminal 100 receives an input of a touch action corresponding to an application execution command on a $5^{th}$ indicator 1415 (corresponding to a business mode) displayed on the specific region 1410.

Referring to FIG. 20B, as the touch action on the $5^{th}$ indicator 1415 corresponding to the business mode is input, the mobile terminal 100 performs an operation of a switching to the business mode and a business mode activating operation, executes a $5^{th}$ application indicated by the $5^{th}$ indicator 1415 in the business mode activated state, and then displays a corresponding executed screen (FIG. 20B(a)).

When ending the $5^{th}$ application, the mobile terminal 100 can display a window 2010 for allowing the user to select whether to maintain the business mode activate state (B mode maintaining) or to switch to the private mode (P mode recovering) (FIG. 20B(b)).

Referring again to FIG. 13, even if the specific application indicated by the specific indicator is executable in the second mode, the controller 180 can limitedly execute the specific application in the first mode activated state without switching to the second mode. For instance, in one of a case that the authentication procedure is not validly performed, a case that the user does not want the mode switching, and a case that the an application is being executed in the first mode, the specific application can be limitedly executed.

That is, if the specific application is a message application, a message writing function can be set not to be executed or messages exchanged with a specific counterpart can be locked. This is described in detail with reference to FIGS. 20C to 20E as follows. For clarity and convenience of the following description, assume that the $5^{th}$ application indicated by the $5^{th}$ indicator 1415 selected in FIG. 20A is a message application.

Figure 20C:
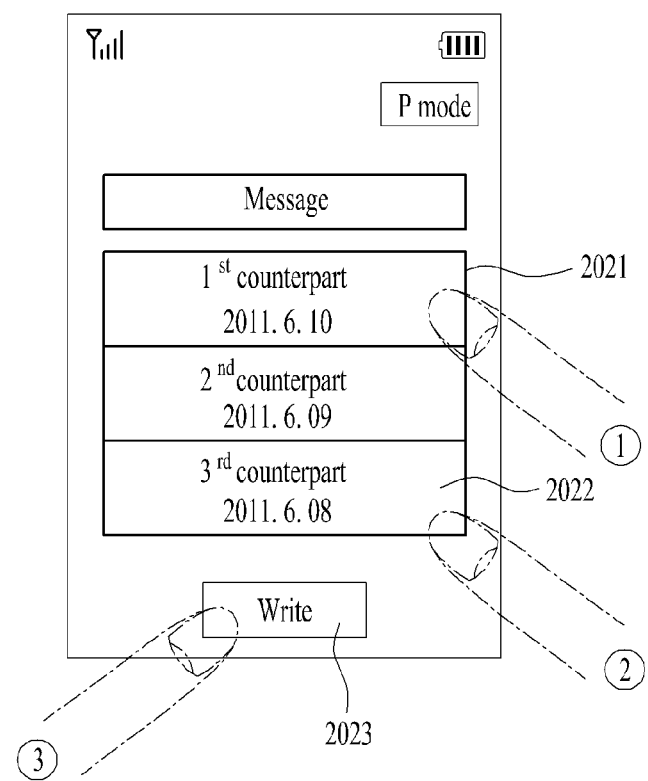

Referring to FIG. 20C, the mobile terminal 100 can limitedly execute a message application, which is executable in the second mode, in the first mode. In addition, the mobile terminal 100 can display a transceived message list as an executed screen of the message application. The limited execution is described in detail as follows.

Figure 20D:
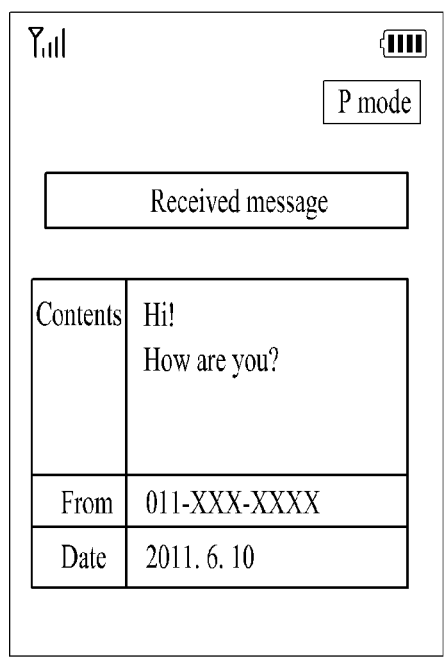
Figure 20D:
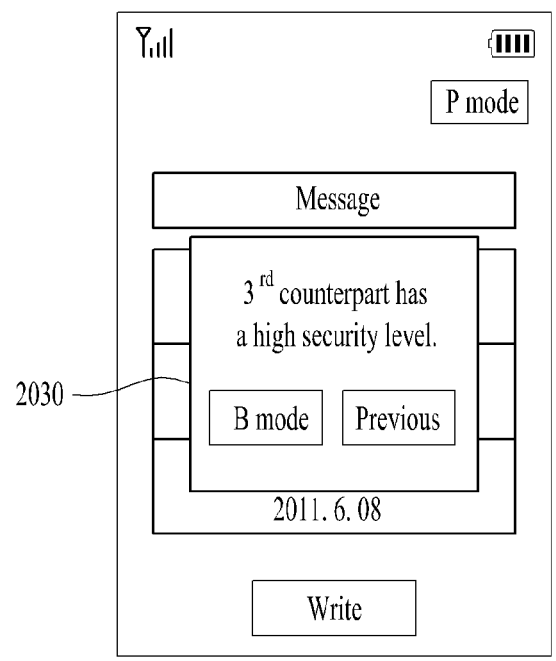

Referring to FIG. 20D, if a $1^{st}$ message 2021, on which a conditional access is not set, is selected from the transceived message list shown in FIG. 20C, the mobile terminal 100 can display a $1^{st}$ message content (FIG. 20D(a)). Meanwhile, if a $3^{rd}$ message having a conditional access set thereon is selected from the transceived message list shown in FIG. 20C, the mobile terminal 100 is unable to display a $3^{rd}$ message content but can display a text 2030 indicating that the $3^{rd}$ message is not checkable due to a high security level of the $3^{rd}$ message or a security level of a $3^{rd}$ counterpart who is a counterpart of the $3^{rd}$ message (FIG. 20D(b)).

Figure 20E:
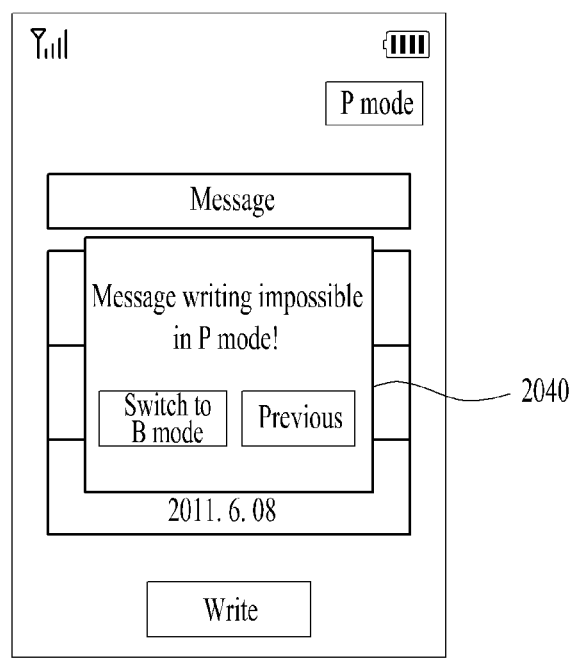

Referring to FIG. 20E, if a message writing (Write) 2023 is selected in FIG. 20C, the mobile terminal 100 is unable to perform a message writing function according to the message application execution in the first mode but can display text 2040 indicating that the message writing function is not available.

Referring again to FIG. 13, when the specific indicator, to which the touch action corresponding to the application execution command is input, is a common application of the first and second modes, the controller 180 can execute the specific application indicated by the specific indicator in one of the first mode and the second mode.

For instance, the mobile terminal 100 can execute the specific application as a default in the currently activated first mode. When the first touch action is input in the inputting step S1310, the mobile terminal 100 executes the specific application in the first mode activated state in the inputting step S1310. When the second touch action is input in the inputting step S1310, the mobile terminal 100 can execute the specific application in the second mode activated state by switching to the second mode.

This is described in detail with reference to FIGS. 21A and FIG. 21B as follows. In particular, FIGS. 21A and 21B are display screens illustrating performing an application of a deactivated mode limitedly according to an embodiment of the present invention.

Figure 21A:
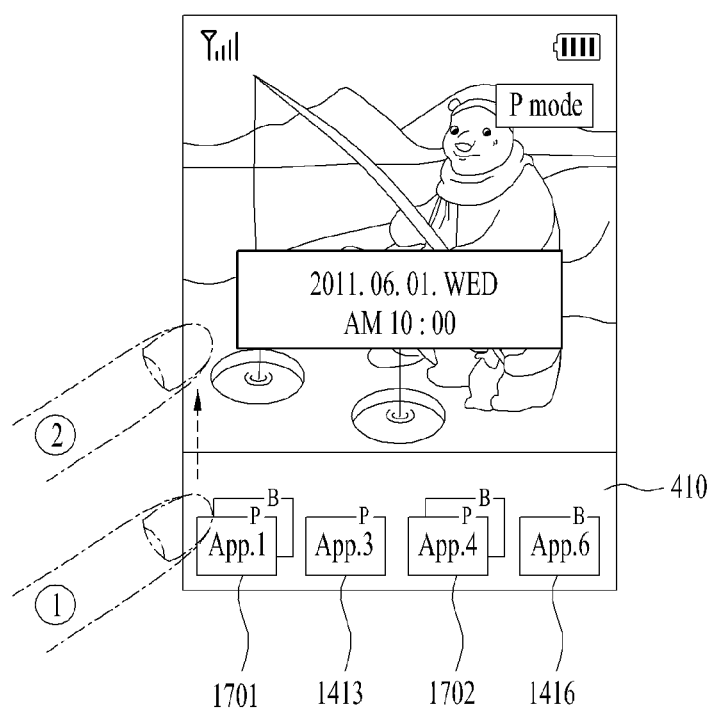
FIGS. 21A and 21B are display screens illustrating performing an application of a deactivated mode limitedly according to an embodiment of the present invention.

Referring to FIG. 21A, the mobile terminal 100 receives an input of a single touch action on the first common indicator 1701 displayed within a specific region 1410 as a first touch action ① or an input of a touch & drag action from the first common indicator 1701 as a second touch action ②.

Figure 21B:
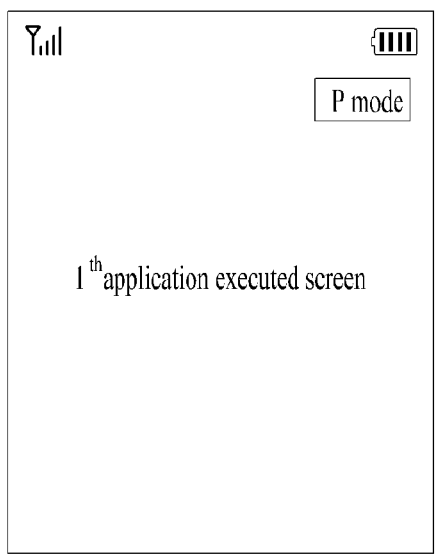
Figure 21B:
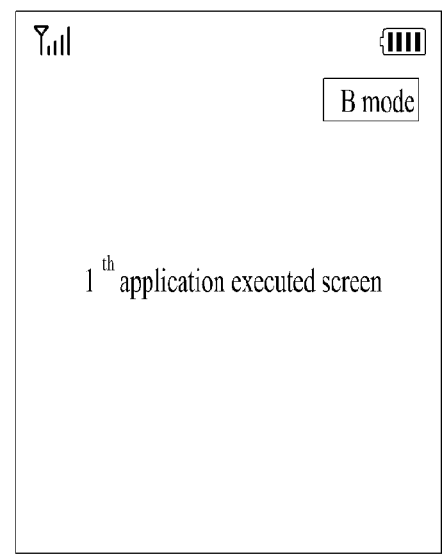

Referring to FIG. 21B, when receiving the input of the single touch action on the first common indicator 1701 in FIG. 21A, the mobile terminal 100 executes a first application in the private mode activated state (FIG. 21B(a)). When receiving the input of the touch & drag action from the first common indicator 1701, the mobile terminal 100 executes the first application in a business mode activated state by switching to a business mode (FIG. 21B(b)).

Referring again to FIG. 13, when the specific indicator, to which the touch action corresponding to the application execution command is a common application of the first and second modes, the controller 180 can execute the specific application indicated by the specific indicator in both of the first mode and the second mode. Hence, the mobile terminal 100 displays both the first mode screen and the second mode screen and can display an executed screen of the specific application in the first mode and an executed screen of the specific application in the second mode as the first mode screen and the second mode screen, respectively.

Figure 22A:
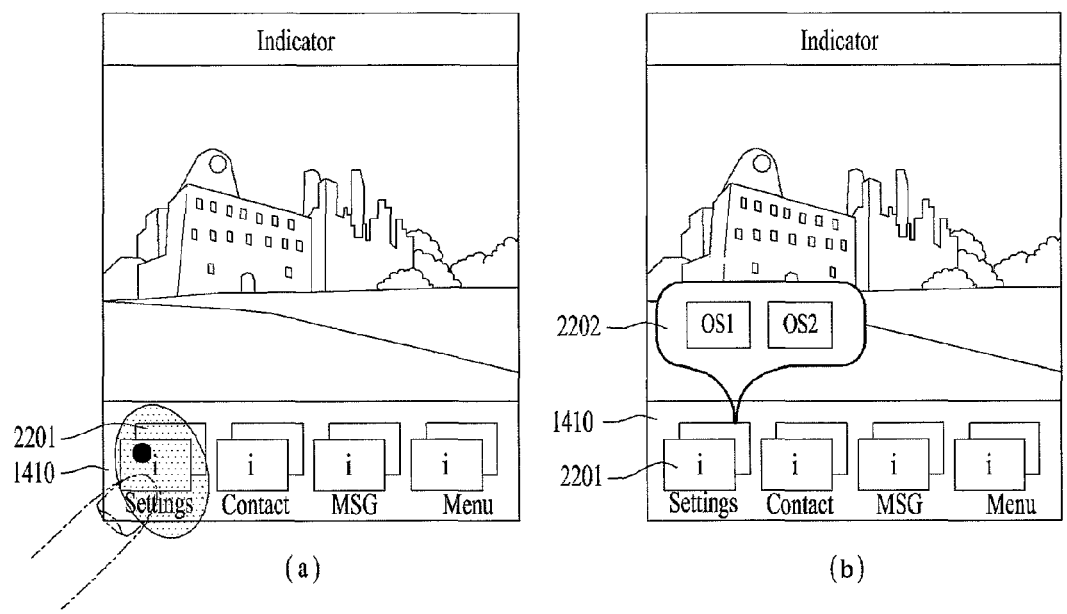

This is described in detail with reference to FIGS. 22A and 22B as follows. In particular, FIGS. 22A and 22B are display screens illustrating executing a common application corresponding to a common application indicator displayed on a specific region according to an embodiment of the present invention. Referring to FIG. 22A, the mobile terminal 100 receives an input of a touch action corresponding to an application execution command on an indicator 2201 of a configuration setting application (FIG. 22A(a)).

Referring to FIG. 22B, the mobile terminal 100 executes the configuration setting application in both of the first mode and the second mode, displays an executed screen of the configuration setting application in the first mode on a first region 2210 of a screen, and displays an executed screen of the configuration setting application in the second mode on a second region 2220 of the screen.

Meanwhile, when receiving an input of a touch action corresponding to an application execution command on the indicator 2201 of the configuration setting application, the mobile terminal 100 can display a window 2202 for enabling the user to select either the first mode or the second mode, as shown in FIG. 22A(b). If either the first mode or the second mode is selected, the mobile terminal 100 can execute the configuration setting application in the selected mode.

According to an embodiment of the present invention, the controller 180 can set a first application of the first mode and a second application of the second mode to be executed by interconnecting to each other. Further, the controller 180 can display an indicator (hereinafter named an interconnecting indicator) corresponding to the first and second applications interconnecting to each other within a specific region.

Of course, it is not mandatory for the first application and the second application to correspond to different modes, respectively. For instance, the user can select different applications of difference modes, which will be executed by interconnecting to each other. In another instance, applications having functions associated with each other (e.g., a call application, a phonebook application, etc.), applications having equal/similar functions, applications belonging to the same category and the like can be set to be executed by the controller 180 by interconnecting to each other.

Figure 23A:
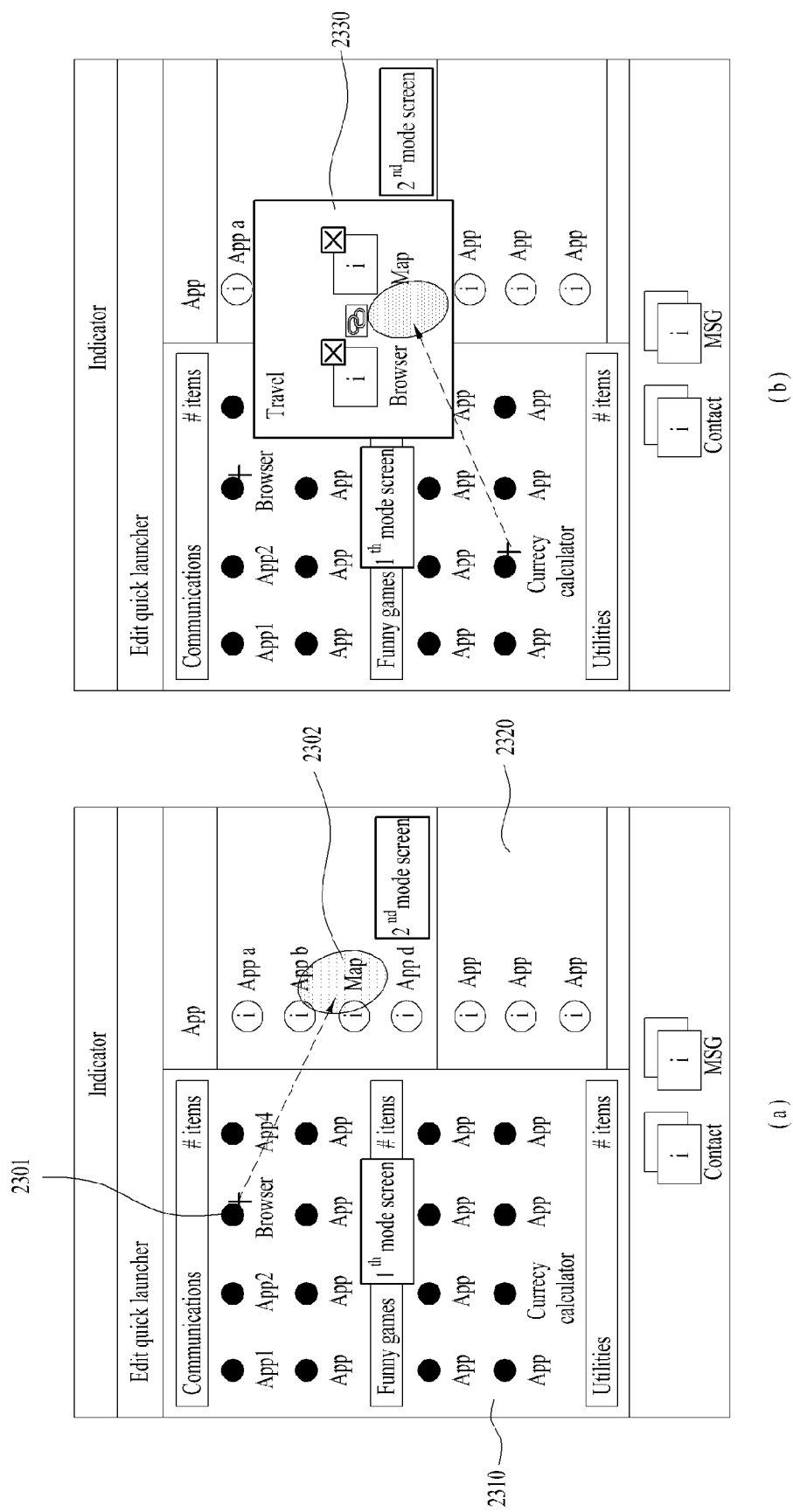
FIGS. 23A and 23B are display screens illustrating executing a plurality of applications linked when selecting a link indicator displayed on a specific region according to an embodiment of the present invention.
Figure 23B:
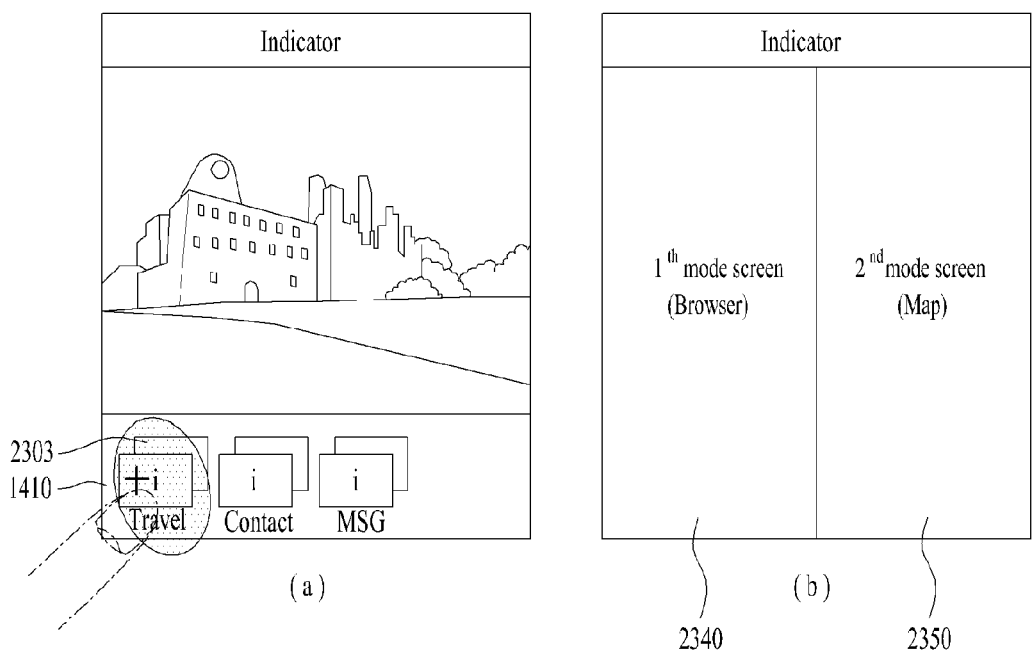

This is described in detail with reference to FIGS. 23A and 23B as follows. In particular, FIGS. 23A and 23B are display screens illustrating executing a plurality of applications linked when selecting a link indicator displayed on a specific region according to the present invention. Referring to FIG. 23A, in accordance with the user selection, the mobile terminal 100 can set a browser application of the first mode and a map application of the second mode to be executed by interconnecting to each other.

In particular, the mobile terminal 100 can display application indicators corresponding to the first mode and indicators corresponding to the second mode on a first region 2310 and a second region 2320, respectively. When receiving an input of a touch & drag action between a browser application indicator 2301 displayed on the first region 2310 and a map application indicator 2302 displayed on the second region 2320, the mobile terminal 100 can set the browser application of the first mode and the map application of the second mode to be executed by interconnecting to each other.

Referring to FIG. 23B, when receiving an input of a touch action on an interconnecting indicator 2303 displayed within a specific region 1410 (FIG. 23B(a)), the mobile terminal 100 can execute the browser application and the map application, which are indicated by the interconnecting indicator 2303, in the first mode and the second mode, respectively. In doing so, the mobile terminal 100 partitions a screen into a plurality of regions and can then display an executed screen of the browser application and an executed screen of the map application on a first region 2340 and a second region 2350, respectively (FIG. 23B(b)).

The modes mentioned in the present specification can variously include a religion mode, a hobby mode, a school mode and the like per type in addition to the private mode and a business mode. In addition, a plurality of modes can be set for each type.

In determining an application executed per mode in the present specification, an application can be designated in accordance with the user selection. Further, an application can automatically be designated to a corresponding mode in consideration of a property and type of the corresponding application. For instance, assuming that a mode field exists in a data structure of an application, an application can be designated to a corresponding mode defined in the mode field.

In each of a plurality of modes mentioned in the present specification, the user interface related to at least one of a voice based communication and a text based communication can be provided via the display unit 151 under the control of the controller 180. For instance, the voice based communication includes a voice call, a voice based chatting and the like. In another instance, the text based communication can include a message service, a text based chatting and the like. Further, the user interface can be displayed as a virtual key form on a touchscreen or can be provided as a button key form. Also, the user interface provided in each of a plurality of modes can differ in position, shape, size and the like.

In addition, the specific region 1410 can be a quick launcher region or quick launcher tray. As described above, the quick launcher region/tray includes icon indicators that when selected, execute a corresponding application in a mode designated by the icon indicators. The applications can include a user's favorite application, the most used applications, applications based on a specific category (email, messaging, phone applications, etc.), and other quick launch applications.

Accordingly, the present invention provides the following advantages.

First, the present invention can provide an application of one mode as a launcher application in an activated state of a prescribed one of a plurality of modes.

Secondly, the present invention can freely set an application of a different mode provided as a launcher application in a prescribed mode activated state in accordance with user's convenience or necessity, thereby conveniently inputting a command for a switching to the different mode in the prescribed mode activated state and a command for an execution of an application corresponding to the different mode.

Thirdly, there present invention can perform a mode switching operation of switching to a different mode without inputting a separate mode switching command by searching for a launcher application or selecting an indicator of an application corresponding to the different mode included in the launcher application.

According to one embodiment of the present invention, the above-described display controlling method of the mobile terminal can be implemented in a program recorded medium as computer-readable codes. The computer-readable media include all kinds of recording devices in which data readable by a computer system are stored. The computer-readable media include ROM, RAM, CD-ROM, magnetic tapes, floppy discs, optical data storage devices, and the like for example and also include carrier-wave type implementations (e.g., transmission via Internet).

The aforementioned embodiments for the mobile terminal and display controlling method therein are achieved by combination of structural elements and features of the present invention in a predetermined type. Each of the structural elements or features should be considered selectively unless specified separately. Each of the structural elements or features may be carried out without being combined with other structural elements or features. Also, some structural elements and/or features may be combined with one another to constitute the embodiments of the present invention.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A mobile terminal, comprising:
a display unit;
a communication unit configured to communicate with at least one external terminal;
a memory configured to store at least first and second operating systems including at least first and second modes, respectively; and
a controller configured to:
activate the first mode using the first operating system,
display, in a first display region of the display unit, the activated first mode,
display in a second display region of the display unit, a plurality of indicators that, when selected, activate corresponding applications in corresponding modes,
receive an input touch action corresponding to an indicator scroll command to the second display region,
determine whether a predetermined reference is met or not,
switch the first mode using the first operating system into the second mode using the second operating system if the predetermined reference is met, and
maintain the first mode using the first operating system if the predetermined reference is not met,
wherein at least one of the plurality of indicators comprise at least one common indicator corresponding to an application that can be executed in both the first mode and the second mode,
wherein the at least one common indicator includes both a first identifier indicating the first mode and a second identifier indicating the second mode,
wherein a first one of the plurality of indicators corresponding to a first application executed in the first mode is configured to change to correspond to a second application having a current occurring event in the second mode, while the rest of the plurality of indicators correspond to an application that can be run only in the first mode, and
wherein the predetermined reference comprises at least one of the number of indicators corresponding to the second mode being greater than the number of indicators corresponding to the first mode, the number of indicators corresponding to the second mode being greater than the reference number, or the indicators displayed within the specific region include the indicators corresponding to the second mode only.

2. The mobile terminal of claim 1, wherein the controller is further configured to display in the second display region at least one first indicator that, when selected, executes a first corresponding application in the first mode, or at least one second indicator that, when selected, executes a second corresponding application in the second mode.

3. The mobile terminal of claim 1, wherein the second display region is a quick launch tray including quick launch indicators that, when selected, activate corresponding applications in the first or second modes.

4. The mobile terminal of claim 3, wherein the quick launch indicators include mode identifiers indicating that the corresponding applications will be activated in the first or second modes.

5. The mobile terminal of claim 2, wherein the controller is further configured to scroll through the first and second indicators based on a touch and drag action performed on the display unit.

6. The mobile terminal of claim 2, further comprising:
a sensor configured to sense a landscape orientation and a portrait orientation of the mobile terminal,
wherein the controller is further configured to automatically display more of the first and second indicators when the sensor senses the mobile terminal is in the landscape orientation.

7. The mobile terminal of claim 2, wherein the first and second indicators identify favorite applications.

8. The mobile terminal of claim 2, wherein the controller is further configured to display at least one third indicator corresponding to a third application that can be activated in both of the first and second modes.

9. The mobile terminal of claim 8, wherein when the third indicator is selected, the third corresponding application is executed in the first mode that is already activated.

10. The mobile terminal of claim 1, wherein the first mode is a personal mode of a user using the mobile terminal, and the second mode is a business mode associated with the user.

11. A method of controlling a mobile terminal, the method comprising:
allowing, via a communication unit on the mobile terminal, communication with at least one external terminal;

storing, in a memory of the mobile terminal, at least first and second operating systems including at least first and second modes, respectively;

activating, via a controller of the mobile terminal, the first mode using the first operating system;

displaying, in a first display region of a display unit of the mobile terminal, the activated first mode;

displaying, in a second display region of the display unit, a plurality of indicators that, when selected, activate corresponding applications in corresponding modes;

receiving an input touch action corresponding to an indicator scroll command to the second display region;

determining whether a predetermined reference is met or not;

switching the first mode using the first operating system into the second mode using the second operating system if the predetermined reference is met; and maintaining the first mode using the first operating system if the predetermined reference is not met, wherein at least one of the plurality of indicators comprise at least one common indicator corresponding to an application that can be executed in both the first mode and the second mode, wherein the at least one common indicator includes both a first identifier indicating the first mode and a second identifier indicating the second mode, wherein a first one of the plurality of indicators corresponding to a first application executed in the second mode is configured to change to an indicator corresponding to a second application having a current occurring event in the second mode, while the rest of the plurality of indicators correspond to an application that can be run only in the first mode, and wherein the predetermined reference comprises at least one of the number of indicators corresponding to the second mode being greater than the number of indicators corresponding to the first mode, the number of indicators corresponding to the second mode being greater than the reference number, or the indicators displayed within the specific region include the indicators corresponding to the second mode only.

12. The method of claim 11, further comprising:

displaying in the second display region, at least one first indicator that, when selected, executes a first corresponding application in the first mode, or at least one second indicator that, when selected, executes a second corresponding application in the second mode.

13. The method of claim 11, wherein the second display region is a quick launch tray including quick launch indicators that, when selected, activate corresponding applications in the first or second modes.

14. The method of claim 13, wherein the quick launch indicators include mode identifiers indicating that the corresponding applications will be activated in the first or second modes.

15. The method of claim 12, further comprising:

scrolling through the first and second indicators based on a touch and drag action performed on the display unit.

16. The method of claim 12, further comprising:

sensing, via a sensor of the mobile terminal, a landscape orientation and a portrait orientation of the mobile terminal; and automatically displaying more of the first and second indicators when the sensor senses the mobile terminal is in the landscape orientation.

17. The method of claim 12, wherein the first and second indicators identify favorite applications.

18. The method of claim 12, further comprising:

displaying at least one third indicator corresponding to a third application that can be activated in both of the first and second modes.

19. The method of claim 18, wherein when the third indicator is selected, the third corresponding application is executed in the first mode that is already activated.

20. The method of claim 11, wherein the first mode is a personal mode of a user using the mobile terminal, and the second mode is a business mode associated with the user.

\* \* \* \* \*